US012794746B2

(12) United States Patent
Liang et al.

(10) Patent No.: US 12,794,746 B2
(45) Date of Patent: Nov. 10, 2026

(54) METHOD AND APPARATUS FOR TRANSMITTING/RECEIVING PHYSICAL LAYER PROTOCOL DATA UNIT

(71) Applicant: HUAWEI TECHNOLOGIES CO., LTD., Shenzhen (CN)

(72) Inventors: Dandan Liang, Shenzhen (CN); Ming Gan, Shenzhen (CN); Yang Yang, Chengdu (CN); Xianfu Lei, Chengdu (CN); Chenchen Liu, Shenzhen (CN); Zhengchun Zhou, Chengdu (CN); Wei Lin, Shenzhen (CN); Xiaohu Tang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 966 days.

(21) Appl. No.: 17/745,344

(22) Filed: May 16, 2022

(65) Prior Publication Data

US 2022/0286337 A1 Sep. 8, 2022

Related U.S. Application Data

(63) Continuation of application No. PCT/CN2021/098713, filed on Jun. 7, 2021.

(30) Foreign Application Priority Data

Jun. 5, 2020 (CN) ......................... 202010507591.7
Jun. 12, 2020 (CN) ......................... 202010541086.4
(Continued)

(51) Int. Cl.
*H04L 27/26* (2006.01)
*H04W 72/0453* (2023.01)
(Continued)

(52) U.S. Cl.
CPC ..... *H04L 27/2602* (2013.01); *H04W 72/0453* (2013.01); *H04W 80/02* (2013.01); *H04W 84/12* (2013.01)

(58) Field of Classification Search
None
See application file for complete search history.

(56) References Cited

U.S. PATENT DOCUMENTS 11,711,184 B2 * 7/2023 Yang .................. H04L 27/2613 370/329
2011/0044390 A1 2/2011 Wang et al.
(Continued)

FOREIGN PATENT DOCUMENTS

CN 110176939 A 8/2019
CN 110324268 A 10/2019
(Continued)

OTHER PUBLICATIONS

Chun "EHT-LTF Sequences Considering the New Tone Plan", dated May 31, 2020, Affiliated with LG Electronics, submitted in the IDS by the Applicant. (Year: 2020).*
(Continued)

*Primary Examiner* — Jamaal Henson
(74) *Attorney, Agent, or Firm* — Fish & Richardson P.C.

(57) ABSTRACT

Example methods for transmitting a physical layer protocol data unit (PPDU) and apparatus are described. One example method includes generating and transmitting a PPDU that includes a long training field (LTF). A length of a frequency-domain sequence of the LTF is greater than a first length, and the first length is a length of a frequency-domain sequence of an LTF of a first PPDU transmitted over a channel whose bandwidth is 160 MHz.

8 Claims, 3 Drawing Sheets

(30) Foreign Application Priority Data

| | | |
|---|---|---|
| Jun. 22, 2020 | (CN) | 202010575363.3 |
| Aug. 3, 2020 | (CN) | 202010768684.5 |

(51) Int. Cl.

| | |
|---|---|
| *H04W 80/02* | (2009.01) |
| *H04W 84/12* | (2009.01) |

(56) References Cited

U.S. PATENT DOCUMENTS

| | | | | |
|---|---|---|---|---|
| 2016/0286551 | A1 | 9/2016 | Lee et al. | |
| 2019/0044778 | A1 | 2/2019 | Park et al. | |
| 2019/0288895 | A1* | 9/2019 | Chen | H04W 72/542 |
| 2019/0380117 | A1 | 12/2019 | Verma et al. | |
| 2021/0218609 | A1* | 7/2021 | Yun | H04L 27/26025 |
| 2021/0243756 | A1* | 8/2021 | Kim | H04W 28/02 |
| 2021/0385830 | A1* | 12/2021 | Lim | H04L 25/02 |
| 2022/0311566 | A1* | 9/2022 | Liang | H04L 27/2613 |
| 2023/0336391 | A1* | 10/2023 | Chun | H04L 5/0044 |

FOREIGN PATENT DOCUMENTS

| | | | | |
|---|---|---|---|---|
| CN | 110557843 | A | 12/2019 | |
| CN | 110768924 | A | 2/2020 | |
| CN | 110876200 | A | 3/2020 | |
| CN | 112821998 | A | 5/2021 | |
| CN | 113496039 | A | 10/2021 | |
| EP | 3528420 | A1 | 8/2019 | |
| EP | 4102795 | A1 | 12/2022 | |
| JP | 7540012 | B2 | 8/2024 | |
| KR | 20170042581 | A | 4/2017 | |
| KR | 20170051431 | A | 5/2017 | |
| KR | 20200003161 | A | 1/2020 | |
| WO | 2018034701 | A1 | 2/2018 | |
| WO | 2019178511 | A1 | 9/2019 | |
| WO | 2019240441 | A1 | 12/2019 | |
| WO | WO-2020096349 | A1 * | 5/2020 | H04L 27/2613 |

OTHER PUBLICATIONS

IEEE, "Part 11: Wireless LAN Medium Access Control (MAC) and Physical Layer (PHY) Specifications, Amendment 1: Enhancements for High-Efficiency WLAN" dated May 19, 2021 (Year: 2021).*

IEEE, "Part 11: Wireless LAN Medium Access Control (MAC) and Physical Layer (PHY) Specifications, Amendment 1: Enhancements for High-Efficiency WLAN" dated May 19, 2021, p. 586. (Year: 2021).*

IEEE, "Part 11 Wireless LAN Medium Access Control (MAC) and Physical Layer (PHY) Speicifications, Amendment 1: Enhancements for High-Efficiency WLAN" dated May 19, 2021, p. 586 (Year: 2021).*

Park et al. "Overview of PHY Features for EHT", LG Electronics, Doc Code IEEE 802.11-18/1967r1, dated Jan. 1, 2019 (Year: 2019).*

Office Action in Australian Appln. No. 2021286093, mailed on May 8, 2024, 3 pages.

Chun et al., "EHT-LTF sequences considering the new tone plan," IEEE 802.11-20/0825r0, May 31, 2020, 17 pages.

Office Action in Australian Appln. No. 2021286093, mailed on Jul. 28, 2023, 4 pages.

Office Action in Indian Appln. No. 202237072108, mailed on Aug. 10, 2023, 6 pages (with English translation).

Lai et al., "Physical layer model for 802.11n-Zig Bee coexistence: subcarrier-nulling multi-input multi-output," Journal of Computer Applications, Dec. 10, 2014, 8 pages (with English abstract).

Kim et al., "Consideration of EHT-LTF," IEEE 802.11-19/1925r1, Jan. 12, 2020, 19 pages.

Extended European Search Report in European Appln No. 21818702.9, dated Dec. 21, 2022, 7 pages.

IEEE P802.11ax/D2.2, "Draft Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications; Amendment 6: Enhancements for High Efficiency WLAN," Feb. 2018, 620 pages.

Kang et al., "A Software Defined Open Wi-Fi Platform," Networks and Security, China Communications, Jul. 2017, 15 pages.

PCT International Search Report and Written Opinion issued in International Application No. PCT/CN2021/098713 on Sep. 8, 2021, 13 pages (with partial English translation).

Notice of Allowance in Japanese Appln. No. 2024-135406, mailed on Dec. 16, 2025, 5 pages (with English translation).

Notice of Allowance in Korean Appln. No. 10-2023-7000622, mailed on Sep. 2, 2025, 6 pages (with English translation).

EP Communication Pursuant to Article 94(3) EPC in European Appln. No. 23828320.4, mailed on Jun. 29, 2026, 8 pages.

Son et al., "Symbol Timing Synchronization for Uplink Multi-User Transmission in IEEE 802. 11ax WLAN," IEEE Access, Nov. 19, 2018, 6:16 pages.

* cited by examiner

METHOD AND APPARATUS FOR TRANSMITTING/RECEIVING PHYSICAL LAYER PROTOCOL DATA UNIT

CROSS-REFERENCE TO RELATED APPLICATIONS

This application is a continuation of International Application No. PCT/CN2021/098713, filed on Jun. 7, 2021, which claims priority to Chinese Patent Application No. 202010507591.7, filed on Jun. 5, 2020, Chinese Patent Application No. 202010541086.4, filed on Jun. 12, 2020, Chinese Patent Application No. 202010575363.3, filed on Jun. 22, 2020 and Chinese Patent Application No. 202010768684.5, filed on Aug. 3, 2020. All of the aforementioned patent applications are hereby incorporated by reference in their entireties.

TECHNICAL FIELD

This application relates to the field of wireless communication technologies, and more specifically, to a method and apparatus for transmitting/receiving a physical layer protocol data unit.

BACKGROUND

With development of the mobile Internet and popularization of intelligent terminals, data traffic grows rapidly, and users impose increasingly high requirements on communication service quality. The Institute of Electrical and Electronics Engineers (IEEE) 802.11ax standard can no longer meet user requirements for a high throughput, a low jitter, a low latency, and the like. Therefore, it is urgent to develop a next-generation wireless local area network (WLAN) technology, that is, the IEEE 802.11be standard.

Different from the IEEE 802.11ax, the IEEE 802.11be uses ultra-large bandwidths, such as 240 MHz and 320 MHz, to achieve ultra-high transmission rates and support scenarios with an ultra-high user density. Therefore, how to design a long training field (LTF) sequence for a larger channel bandwidth is a problem worth concern.

SUMMARY

This application provides a method and apparatus for transmitting a physical layer protocol data unit, so as to design a long training field sequence for a larger channel bandwidth.

According to a first aspect, a method for transmitting a physical layer protocol data unit is provided, including: generating a physical layer protocol data unit (PPDU), where the PPDU includes a long training field (LTF), a length of a frequency-domain sequence of the LTF is greater than a first length, and the first length is a length of a frequency-domain sequence of an LTF of a PPDU transmitted over a channel whose bandwidth is 160 MHz; and sending the PPDU over a target channel, where a bandwidth of the target channel is greater than 160 MHz.

The frequency-domain sequence of the LTF provided in this embodiment of this application considers a phase rotation at a non-pilot location, a plurality of puncturing patterns for 240 MHz/320 MHz, and multiple RU combination, so that a finally provided frequency-domain sequence of the LTF has relatively small PAPR values on multiple RUs in the plurality of puncturing patterns for 240 MHz/320 MHz.

According to a second aspect, a method for receiving a physical layer protocol data unit is provided, including: receiving a physical layer protocol data unit (PPDU), where the PPDU includes a long training field (LTF), a length of a frequency-domain sequence of the LTF is greater than a first length, and the first length is a length of a frequency-domain sequence of an LTF of a PPDU transmitted over a channel whose bandwidth is 160 MHz; and parsing the PPDU.

The frequency-domain sequence of the LTF received in this embodiment of this application has a relatively small PAPR value on a multiple RU in a plurality of puncturing patterns for 240 MHz/320 MHz.

DESCRIPTION OF EMBODIMENTS

The following describes technical solutions of this application with reference to the accompanying drawings.

The technical solutions of embodiments of this application may be applied to various communication systems, such as: a wireless local area network (WLAN) communication system, a global system for mobile communications ( ), a code division multiple access ( ) system, a wideband code division multiple access (WCDMA) system, a general packet radio service (GPRS) system, a long term evolution (LTE) system, an LTE frequency division duplex (FDD) system, an LTE time division duplex (TDD), a universal mobile telecommunications system (UMTS), a worldwide interoperability for microwave access (WiMAX) communication system, a 5th generation (5G) system, or new radio (NR).

The following is used as an example for description. Only the WLAN system is used as an example below to describe an application scenario in the embodiments of this application and a method in the embodiments of this application.

Specifically, the embodiments of this application may be applied to a wireless local area network (WLAN), and the embodiments of this application may be applied to any protocol in the institute of electrical and electronics engineers (IEEE) 802.11 series protocols currently used in the WLAN. The WLAN may include one or more basic service sets (BSS). A network node in the basic service sets includes an access point (AP) and a station (STA).

In the embodiments of this application, an initiator device may be a STA in a WLAN, and correspondingly a responder device may be an AP in the WLAN. Certainly, alternatively, an initiator device may be an AP in a WLAN, and a responder device may be a STA in the WLAN in the embodiments of this application.

Figure 1:
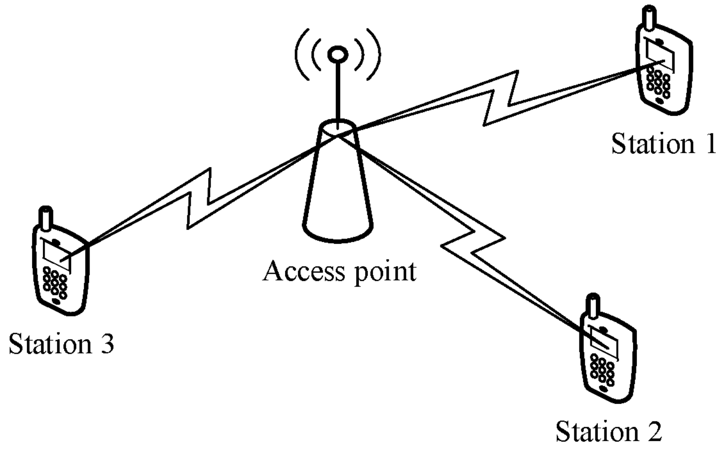
FIG. 1 is a schematic diagram of a communication system applicable to a method according to an embodiment of this application.

For ease of understanding the embodiments of this application, a communication system shown in FIG. 1 is first used as an example to describe in detail a communication system applicable to the embodiments of this application. A scenario system shown in FIG. 1 may be a WLAN system. The WLAN system in FIG. 1 may include one or more APs and one or more STAs. In FIG. 1, one AP and three STAs are used as an example. Wireless communication may be performed between the AP and the STA according to various standards. For example, wireless communication between the AP and the STA may be performed by using a single-user multiple-input multiple-output (SU-MIMO) technology or a multi-user multiple-input multiple-output (MU-MIMO) technology.

Figure 2:
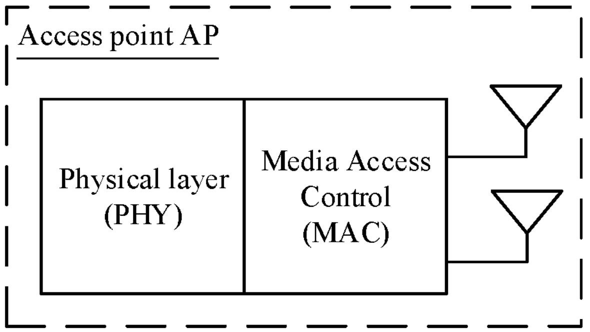
FIG. 2 is a diagram of an internal structure of an access point applicable to an embodiment of this application.

The AP is also referred to as a wireless access point, a hotspot, or the like. The AP is an access point for a mobile user to access a wired network, and is mainly deployed in homes, buildings, and campuses, or is deployed outdoors. The AP is equivalent to a bridge that connects the wired network and a wireless network. A main function of the AP is to connect wireless network clients together, and then connect the wireless network to the Ethernet. Specifically, the AP may be a terminal device or a network device with a wireless fidelity (Wi-Fi) chip. Optionally, the AP may be a device that supports a plurality of WLAN standards such as 802.11. FIG. 2 shows a diagram of an internal structure of an AP product. The AP may have a plurality of antennas or may have a single antenna. In FIG. 2, the AP includes a physical layer (PHY) processing circuit and a media access control (MAC) processing circuit. The physical layer processing circuit may be configured to process a physical layer signal, and the MAC layer processing circuit may be configured to process a MAC layer signal. The 802.11 standard focuses on a PHY and MAC part, and this embodiment of this application focuses on protocol design on the MAC and the PHY.

Figure 3:
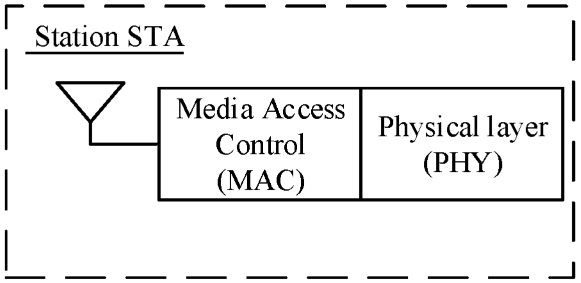
FIG. 3 is a diagram of an internal structure of a station applicable to an embodiment of this application.

A STA product is usually a terminal product, for example, a mobile phone, a notebook computer, that supports the 802.11 series standards. FIG. 3 shows a diagram of a structure of a STA with a single antenna. In an actual scenario, the STA may also have a plurality of antennas, and may be a device with more than two antennas. In FIG. 3, the STA may include a physical layer (PHY) processing circuit and a media access control (MAC) processing circuit. The physical layer processing circuit may be configured to process a physical layer signal, and the MAC layer processing circuit may be configured to process a MAC layer signal.

The following describes the embodiments of this application and content related to the embodiments of this application.

The following first describes some content related to the embodiments of this application.

1. 802.11be Tone Plan

Figure 4:
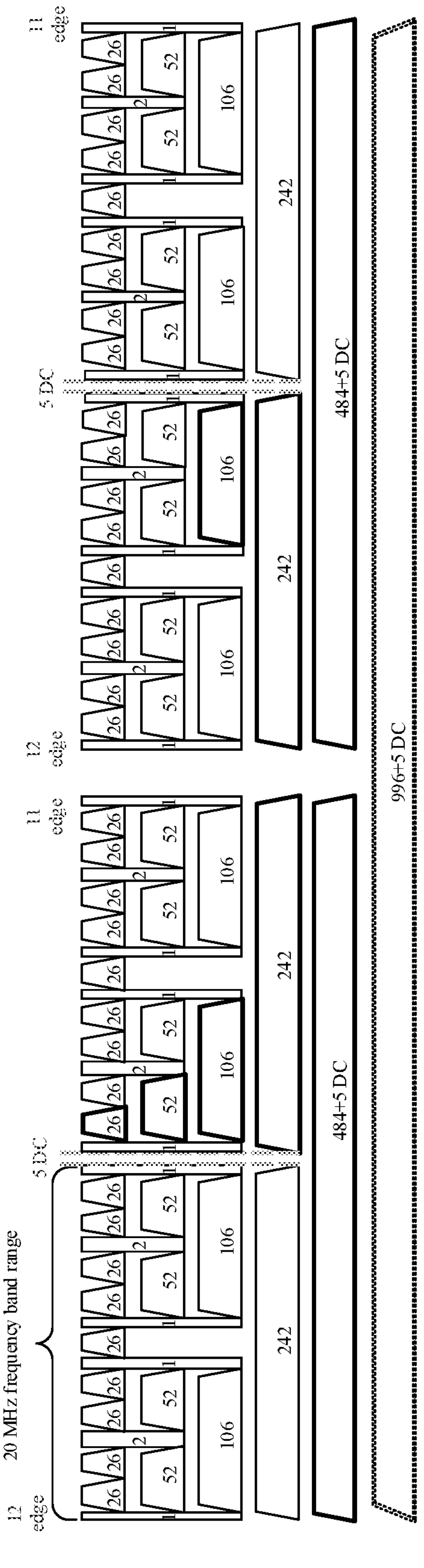
FIG. 4 shows an 80 MHz tone plan.

FIG. 4 shows an 802.11be 80 MHz subcarrier design. A 240 MHz bandwidth and a 320 MHz bandwidth are added to the 802.11be, where the 240 MHz is obtained by directly concatenating three 802.11be 80 MHz subcarriers, and the 320 MHz is obtained by directly concatenating four 802.11be 80 MHz subcarriers.

In the 80 MHz subcarrier design in FIG. 4, indexes of data subcarriers and pilot subcarriers in RU26 are listed in table 1.

TABLE 1

| | RU1-RU18 | | RU19-RU36 | | Pilot location |
|---|---|---|---|---|---|
| 26-tone RU | −499 | −474 | 13 | 38 | {−494, −480}, {−468, −454}, |
| | −473 | −448 | 39 | 64 | {−440, −426}, {−414, −400}, |
| | −445 | −420 | 67 | 92 | {−386, −372}, {−360, −346}, |
| | −419 | −394 | 93 | 118 | {−334, −320}, {−306, −292}, |
| | −392 | −367 | 120 | 145 | {−280, −266}, {−246, −232}, |
| | −365 | −340 | 147 | 172 | {−220, −206}, {−192, −178}, |
| | −339 | −314 | 173 | 198 | {−166, −152}, {−140, −126}, |

TABLE 1-continued

| RU1-RU18 | | RU19-RU36 | | Pilot location |
|---|---|---|---|---|
| −311 | −286 | 201 | 226 | {−112, −98}, {−86, −72}, |
| −285 | −260 | 227 | 252 | {−58, −44}, {−32, −18}, |
| −252 | −227 | 260 | 285 | {18, 32}, {44, 58}, |
| −226 | −201 | 286 | 311 | {72, 86}, {98, 112}, |
| −198 | −173 | 314 | 339 | {126, 140}, {152, 166}, |
| −172 | −147 | 340 | 365 | {178, 192}, {206, 220}, |
| −145 | −120 | 367 | 392 | {232, 246}, 5 DC, {266, 280}, |
| −118 | −93 | 394 | 419 | {292, 306}, {320, 334}, |
| −92 | −67 | 420 | 445 | {346, 360}, {372, 386}, |
| −64 | −39 | 448 | 473 | {400, 414}, {426, 440}, |
| −38 | −13 | 474 | 499 | {454, 468}, {480, 494} |

It should be noted that, in table 1, each row in the 2nd column and the 3rd column indicates one RU. For example, the last row in the 2nd column indicates RU18 [−38: −13]. Locations for RU18 are a subcarrier numbered −38 to a subcarrier numbered −13. The 4th column sequentially indicates pilot subcarrier indexes for a corresponding 26-tone RU. For example, the 1st 26-tone RU includes a subcarrier numbered −499 to a subcarrier numbered −474, where pilot subcarriers are a subcarrier numbered −494 and a subcarrier numbered −480.

It should be understood that, the following table describes similar meanings, which are not repeated below.

In the 80 MHz subcarrier design in FIG. 4, indexes of data subcarriers and pilot subcarriers in RU52 are listed table 2.

TABLE 2

| | RU1-RU16 | | Pilot location |
|---|---|---|---|
| 52-tone RU | −499 | −448 | {−494, −480, −468, −454}, |
| | −445 | −394 | {−440, −426, −414, −400}, |
| | −365 | −314 | {−360, −346, −334, −320}, |
| | −311 | −260 | {−306, −292, −280, −266}, |
| | −252 | −201 | {−246, −232, −220, −206}, |
| | −198 | −147 | {−192, −178, −166, −152}, |
| | −118 | −67 | {−112, −98, −86, −72}, |
| | −64 | −13 | {−58, −44, −32, −18}, |
| | 13 | 64 | {18, 32, 44, 58}, {72, 86, 98, 112}, |
| | 67 | 118 | {152, 166, 178, 192}, {206, 220, 232, 246}, |
| | 147 | 198 | {266, 280, 292, 306}, {320, 334, 346, 360}, |
| | 201 | 252 | {400, 414, 426, 440}, {454, 468, 480, 494} |
| | 260 | 311 | |
| | 314 | 365 | |
| | 394 | 445 | |
| | 448 | 499 | |

In the 80 MHz subcarrier design in FIG. 4, indexes of data subcarriers and pilot subcarriers in RU106 are listed in table 3.

TABLE 3

| | RU1-RU8 | | Pilot location |
|---|---|---|---|
| 106-tone RU | −499 | −394 | {−494, −468, −426, −400}, |
| | −365 | −260 | {−360, −334, −292, −266}, |
| | −252 | −147 | {−246, −220, −178, −152}, |
| | −118 | −13 | {−112, −86, −44, −18}, |
| | 13 | 118 | {18, 44, 86, 112}, |
| | 147 | 252 | {152, 178, 220, 246}, |
| | 260 | 365 | {266, 292, 334, 360}, |
| | 394 | 499 | {400, 426, 468, 494} |

In the 80 MHz subcarrier design in FIG. 4, indexes of data subcarriers and pilot subcarriers in RU242 are listed in table 4.

TABLE 4

| | RU1-RU4 | | Pilot location |
|---|---|---|---|
| 242-tone RU | −500 | −259 | {−494, −468, −426, −400, −360, −334, −292, −266}, |
| | −253 | −12 | {−246, −220, −178, −152, −112, −86, −44, −18}, |
| | 12 | 253 | {18, 44, 86, 112, 152, 178, 220, 246}, |
| | 259 | 500 | {266, 292, 334, 360, 400, 426, 468, 494} |

In the 80 MHz subcarrier design in FIG. 4, indexes of data subcarriers and pilot subcarriers in RU484 are listed in table 5. An 80 MHz 484-tone RU in the 802.11ax is an RU composed of 484 consecutive subcarriers. An 80 MHz 484-tone RU in the 802.11be is composed of 468 data subcarriers and 16 pilot subcarriers, and there are 5 direct current subcarriers or null subcarriers in the middle. For example, in the 1$^{st}$ 484-tone RU, subcarriers are numbered from −500 to −12. The 5 direct current subcarriers are numbered −258, −257, −256, −255, and −254. The 16 pilot subcarriers are numbered −494, −468, −426, −400, −360, −334, −292, −266, −246, −220, −178, −152, −112, −86, −44, and −18.

TABLE 5

| | RU1 and RU2 | Pilot location |
|---|---|---|
| 484-tone RU | [−500:−259, −253:−12] [12:253, 259:500] | {−494, −468, −426, −400, −360, −334, −292, −266, −246, −220, −178, −152, −112, −86, −44, −18}, {18, 44, 86, 112, 152, 178, 220, 246, 266, 292, 334, 360, 400, 426, 468, 494} |

In the 80 MHz subcarrier design in FIG. 4, indexes of data subcarriers and pilot subcarriers in RU996 are listed in table 6. An 80 MHz 996-tone RU in the 802.11be is composed of 980 data subcarriers and 16 pilot subcarriers, and there are 5 direct current subcarriers in the middle. For example, in the 1$^{st}$ 484-tone RU, subcarriers are numbered −500 to 500, and the 5 direct current subcarriers are numbered −2, −1, 0, 1, and 2. The 16 pilot subcarriers are numbered −468, −400, −334, −266, −220, −152, −86, −18, +18, +86, +152, +220, +266, +334, +400, and +468.

TABLE 6

| | RU1 | Pilot location |
|---|---|---|
| 996-tone RU | [−500:−3, 3:500] | {−468, −400, −334, −266, −220, −152, −86, −18, +18, +86, +152, +220, +266, +334, +400, +468} |

The LTF sequence provided in this embodiment of this application is used for the 240 MHz bandwidth and the 320 MHz bandwidth, and the 240 MHz bandwidth and the 320 MHz bandwidth are constructed by using the tone plan shown in FIG. 4.

A subcarrier design of a 160 MHz bandwidth is based on two 80 MHz, that is, [subcarriers indexes for RUs in 80 MHz, subcarrier indexes for pilot locations]−521,80 MHz [subcarrier indexes for RUs in 80 MHz, subcarrier indexes for pilot locations]+521.

The 240 MHz bandwidth is based on three 80 MHz.

A subcarrier design of the 320 MHz bandwidth is based on two 160 MHz, that is, [subcarrier indexes in 160 MHz]-1024, [subcarrier indexes in 160 MHz]+1024.

2. Puncturing Patterns for the 240 MHz and Puncturing Patterns for the 320 MHz

A bitmap is used to indicate a puncturing pattern. Each bit indicates whether one 20 MHz subchannel is punctured. For example, "0" indicates that the 20 MHz subchannel corresponding to the bit is punctured, and "1" indicates that the 20 MHz subchannel corresponding to the bit is not punctured. Optionally, bits from left to right sequentially correspond to 20 MHz subchannel with channel frequencies from low to high.

2-1. Puncturing Patterns for the 240 MHz

Pattern 1: [1 1 1 1 1 1 1 1 1 1 1 1], corresponding to a channel bandwidth of 240 MHz and 3072 subcarriers.

Pattern 2: [0 0 1 1 1 1 1 1 1 1 1 1], corresponding to an available channel bandwidth of 200 MHz.

Pattern 3: [1 1 0 0 1 1 1 1 1 1 1 1], corresponding to an available channel bandwidth of 200 MHz.

Pattern 4: [1 1 1 1 0 0 1 1 1 1 1 1], corresponding to an available channel bandwidth of 200 MHz.

Pattern 5: [1 1 1 1 1 1 0 0 1 1 1 1], corresponding to an available channel bandwidth of 200 MHz.

Pattern 6: [1 1 1 1 1 1 1 1 0 0 1 1], corresponding to an available channel bandwidth of 200 MHz.

Pattern 7: [1 1 1 1 1 1 1 1 1 1 0 0], corresponding to an available channel bandwidth of 200 MHz.

Pattern 8: [0 0 0 0 1 1 1 1 1 1 1 1], corresponding to an available channel bandwidth of 160 MHz.

Pattern 9: [1 1 1 1 0 0 0 0 1 1 1 1], corresponding to an available channel bandwidth of 160 MHz.

Pattern 10: [1 1 1 1 1 1 1 1 0 0 0 0], corresponding to an available channel bandwidth of 160 MHz.

2-2. Puncturing Patterns for the 320 MHz

Specifically, the channel puncturing patterns for the 320 MHz may be classified into two types: one type is compatible with 240 MHz puncturing, and the other type is not compatible with 240 MHz puncturing. "Compatible" means: After 240 MHz is formed by channel puncturing on 320 MHz, puncturing is further performed based on the 240 MHz formed by puncturing, that is, puncturing is continued on the 240 MHz formed by puncturing.

(A). The 320 MHz channel puncturing is compatible with 240 MHz channel puncturing.

Pattern 1: [1 1 1 1 1 1 1 1 1 1 1 1 1 1 1 1], corresponding to a channel bandwidth of 320 MHz and 4096 subcarriers.

Pattern 2: [0 0 1 1 1 1 1 1 1 1 1 1 1 1 1 1], corresponding to an available channel bandwidth of 280 MHz.

Pattern 3: [1 1 0 0 1 1 1 1 1 1 1 1 1 1 1 1], corresponding to an available channel bandwidth of 280 MHz.

Pattern 4: [1 1 1 1 0 0 1 1 1 1 1 1 1 1 1 1], corresponding to an available channel bandwidth of 280 MHz.

Pattern 5: [1 1 1 1 1 1 0 0 1 1 1 1 1 1 1 1], corresponding to an available channel bandwidth of 280 MHz.

Pattern 6: [1 1 1 1 1 1 1 1 0 0 1 1 1 1 1 1], corresponding to an available channel bandwidth of 280 MHz.

Pattern 7: [1 1 1 1 1 1 1 1 1 1 0 0 1 1 1 1], corresponding to an available channel bandwidth of 280 MHz.

Pattern 8: [1 1 1 1 1 1 1 1 1 1 1 1 0 0 1 1], corresponding to an available channel bandwidth of 280 MHz.

Pattern 9: [1 1 1 1 1 1 1 1 1 1 1 1 1 1 0 0], corresponding to an available channel bandwidth of 280 MHz.

Pattern 10: [1 1 1 1 0 0 0 0 1 1 1 1 1 1 1 1], corresponding to an available channel bandwidth of 240 MHz.

Pattern 11: [1 1 1 1 1 1 1 1 0 0 0 0 1 1 1 1], corresponding to an available channel bandwidth of 240 MHz.

Pattern 12: [1 1 1 1 1 1 1 1 1 1 1 1 0 0 0 0], corresponding to an available channel bandwidth of 240 MHz.

Pattern 13: [0 0 0 0 1 1 1 1 1 1 1 1 1 1 1 1], corresponding to an available channel bandwidth of 240 MHz.

Puncturing is further performed based on the available channel bandwidth of 240 MHz formed in pattern 10 to obtain pattern 14 to pattern 22.

Pattern 14: [0 0 1 1 0 0 0 0 1 1 1 1 1 1 1 1], corresponding to an available channel bandwidth of 200 MHz.

Pattern 15: [1 1 0 0 0 0 0 0 1 1 1 1 1 1 1 1], corresponding to an available channel bandwidth of 200 MHz.

Pattern 16: [1 1 1 1 0 0 0 0 0 0 1 1 1 1 1 1], corresponding to an available channel bandwidth of 200 MHz.

Pattern 17: [1 1 1 1 0 0 0 0 1 1 0 0 1 1 1 1], corresponding to an available channel bandwidth of 200 MHz.

Pattern 18: [1 1 1 1 0 0 0 0 1 1 1 1 0 0 1 1], corresponding to an available channel bandwidth of 200 MHz.

Pattern 19: [1 1 1 1 0 0 0 0 1 1 1 1 1 1 0 0], corresponding to an available channel bandwidth of 200 MHz.

Pattern 20: [0 0 0 0 0 0 0 0 1 1 1 1 1 1 1 1], corresponding to an available channel bandwidth of 160 MHz.

Pattern 21: [1 1 1 1 0 0 0 0 0 0 0 0 1 1 1 1], corresponding to an available channel bandwidth of 160 MHz.

Pattern 22: [1 1 1 1 0 0 0 0 1 1 1 1 0 0 0 0], corresponding to an available channel bandwidth of 160 MHz.

Puncturing is further performed based on the available channel bandwidth of 240 MHz formed in pattern 11 to obtain pattern 23 to pattern 31.

Pattern 23: [0 0 1 1 1 1 1 1 0 0 0 0 1 1 1 1], corresponding to an available channel bandwidth of 200 MHz.

Pattern 24: [1 1 0 0 1 1 1 1 0 0 0 0 1 1 1 1], corresponding to an available channel bandwidth of 200 MHz.

Pattern 25: [1 1 1 1 0 0 1 1 0 0 0 0 1 1 1 1], corresponding to an available channel bandwidth of 200 MHz.

Pattern 26: [1 1 1 1 1 1 0 0 0 0 0 0 1 1 1 1], corresponding to an available channel bandwidth of 200 MHz.

Pattern 27: [1 1 1 1 1 1 1 1 0 0 0 0 0 0 1 1], corresponding to an available channel bandwidth of 200 MHz.

Pattern 28: [1 1 1 1 1 1 1 1 0 0 0 0 1 1 0 0], corresponding to an available channel bandwidth of 200 MHz.

Pattern 29: [0 0 0 0 1 1 1 1 0 0 0 0 1 1 1 1], corresponding to an available channel bandwidth of 160 MHz.

Pattern 30: [1 1 1 1 0 0 0 0 0 0 0 0 1 1 1 1], corresponding to an available channel bandwidth of 160 MHz.

Pattern 31: [1 1 1 1 1 1 1 1 0 0 0 0 0 0 0 0], corresponding to an available channel bandwidth of 160 MHz.

Puncturing is further performed based on the available channel bandwidth of 240 MHz formed in pattern 12 to obtain pattern 32 to pattern 40.

Pattern 32: [0 0 1 1 1 1 1 1 1 1 1 1 0 0 0 0], corresponding to an available channel bandwidth of 200 MHz.

Pattern 33: [1 1 0 0 1 1 1 1 1 1 1 1 0 0 0 0], corresponding to an available channel bandwidth of 200 MHz.

Pattern 34: [1 1 1 1 0 0 1 1 1 1 1 1 0 0 0 0], corresponding to an available channel bandwidth of 200 MHz.

Pattern 35: [1 1 1 1 1 1 0 0 1 1 1 1 0 0 0 0], corresponding to an available channel bandwidth of 200 MHz.

Pattern 36: [1 1 1 1 1 1 1 1 0 0 1 1 0 0 0 0], corresponding to an available channel bandwidth of 200 MHz.

Pattern 37: [1 1 1 1 1 1 1 1 1 1 0 0 0 0 0 0], corresponding to an available channel bandwidth of 200 MHz.

Pattern 38: [0 0 0 0 1 1 1 1 1 1 1 1 0 0 0 0], corresponding to an available channel bandwidth of 160 MHz.

Pattern 39: [1 1 1 1 0 0 0 0 1 1 1 1 0 0 0 0], corresponding to an available channel bandwidth of 160 MHz.

Pattern 40: [1 1 1 1 1 1 1 1 0 0 0 0 0 0 0 0], corresponding to an available channel bandwidth of 160 MHz.

Puncturing is further performed based on the available channel bandwidth of 240 MHz formed in pattern 13 to obtain pattern 41 to pattern 49.

Pattern 41: [0 0 0 0 0 0 1 1 1 1 1 1 1 1 1 1], corresponding to an available channel bandwidth of 200 MHz.

Pattern 42: [0 0 0 0 1 1 0 0 1 1 1 1 1 1 1 1], corresponding to an available channel bandwidth of 200 MHz.

Pattern 43: [0 0 0 0 1 1 1 1 0 0 1 1 1 1 1 1], corresponding to an available channel bandwidth of 200 MHz.

Pattern 44: [0 0 0 0 1 1 1 1 1 1 0 0 1 1 1 1], corresponding to an available channel bandwidth of 200 MHz.

Pattern 45: [0 0 0 0 1 1 1 1 1 1 1 1 0 0 1 1], corresponding to an available channel bandwidth of 200 MHz.

Pattern 46: [0 0 0 0 1 1 1 1 1 1 1 1 1 1 0 0], corresponding to an available channel bandwidth of 200 MHz.

Pattern 47: [0 0 0 0 0 0 0 0 1 1 1 1 1 1 1 1], corresponding to an available channel bandwidth of 160 MHz.

Pattern 48: [0 0 0 0 1 1 1 1 0 0 0 0 1 1 1 1], corresponding to an available channel bandwidth of 160 MHz.

Pattern 49: [0 0 0 0 1 1 1 1 1 1 1 1 0 0 0 0], corresponding to an available channel bandwidth of 160 MHz.

(B). The 320 MHz channel puncturing is incompatible with 240 MHz channel puncturing.

Pattern 1: 320 MHz [1 1 1 1 1 1 1 1 1 1 1 1 1 1 1 1], corresponding to a channel bandwidth of 320 MHz and 4096 subcarriers.

Pattern 2: 280 MHz [0 0 1 1 1 1 1 1 1 1 1 1 1 1 1 1], corresponding to an available channel bandwidth of 280 MHz.

Pattern 3: 280 MHz [1 1 0 0 1 1 1 1 1 1 1 1 1 1 1 1], corresponding to an available channel bandwidth of 280 MHz.

Pattern 4: 280 MHz [1 1 1 1 0 0 1 1 1 1 1 1 1 1 1 1], corresponding to an available channel bandwidth of 280 MHz.

Pattern 5: 280 MHz [1 1 1 1 1 1 0 0 1 1 1 1 1 1 1 1], corresponding to an available channel bandwidth of 280 MHz.

Pattern 6: 280 MHz [1 1 1 1 1 1 1 1 0 0 1 1 1 1 1 1], corresponding to an available channel bandwidth of 280 MHz.

Pattern 7: 280 MHz [1 1 1 1 1 1 1 1 1 1 0 0 1 1 1 1], corresponding to an available channel bandwidth of 280 MHz.

Pattern 8: 280 MHz [1 1 1 1 1 1 1 1 1 1 1 1 0 0 1 1], corresponding to an available channel bandwidth of 280 MHz.

Pattern 9: 280 MHz [1 1 1 1 1 1 1 1 1 1 1 1 1 1 0 0], corresponding to an available channel bandwidth of 280 MHz.

Pattern 10: 240 MHz [1 1 1 1 0 0 0 0 1 1 1 1 1 1 1 1], corresponding to an available channel bandwidth of 240 MHz.

Pattern 11: 240 MHz [1 1 1 1 1 1 1 1 0 0 0 0 1 1 1 1], corresponding to an available channel bandwidth of 240 MHz.

Pattern 12: 240 MHz [1 1 1 1 1 1 1 1 1 1 1 1 0 0 0 0], corresponding to an available channel bandwidth of 240 MHz.

Pattern 13: 240 MHz [0 0 0 0 1 1 1 1 1 1 1 1 1 1 1 1], corresponding to an available channel bandwidth of 240 MHz.

3. Multiple RU Combination for the 240 MHz and Multiple RU Combination for the 320 MHz 3-1. Multiple RU Combination Manners for the 240 MHz: RU26, RU52, RU26+RU52, RU106, RU26+RU106, RU242, RU484, RU242+RU484, RU996, RU484+RU996, RU242+RU484+RU996, RU484+2*RU996, and 3*RU996.

3-2. Multiple RU Combination Manners for the 320 MHz: RU26, RU52, RU26+RU52, RU106, RU26+RU106, RU242, RU484, RU242+RU484, RU996, RU484+RU996, RU242+RU484+RU996, RU484+2*RU996, 3*RU996, 3*RU996+RU484, and 4*RU996.

RU2*996 indicates two RU996, and may alternatively be represented as 2*RU996. RU3*996 may alternatively be represented as 3*RU996, and RU4*996 may alternatively be represented as 4*RU996. RUA+RUB is equivalent to RUB+RUA, and refers to a combination or concatenation of RUA and RUB.

Modes considered for a 1×LTF sequence over the 240 MHz bandwidth include the descriptions in 2-1.

Modes considered for a 1×LTF sequence over the 320 MHz bandwidth include the descriptions in 2-2.

Modes considered for a 2×LTF sequence/4×LTF sequence over the 240 MHz bandwidth include content in table A below.

RU26, . . . , and the 36$^{th}$ RU26 from left to right (from a low frequency to a high frequency), as shown in FIG. 4. The 240 MHz is composed of three 80 MHz, and RU26 included in the 240 MHz are sequentially represented as the 1$^{st}$ RU26, the 2$^{nd}$ RU26, . . . , and the 108$^{th}$ RU26 from left to right (from a low frequency to a high frequency). That is, RU26 included in the 1$^{st}$ 80 MHz of the 240 MHz are sequentially represented as the 1$^{st}$ RU26, the 2$^{nd}$ RU26, . . . , the 36$^{th}$ RU26; RU26 included in the 2$^{nd}$ 80 MHz of the 240 MHz are sequentially represented as the 37$^{th}$ RU26, the 38th RU26, . . . , and the 72$^{nd}$ RU26; and RU26 included in the 3$^{rd}$ 80 MHz of the 240 MHz are sequentially represented as the 73$^{rd}$ RU26, the 74$^{th}$ RU26, . . . , and the 108$^{th}$ RU26.

In table A, RU26+RU106 has fixed combination or concatenation modes. There are 4 fixed combination modes in each 80 MHz, and therefore 12 combination or concatenation modes in the 240 MHz. Details are as follows:

The 1$^{st}$ 80 MHz in the 240 MHz bandwidth includes:

TABLE A

| | RU size | | | | | | | | | | | | |
|---|---|---|---|---|---|---|---|---|---|---|---|---|---|
| | RU26 | RU52 | RU26 + RU52 | RU106 | RU26 + RU106 | RU242 | RU484 | RU242 + RU484 | RU996 | RU484 + RU996 | RU2 * 996 | RU484 + RU2 * 996 | RU3 * 996 |
| Modes | 36 * 3 | 16 * 3 | 4 * 3 | 8 * 3 | 4 * 3 | 4 * 3 | 2 * 3 | 4 * 3 | 1 * 3 | 8 | 3 | 6 | 1 |

The 240 MHz is formed by concatenating three 80 MHz. Each 80 MHz has thirty-six 26-tone RUs with sequence numbers from small to large and corresponding frequencies from low to high. Implementation is similar for a 52-tone RU (RU52), a 106-tone RU (RU106), a 242-tone RU (RU242), a 484-tone RU (RU484), and a 996-tone RU (RU996).

Multiple RU combination is to allocate a plurality of RUs to one STA. Each RU still uses data subcarrier locations and pilot subcarrier locations of the RU. For example, for RU26+RU52, RU26 uses its own data subcarrier locations and pilot locations, and RU52 uses its own data subcarrier locations and pilot subcarrier locations.

In table A, RU26+RU52 has fixed combination or concatenation modes. There are 4 fixed combination modes in each 80 MHz, and therefore 12 combination or concatenation modes in the 240 MHz. Details are as follows:

The 1$^{st}$ 80 MHz in the 240 MHz bandwidth includes:

the 1$^{st}$ RU26+RU52: the 8$^{th}$ RU26 and the 3$^{rd}$ RU52;

the 2$^{nd}$ RU26+RU52: the 11$^{th}$ RU26 and the 6$^{th}$ RU52;

the 3$^{rd}$ RU26+RU52: the 26$^{th}$ RU26 and the 11th RU52; and the 4$^{th}$ RU26+RU52: the 29$^{th}$ RU26 and the 14$^{th}$ RU52.

The 2$^{nd}$ 80 MHz in the 240 MHz bandwidth includes:

the 5$^{th}$ RU26+RU52: the 44$^{th}$ RU26 and the 19$^{th}$ RU52;

the 6$^{th}$ RU26+RU52: the 47$^{th}$ RU26 and the 22$^{nd}$ RU52;

the 7$^{th}$ RU26+RU52: the 62$^{nd}$ RU26 and the 27$^{th}$ RU52; and the 8$^{th}$ RU26+RU52: the 65$^{th}$ RU26 and the 30$^{th}$ RU52.

The 5$^{th}$ RU26+RU52 in the 240 MHz bandwidth is the 1$^{st}$ RU26+RU52 in the 2$^{nd}$ 80 MHz bandwidth. Implementation is the same for the following description.

The 3$^{rd}$ 80 MHz in the 240 MHz bandwidth includes:

the 9$^{th}$ RU26+RU52: the 80$^{th}$ RU26 and the 35$^{th}$ RU52;

the 10$^{th}$ RU26+RU52: the 83$^{rd}$ RU26 and the 38$^{th}$ RU52;

the 11th RU26+RU52: the 98$^{th}$ RU26 and the 43$^{rd}$ RU52; and the 12$^{th}$ RU26+RU52: the 101$^{st}$ RU26 and the 46$^{th}$ RU52.

The 9$^{th}$ RU26+RU52 in the 240 MHz bandwidth is the 1$^{st}$ RU26+RU52 in the 3$^{rd}$ 80 MHz bandwidth. Implementation is the same for the following description.

It should be understood that, each 80 MHz has 36 RU26, which are sequentially represented as the 1$^{st}$ RU26, the 2$^{nd}$ the 1$^{st}$ RU26+RU106: the 5$^{th}$ RU26 and the 1$^{st}$ RU106;

the 2$^{nd}$ RU26+RU106: the 14$^{th}$ RU26 and the 4$^{th}$ RU106;

the 3$^{rd}$ RU26+RU106: the 23$^{rd}$ RU26 and the 5$^{th}$ RU106; and the 4$^{th}$ RU26+RU106: the 32$^{nd}$ RU26 and the 8$^{th}$ RU106.

The 2$^{nd}$ 80 MHz in the 240 MHz bandwidth includes:

the 5$^{th}$ RU26+RU106: the 41$^{st}$ RU26 and the 9$^{th}$ RU106;

the 6$^{th}$ RU26+RU106: the 50$^{th}$ RU26 and the 12$^{th}$ RU106;

the 7$^{th}$ RU26+RU106: the 59$^{th}$ RU26 and the 13$^{th}$ RU106; and the 8$^{th}$ RU26+RU106: the 68$^{th}$ RU26 and the 16th RU106.

The 5$^{th}$ RU26+RU106 in the 240 MHz bandwidth is the 1$^{st}$ RU26+RU106 in the 2$^{nd}$ 80 MHz bandwidth. Implementation is the same for the following description.

The 3$^{rd}$ 80 MHz in the 240 MHz bandwidth includes:

the 9$^{th}$ RU26+RU106: the 77th RU26 and the 17th RU106;

the 10$^{th}$ RU26+RU106: the 86$^{th}$ RU26 and the 20$^{th}$ RU106;

the 11$^{th}$ RU26+RU106: the 95$^{th}$ RU26 and the 21$^{st}$ RU106; and the 12th RU26+RU106: the 104th RU26 and the 24th RU106.

The 9$^{th}$ RU26+RU106 in the 240 MHz bandwidth is the 1$^{st}$ RU26+RU106 in the 3$^{rd}$ 80 MHz bandwidth. Implementation is the same for the following description.

It should be understood that, both the X$^{th}$ RU26 and the Y$^{th}$ RU106 are represented by being sequentially numbered from left to right (from a low frequency to a high frequency). This is similar to the foregoing description, and details are not described herein again.

In table A, RU242+RU484 has fixed combination or concatenation modes. There are 4 fixed combination modes in each 80 MHz, and therefore 12 combination or concatenation modes in the 240 MHz. Details are as follows:

The 1$^{st}$ 80 MHz in the 240 MHz bandwidth includes:

the 1$^{st}$ RU242+RU484: the 1$^{st}$ RU242 and the 2$^{nd}$ RU484;

the 2$^{nd}$ RU242+RU484: the 2$^{nd}$ RU242 and the 2$^{nd}$ RU484;

the 3$^{rd}$ RU242+RU484: the 3$^{rd}$ RU242 and the 1$^{st}$ RU484; and the 4$^{th}$ RU242+RU484: the 4$^{th}$ RU242 and the 1$^{st}$ RU484.

The $2^{nd}$ 80 MHz in the 240 MHz bandwidth includes:

the 5th RU242+RU484: the 5th RU242 and the 4th RU484;

the $6^{th}$ RU242+RU484: the $6^{th}$ RU242 and the $4^{th}$ RU484;

the $7^{th}$ RU242+RU484: the $7^{th}$ RU242 and the $3^{rd}$ RU484; and the $8^{th}$ RU242+RU484: the $8^{th}$ RU242 and the $3^{rd}$ RU484.

The $5^{th}$ RU242+RU484 in the 240 MHz bandwidth is the $1^{st}$ RU242+RU484 in the $2^{nd}$ 80 MHz bandwidth. Implementation is the same for the following description.

The $3^{rd}$ 80 MHz in the 240 MHz bandwidth includes:

the $9^{th}$ RU242+RU484: the $9^{th}$ RU242 and the $6^{th}$ RU484;

the 10th RU242+RU484: the 10th RU242 and the 6th RU484;

the $11^{th}$ RU242+RU484: the $11^{th}$ RU242 and the $5^{th}$ RU484; and the $12^{th}$ RU242+RU484: the $12^{th}$ RU242 and the $5^{th}$ RU484.

The $9^{th}$ RU242+RU484 in the 240 MHz bandwidth is the $1^{st}$ RU242+RU484 in the $3^{rd}$ 80 MHz bandwidth. Implementation is the same for the following description.

It should be understood that, both the $Z^{th}$ RU242 and the $X^{th}$ RU484 are represented by being sequentially numbered from left to right (from a low frequency to a high frequency). This is similar to the foregoing description, and details are not described herein again.

In table A, RU484+RU996 has fixed combination or concatenation modes. There are 8 fixed combination modes in the 240 MHz. Details are as follows:

the $1^{st}$ RU484+RU996: the $2^{nd}$ RU484 and the $2^{nd}$ RU996;

the $2^{nd}$ RU484+RU996: the $1^{st}$ RU484 and the $2^{nd}$ RU996;

the $3^{rd}$ RU484+RU996: the $4^{th}$ RU484 and the $1^{st}$ RU996;

the $4^{th}$ RU484+RU996: the $3^{rd}$ RU484 and the $1^{st}$ RU996;

the $5^{th}$ RU484+RU996: the $4^{th}$ RU484 and the $3^{rd}$ RU996;

the $6^{th}$ RU484+RU996: the $3^{rd}$ RU484 and the $3^{rd}$ RU996;

the $7^{th}$ RU484+RU996: the $6^{th}$ RU484 and the $2^{nd}$ RU996; and the $8^{th}$ RU484+RU996: the $5^{th}$ RU484 and the $2^{nd}$ RU996.

It should be understood that, both the $X^{th}$ RU484 and the $Y^{th}$ RU996 are represented by being sequentially numbered from left to right (from a low frequency to a high frequency). This is similar to the foregoing description, and details are not described herein again.

When modes of RU242+RU484+RU996 need to be considered during design of a 240 MHz sequence, there are 16 modes in the 240 MHz. Details are as follows:

the $1^{st}$ RU242+RU484+RU996: the $2^{nd}$ RU242, the $2^{nd}$ RU484, and the $2^{nd}$ RU996;

the $2^{nd}$ RU242+RU484+RU996: the $1^{st}$ RU242, the $2^{nd}$ RU484, and the $2^{nd}$ RU996;

the $3^{rd}$ RU242+RU484+RU996: the $4^{th}$ RU242, the $1^{st}$ RU484, and the $2^{nd}$ RU996;

the 4th RU242+RU484+RU996: the $3^{rd}$ RU242, the $1^{st}$ RU484, and the $2^{nd}$ RU996;

the $5^{th}$ RU242+RU484+RU996: the $6^{th}$ RU242, the $4^{th}$ RU484, and the $1^{st}$ RU996;

the $6^{th}$ RU242+RU484+RU996: the $5^{th}$ RU242, the $4^{th}$ RU484, and the $1^{st}$ RU996;

the $7^{th}$ RU242+RU484+RU996: the $8^{th}$ RU242, the $3^{rd}$ RU484, and the $1^{st}$ RU996;

the 8th RU242+RU484+RU996: the $7^{th}$ RU242, the $3^{rd}$ RU484, and the $1^{st}$ RU996;

the $9^{th}$ RU242+RU484+RU996: the $6^{th}$ RU242, the $4^{th}$ RU484, and the $3^{rd}$ RU996;

the $10^{th}$ RU242+RU484+RU996: the $5^{th}$ RU242, the $4^{th}$ RU484, and the $3^{rd}$ RU996;

the $11^{th}$ RU242+RU484+RU996: the $8^{th}$ RU242, the $3^{rd}$ RU484, and the $3^{rd}$ RU996;

the 12th RU242+RU484+RU996: the $7^{th}$ RU242, the $3^{rd}$ RU484, and the $3^{rd}$ RU996;

the $13^{th}$ RU242+RU484+RU996: the $10^{th}$ RU242, the $6^{th}$ RU484, and the $2^{nd}$ RU996;

the $14^{th}$ RU242+RU484+RU996: the $9^{th}$ RU242, the $6^{th}$ RU484, and the $2^{nd}$ RU996;

the $15^{th}$ RU242+RU484+RU996: the 12th RU242, the $5^{th}$ RU484, and the $2^{nd}$ RU996; and the $16^{th}$ RU242+RU484+RU996: the $11^{th}$ RU242, the $5^{th}$ RU484, and the $2^{nd}$ RU996.

It should be understood that, all of the $Z^{th}$ RU242, the $X^{th}$ RU484, and the $Y^{th}$ RU996 are represented by being sequentially numbered from left to right (from a low frequency to a high frequency). This is similar to the foregoing description, and details are not described herein again.

When modes of RU484+RU2*996 need to be considered during design of a 240 MHz sequence, there are 6 modes in the 240 MHz. Details are as follows:

the $1^{st}$ RU484+RU2*996: the $2^{nd}$ RU484, the $2^{nd}$ RU996, and the $3^{rd}$ RU996;

the $2^{nd}$ RU484+RU2*996: the $1^{st}$ RU484, the $2^{nd}$ RU996, and the $3^{rd}$ RU996;

the $3^{rd}$ RU484+RU2*996: the 4th RU484, the $1^{st}$ RU996, and the $3^{rd}$ RU996;

the 4th RU484+RU2*996: the $3^{rd}$ RU484, the $1^{st}$ RU996, and the $3^{rd}$ RU996;

the $5^{th}$ RU484+RU2*996: the $6^{th}$ RU484, the $1^{st}$ RU996, and the $2^{nd}$ RU996; and the $6^{th}$ RU484+RU2*996: the $5^{th}$ RU484, the $1^{st}$ RU996, and the $2^{nd}$ RU996.

It should be understood that, both the $X^{th}$ RU484 and the $Y^{th}$ RU996 are represented by being sequentially numbered from left to right (from a low frequency to a high frequency). This is similar to the foregoing description, and details are not described herein again.

When a mode of RU996+RU996+RU996 needs to be considered during design of a 240 MHz sequence, there is 1 mode in the 240 MHz, that is, a full-bandwidth mode, specifically, for example, a combination or concatenation of the $1^{st}$ RU996, the $2^{nd}$ RU996, and the $3^{rd}$ RU996.

Modes considered for a 2×LTF sequence/4×LTF sequence over the 320 MHz bandwidth include content in table B below.

TABLE B

| | RU size | | | | | | | |
|---|---|---|---|---|---|---|---|---|
| | RU26 | RU52 | RU26 + RU52 | RU106 | RU26 + RU106 | RU242 | RU484 | RU242 + RU484 |
| Mode 1 | 36 * 4 | 16 * 4 | 4 * 4 | 8 * 4 | 4 * 4 | 4 * 4 | 2 * 4 | 4 * 4 |
| Mode 2 | 36 * 4 | 16 * 4 | 4 * 4 | 8 * 4 | 4 * 4 | 4 * 4 | 2 * 4 | 4 * 4 |
| Mode 3 | 36 * 4 | 16 * 4 | 4 * 4 | 8 * 4 | 4 * 4 | 4 * 4 | 2 * 4 | 4 * 4 |

TABLE B-continued

| | RU size | | | | | | |
|---|---|---|---|---|---|---|---|
| | RU996 | RU484 + RU996 | RU2 * 996 | RU484 + RU2 * 996 | RU3 * 996 | RU3 * 996 + RU484 | RU4 * 996 |
| Mode 1 | 1 * 4 | 4 * 2 | 2 | Not considered | 4 | 8 | 1 |
| Mode 2 | 1 * 4 | 4 * 2 | 2 | 24 | 4 | 8 | 1 |
| Mode 3 | 1 * 4 | 4 * 2 | 3 * 4 | 24 | 4 | 8 | 1 |

Mode 1: a mode with a full bandwidth, puncturing, and multiple RU combination in the 320 MHz. Mode 1 does not consider transmission in which 240 MHz is obtained by performing puncturing on the 320 MHz. In other words, sequence design mainly considers the full bandwidth, puncturing, and multiple RU modes in the 320 MHz/160+160 MHz.

Each 80 MHz has thirty-six 26-tone RUs with sequence numbers from small to large and corresponding frequencies from low to high. Implementation is similar for a 52-tone RU (RU52), a 106-tone RU (RU106), a 242-tone RU (RU242), a 484-tone RU (RU484), and a 996-tone RU (RU996).

Multiple RU combination is to allocate a plurality of RUs to one STA. Each RU still uses data subcarrier locations and pilot subcarrier locations of the RU. For example, for RU26+RU52, RU26 uses its own data subcarrier locations and pilot locations, and RU52 uses its own data subcarrier locations and pilot subcarrier locations.

In table B, RU26+RU52 has fixed combination or concatenation modes. There are 4 fixed combination modes in each 80 MHz, and therefore 16 combination or concatenation modes in the 320 MHz. Details are as follows:

the $1^{st}$ RU26+RU52: the $8^{th}$ RU26 and the $3^{rd}$ RU52;
the $2^{nd}$ RU26+RU52: the $11^{th}$ RU26 and the $6^{th}$ RU52;
the $3^{rd}$ RU26+RU52: the 26th RU26 and the $11^{th}$ RU52; and
the $4^{th}$ RU26+RU52: the $29^{th}$ RU26 and the $14^{th}$ RU52.
the $5^{th}$ RU26+RU52: the $44^{th}$ RU26 and the $19^{th}$ RU52;
the $6^{th}$ RU26+RU52: the $47^{th}$ RU26 and the $22^{nd}$ RU52;
the 7th RU26+RU52: the $62^{nd}$ RU26 and the 27th RU52; and
the $8^{th}$ RU26+RU52: the $65^{th}$ RU26 and the $30^{th}$ RU52;
the $9^{th}$ RU26+RU52: the $80^{th}$ RU26 and the $35^{th}$ RU52;
the 10th RU26+RU52: the $83^{rd}$ RU26 and the 38th RU52;
the $11^{th}$ RU26+RU52: the $98^{th}$ RU26 and the $43^{rd}$ RU52; and
the $12^{th}$ RU26+RU52: the $101^{st}$ RU26 and the $46^{th}$ RU52.
the $13^{th}$ RU26+RU52: the $116^{th}$ RU26 and the $51^{st}$ RU52;
the $14^{th}$ RU26+RU52: the $119^{th}$ RU26 and the $54^{th}$ RU52;
the $15^{th}$ RU26+RU52: the $134^{th}$ RU26 and the $59^{th}$ RU52; and
the $16^{th}$ RU26+RU52: the $137^{th}$ RU26 and the $62^{nd}$ RU52.

It should be understood that, both the $X^{th}$ RU26 and the $Y^{th}$ RU52 are represented by being sequentially numbered from left to right (from a low frequency to a high frequency). This is similar to the foregoing description, and details are not described herein again.

In table B, RU26+RU106 has fixed combination or concatenation modes. There are 4 fixed combination modes in each 80 MHz, and therefore 16 combination or concatenation modes in the 320 MHz. Details are as follows:

the $1^{st}$ RU26+RU106: the $5^{th}$ RU26 and the $1^{st}$ RU106;
the $2^{nd}$ RU26+RU106: the 14th RU26 and the $4^{th}$ RU106;
the $3^{rd}$ RU26+RU106: the $23^{rd}$ RU26 and the $5^{th}$ RU106; and
the $4^{th}$ RU26+RU106: the $32^{nd}$ RU26 and the $8^{th}$ RU106.
the $5^{th}$ RU26+RU106: the $41^{st}$ RU26 and the $9^{th}$ RU106;
the $6^{th}$ RU26+RU106: the 50th RU26 and the 12th RU106;
the $7^{th}$ RU26+RU106: the $59^{th}$ RU26 and the $13^{th}$ RU106;
the $8^{th}$ RU26+RU106: the $68^{th}$ RU26 and the $16^{th}$ RU106;
the $9^{th}$ RU26+RU106: the $77^{th}$ RU26 and the $17^{th}$ RU106;
the 10th RU26+RU106: the $86^{th}$ RU26 and the 20th RU106;
the $11^{th}$ RU26+RU106: the $95^{th}$ RU26 and the $21^{st}$ RU106;
the $12^{th}$ RU26+RU106: the $104^{th}$ RU26 and the $24^{th}$ RU106;
the $13^{th}$ RU26+RU106: the $113^{th}$ RU26 and the $25^{th}$ RU106;
the 14th RU26+RU106: the $122^{nd}$ RU26 and the 28th RU106;
the $15^{th}$ RU26+RU106: the $131^{st}$ RU26 and the $29^{th}$ RU106; and
the $16^{th}$ RU26+RU106: the $140^{th}$ RU26 and the $32^{nd}$ RU106.

It should be understood that, both the $X^{th}$ RU26 and the $Y^{th}$ RU106 are represented by being sequentially numbered from left to right (from a low frequency to a high frequency). This is similar to the foregoing description, and details are not described herein again.

In table B, RU242+RU484 has fixed combination or concatenation modes. There are 4 fixed combination modes in each 80 MHz, and therefore 16 combination or concatenation modes in the 320 MHz. Details are as follows:

the $1^{st}$ RU242+RU484: the $1^{st}$ RU242 and the $2^{nd}$ RU484;
the $2^{nd}$ RU242+RU484: the $2^{nd}$ RU242 and the $2^{nd}$ RU484;
the $3^{rd}$ RU242+RU484: the $3^{rd}$ RU242 and the $1^{st}$ RU484;
the $4^{th}$ RU242+RU484: the $4^{th}$ RU242 and the $1^{st}$ RU484;
the $5^{th}$ RU242+RU484: the $5^{th}$ RU242 and the $4^{th}$ RU484;
the $6^{th}$ RU242+RU484: the $6^{th}$ RU242 and the $4^{th}$ RU484;
the $7^{th}$ RU242+RU484: the $7^{th}$ RU242 and the $3^{rd}$ RU484;
the $8^{th}$ RU242+RU484: the $8^{th}$ RU242 and the $3^{rd}$ RU484;
the $9^{th}$ RU242+RU484: the $9^{th}$ RU242 and the $6^{th}$ RU484;
the 10th RU242+RU484: the 10th RU242 and the 6th RU484;
the $11^{th}$ RU242+RU484: the $11^{th}$ RU242 and the $5^{th}$ RU484;
the $12^{th}$ RU242+RU484: the $12^{th}$ RU242 and the $5^{th}$ RU484;
the $13^{th}$ RU242+RU484: the $13^{th}$ RU242 and the $8^{th}$ RU484;
the 14th RU242+RU484: the 14th RU242 and the 8th RU484;

the $15^{th}$ RU242+RU484: the $15^{th}$ RU242 and the $7^{th}$ RU484; and the $16^{th}$ RU242+RU484: the $16^{th}$ RU242 and the $7^{th}$ RU484.

It should be understood that, both the $X^{th}$ RU242 and the $Y^{th}$ RU484 are represented by being sequentially numbered from left to right (from a low frequency to a high frequency). This is similar to the foregoing description, and details are not described herein again.

In table B, RU484+RU996 has fixed combination or concatenation modes. There are 4 fixed combination modes in each of primary 160 MHz and secondary 160 MHz, and therefore 8 combination or concatenation modes in the 320 MHz. Details are as follows:

the $1^{st}$ RU484+RU996: the $2^{nd}$ RU484 and the $2^{nd}$ RU996;

the $2^{nd}$ RU484+RU996: the $1^{st}$ RU484 and the $2^{nd}$ RU996;

the $3^{rd}$ RU484+RU996: the 4th RU484 and the $1^{st}$ RU996;

the $4^{th}$ RU484+RU996: the $3^{rd}$ RU484 and the $1^{st}$ RU996;

the $5^{th}$ RU484+RU996: the $6^{th}$ RU484 and the $4^{th}$ RU996;

the $6^{th}$ RU484+RU996: the $5^{th}$ RU484 and the $4^{th}$ RU996;

the $7^{th}$ RU484+RU996: the 8th RU484 and the $3^{rd}$ RU996; and the 8th RU484+RU996: the $7^{th}$ RU484 and the $3^{rd}$ RU996.

It should be understood that, both the $X^{th}$ RU484 and the $Y^{th}$ RU996 are represented by being sequentially numbered from left to right (from a low frequency to a high frequency). This is similar to the foregoing description, and details are not described herein again.

RU2*996 covers two cases of primary 160 MHz and secondary 160 MHz. Details are as follows:

the $1^{st}$ RU2*996: the $1^{st}$ RU996 and the $2^{nd}$ RU996; and the $2^{nd}$ RU2*996: the $3^{rd}$ RU996 and the 4th RU996.

It should be understood that, the $X^{th}$ RU996 is represented by being sequentially numbered from left to right (from a low frequency to a high frequency). This is similar to the foregoing description, and details are not described herein again.

RU3*996 refers to a combination of any three of four RU996. Details are as follows:

the $1^{st}$ RU3*996: the $1^{st}$ RU996, the $3^{rd}$ RU996, and the 4th RU996;

the $2^{nd}$ RU3*996: the $1^{st}$ RU996, the $2^{nd}$ RU996, and the 4th RU996;

the $3^{rd}$ RU3*996: the $1^{st}$ RU996, the $2^{nd}$ RU996, and the $3^{rd}$ RU996; and the 4th RU3*996: the $2^{nd}$ RU996, the $3^{rd}$ RU996, and the 4th RU996.

It should be understood that, the $X^{th}$ RU996 is represented by being sequentially numbered from left to right (from a low frequency to a high frequency). This is similar to the foregoing description, and details are not described herein again.

For combination modes of RU3*996+RU484, details are as follows:

the $1^{st}$ RU3*996+RU484: the $2^{nd}$ RU484, the $2^{nd}$ RU996, the $3^{rd}$ RU996, and the 4th RU996;

the $2^{nd}$ RU3*996+RU484: the $1^{st}$ RU484, the $2^{nd}$ RU996, the $3^{rd}$ RU996, and the 4th RU996;

the $3^{rd}$ RU3*996+RU484: the $1^{st}$ RU996, the 4th RU484, the $3^{rd}$ RU996, and the $4^{th}$ RU996;

the 4th RU3*996+RU484: the $1^{st}$ RU996, the $3^{rd}$ RU484, the $3^{rd}$ RU996, and the 4th RU996;

the $5^{th}$ RU3*996+RU484: the $1^{st}$ RU996, the $2^{nd}$ RU996, the $6^{th}$ RU484, and the $4^{th}$ RU996;

the 6th RU3*996+RU484: the $1^{st}$ RU996, the $2^{nd}$ RU996, the 5th RU484, and the 4th RU996;

the 7th RU3*996+RU484: the $1^{st}$ RU996, the $2^{nd}$ RU996, the $3^{rd}$ RU996, and the $8^{th}$ RU484; and the 8th RU3*996+RU484: the $1^{st}$ RU996, the $2^{nd}$ RU996, the $3^{rd}$ RU996, and the 7th RU484.

It should be understood that, the $X^{th}$ RU996 and the $Y^{th}$ RU484 are represented by being sequentially numbered from left to right (from a low frequency to a high frequency). This is similar to the foregoing description, and details are not described herein again.

A combination mode of RU4*996+RU484 is a full-bandwidth mode of the 320 MHz. Details are as follows: the $1^{st}$ RU996, the $2^{nd}$ RU996, the $3^{rd}$ RU996, and the 4th RU996.

It should be understood that, the $X^{th}$ RU996 is represented by being sequentially numbered from left to right (from a low frequency to a high frequency). This is similar to the foregoing description, and details are not described herein again.

Mode 2: a mode with a full bandwidth, puncturing, and multiple RU combination modes in the 320 MHz, considering compatibility with RU2*996+RU484 in the 240 MHz.

Mode 2 considers compatibility with some circumstances in the 240 MHz. That is, when any 80 MHz is punctured from the 320 MHz or is not considered, a remaining RU2*996+RU484 formed by not considering one RU484 in RU3*996 is not considered. A puncturing scenario thereof is similar to patterns 14 to 49 (24 in total) in the puncturing scenario (A) of the 320 MHz.

Mode 3: a mode with a full bandwidth, puncturing, and multiple RU combination modes in the 320 MHz, considering compatibility with a full bandwidth, puncturing, and multiple RU combination in the 240 MHz.

Mode 3 considers compatibility with all circumstances with an MRU and puncturing in the 240 MHz. That is, when any 80 MHz is punctured from the 320 MHz or is not considered, a remaining RU2*996+RU484 formed by not considering one RU484 in RU3*996 is not considered. A puncturing scenario thereof is similar to patterns 14 to 49 in the puncturing scenario (A) of the 320 MHz. In addition, the 240 MHz puncturing scenario is considered. Therefore, a quantity of cases of RU2*996 in mode 3 changes to 12 from 2 in mode 2.

When modes of RU242+RU484+RU996 need to be considered during design of a 320 MHz sequence, there are 16 modes in the 320 MHz. Details are as follows:

the $1^{st}$ RU242+RU484+RU996: the $2^{nd}$ RU242, the $2^{nd}$ RU484, and the $2^{nd}$ RU996;

the $2^{nd}$ RU242+RU484+RU996: the $1^{st}$ RU242, the $2^{nd}$ RU484, and the $2^{nd}$ RU996;

the $3^{rd}$ RU242+RU484+RU996: the $4^{th}$ RU242, the $1^{st}$ RU484, and the $2^{nd}$ RU996;

the $4^{th}$ RU242+RU484+RU996: the $3^{rd}$ RU242, the $1^{st}$ RU484, and the $2^{nd}$ RU996;

the $5^{th}$ RU242+RU484+RU996: the $6^{th}$ RU242, the 4th RU484, and the $1^{st}$ RU996;

the $6^{th}$ RU242+RU484+RU996: the $5^{th}$ RU242, the $4^{th}$ RU484, and the $1^{st}$ RU996;

the $7^{th}$ RU242+RU484+RU996: the $8^{th}$ RU242, the $3^{rd}$ RU484, and the $1^{st}$ RU996;

the 8th RU242+RU484+RU996: the $7^{th}$ RU242, the $3^{rd}$ RU484, and the $1^{st}$ RU996;

the $9^{th}$ RU242+RU484+RU996: the $10^{th}$ RU242, the $6^{th}$ RU484, and the $4^{th}$ RU996;

the $10^{th}$ RU242+RU484+RU996: the $9^{th}$ RU242, the $6^{th}$ RU484, and the $4^{th}$ RU996;

the $11^{th}$ RU242+RU484+RU996: the $12^{th}$ RU242, the $5^{th}$ RU484, and the $4^{th}$ RU996;

the 12th RU242+RU484+RU996: the 11th RU242, the $5^{th}$ RU484, and the 4th RU996;

the $13^{th}$ RU242+RU484+RU996: the $14^{th}$ RU242, the $8^{th}$ RU484, and the $3^{rd}$ RU996;

the $14^{th}$ RU242+RU484+RU996: the $13^{th}$ RU242, the $8^{th}$ RU484, and the $3^{rd}$ RU996;

the $15^{th}$ RU242+RU484+RU996: the $16^{th}$ RU242, the $7^{th}$ RU484, and the $3^{rd}$ RU996; and the $16^{th}$ RU242+RU484+RU996: the $15^{th}$ RU242, the $7^{th}$ RU484, and the $3^{rd}$ RU996.

This embodiment of this application provides a plurality of possible LTF sequences. Some LTF sequences each have a smallest PAPR value in a full bandwidth. Some LTF sequences have a smallest maximum PAPR in comprehensive consideration of a full bandwidth and a plurality of puncturing patterns, and therefore they have optimal comprehensive performance in the full bandwidth and the plurality of puncturing patterns. Some LTF sequences comprehensively consider a PAPR in a full bandwidth, a plurality of puncturing patterns, and a plurality of multiple RUs, and therefore the LTF sequences have optimal comprehensive performance in the full bandwidth, the plurality of puncturing patterns, and the plurality of multiple RUs.

4. After the Content Related to the Embodiments of this Application is Described, the Following Describes Details of the Embodiments of this Application.

Figure 5:
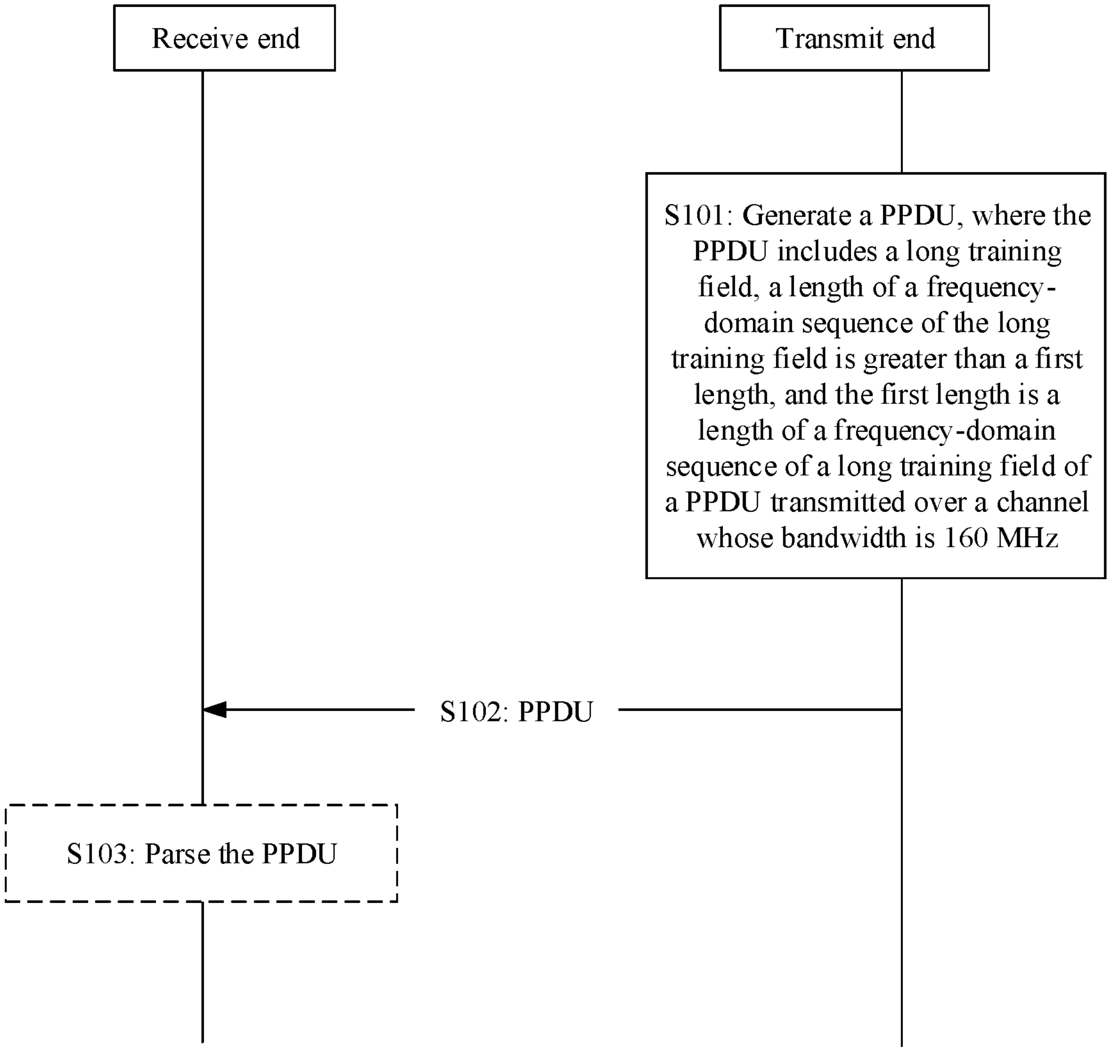
FIG. 5 is a flowchart of a method according to an embodiment of this application.

As shown in FIG. 5, an embodiment of this application provides a method for transmitting a physical layer protocol data unit. The method includes the following steps.

S101: Generate a physical layer protocol data unit (PPDU), where the PPDU includes a long training field (LTF), a length of a frequency-domain sequence of the LTF is greater than a first length, and the first length is a length of a frequency-domain sequence of an LTF of a PPDU transmitted over a channel whose bandwidth is 160 MHz.

S102: Send the PPDU over a target channel, where a bandwidth of the target channel is greater than 160 MHz.

This embodiment of this application focuses on frequency-domain sequences of LTFs of PPDUs transmitted over 240 MHz and 320 MHz. Therefore, the foregoing steps may be simplified as follows:

S201: Generate a PPDU, where the PPDU is transmitted over a channel whose bandwidth is 240 MHz/320 MHz, the PPDU includes an LTF, and a frequency-domain sequence of the LTF is any one of a plurality of possible LTF frequency-domain sequences provided below.

S202: Send the PPDU over a channel whose bandwidth is 240 MHz/320 MHz.

This embodiment of this application focuses on a plurality of possible frequency-domain sequences of LTFs (a frequency-domain sequence of an LTF is referred to as an LTF sequence for short below). Before the plurality of possible LTF sequences provided in this embodiment of this application are described, a method for constructing an LTF sequence is first described. A specific method is as follows:

i. determining a sequence structure of the LTF sequence; and ii. determining the LTF sequence through computer-based searching based on the following design criteria, including:

(1) a relatively small PAPR: a requirement on linear power amplification is reduced;

(2) a phase rotation at a non-pilot location: a plurality of streams are considered (a size of a P matrix is 2×2, 4×4, 6×6, 8×8, 12×12, or 16×16);

(3) consideration of a puncturing issue; and (4) consideration of multiple RU joint transmission or multiple RU combination (a plurality of RUs are allocated to a same STA).

Alternatively, in other words, the design criteria includes: consideration of a PAPR value in a case of a full bandwidth, a plurality of puncturing patterns, and a plurality of multiple RU combinations; and consideration of a phase rotation at a non-pilot location.

Specifically, the sequence design takes an optimal maximum PAPR in a plurality of cases (for example, a full bandwidth, puncturing, and a multiple RU) into consideration. Small RUs are concatenated into a large RU in a transmission bandwidth, and a sequence with an optimal PAPR on each type of RU (a multiple RU combination or a single RU) is selected. Because an LTF is used for MIMO channel estimation, and a quantity of streams is increased to 16 in the next-generation Wi-Fi standard, a maximum PAPR value of an obtained LTF is a result of considering a multi-stream scenario (for example, a size of a P matrix is 2×2, 4×4, 6×6, 8×8, 12×12, or 16×16) at a non-pilot location.

The following describes the plurality of possible LTF sequences provided in this embodiment of this application.

1. 1×LTF sequence in the 240 MHz bandwidth (referred to as an LTF1×240M sequence for short)

1-1. There is a possible LTF1×240M sequence=[LTF1×80M $0_{23}$ $0_{23}$−LTF1×80M]. LTF1×80M is an 80 MHz 1×LTF sequence in the 802.11ax standard. For a specific sequence, refer to the 802.11ax standard.

The LTF1×240M sequence has relatively low PAPR values in various puncturing patterns for the 240 MHz.

Specifically, when IFFTsize in fast Fourier transform is set to 3072, PAPR values of the LTF1×240M sequence in puncturing patterns 1 to 10 for the 240 MHz are listed in table 7 below.

TABLE 7

| Sequence: LTF1 × 240M sequence = [LTF1 × 80M $0_{23}$ $0_{23}$ − LTF1 × 80M] | PAPR [dB] |
|---|---|
| Pattern 1: 240 MHz [1 1 1 1 1 1 1 1 1 1 1 1] | 7.5154 |
| Pattern 2: 200 MHz [0 0 1 1 1 1 1 1 1 1 1 1] | 7.0253 |
| Pattern 3: 200 MHz [1 1 0 0 1 1 1 1 1 1 1 1] | 7.1208 |
| Pattern 4: 200 MHz [1 1 1 1 0 0 1 1 1 1 1 1] | 8.2661 |
| Pattern 5: 200 MHz [1 1 1 1 1 1 0 0 1 1 1 1] | 7.9758 |
| Pattern 6: 200 MHz [1 1 1 1 1 1 1 1 0 0 1 1] | 7.1286 |
| Pattern 7: 200 MHz [1 1 1 1 1 1 1 1 1 1 0 0] | 6.9607 |
| Pattern 8: 160 MHz [0 0 0 0 1 1 1 1 1 1 1 1] | 8.148 |
| Pattern 9: 160 MHz [1 1 1 1 0 0 0 0 1 1 1 1] | 8.3072 |
| Pattern 10: 160 MHz [1 1 1 1 1 1 1 1 0 0 0 0] | 7.9794 |
| Pattern 9 has a maximum PAPR value. | 8.3072 |

Specifically, when IFFTsize in fast Fourier transform is set to 4096, PAPR values of the LTF1×240M sequence in puncturing patterns 1 to 10 for the 240 MHz are listed in table 8 below.

TABLE 8

| Sequence: LTF1 × 240M sequence = [LTF1 × 80M $0_{23}$ $0_{23}$ − LTF1 × 80M] | PAPR [dB] |
|---|---|
| Pattern 1: 240 MHz [1 1 1 1 1 1 1 1 1 1 1 1] | 7.5154 |
| Pattern 2: 200 MHz [x x 1 1 1 1 1 1 1 1 1 1] | 7.1151 |
| Pattern 3: 200 MHz [1 1 x x 1 1 1 1 1 1 1 1] | 7.2152 |
| Pattern 4: 200 MHz [1 1 1 1 x x 1 1 1 1 1 1] | 8.2661 |
| Pattern 5: 200 MHz [1 1 1 1 1 1 x x 1 1 1 1] | 7.9758 |
| Pattern 6: 200 MHz [1 1 1 1 1 1 1 1 x x 1 1] | 7.2433 |

TABLE 8-continued

| Sequence: LTF1 × 240M sequence = [LTF1 × 80M $0_{23}$ $0_{23}$ − LTF1 × 80M] | PAPR [dB] |
|---|---|
| Pattern 7: 200 MHz [1 1 1 1 1 1 1 1 1 1 x x] | 7.0408 |
| Pattern 8: 160 MHz [x x x x 1 1 1 1 1 1 1 1] | 8.148 |
| Pattern 9: 160 MHz [1 1 1 1 x x x x 1 1 1 1] | 8.3072 |
| Pattern 10: 160 MHz [1 1 1 1 1 1 1 1 x x x x] | 8.0064 |
| Pattern 9 has a maximum PAPR value. | 8.3072 |

A method for obtaining the LTF1×240M sequence in 1-1 includes:

i. determining a sequence structure of the LTF1×240M sequence, where the sequence structure of the LTF1×240M sequence is [LTF1×80M $0_{23}$±LTF1×80M $0_{23}$±LTF1×80M]; and ii. determining the LTF1×240M sequence=[LTF1×80M $0_{23}$ LTF1×80M $0_{23}$−LTF1×80M] through computer-based searching based on the following design criteria, including: (1) a relatively small PAPR: a requirement on linear power amplification is reduced; (2) a phase rotation at a non-pilot location: a plurality of streams are considered (a size of a P matrix is 1×1, 2×2, 4×4, 6×6, 8×8, 12×12, or 16×16); (3) consideration of a puncturing issue; and (4) consideration of multiple RU joint transmission or multiple RU combination (a plurality of RUs are allocated to a same STA).

In other words, the provided LTF1×240M sequence has a minimum PAPR value when a full bandwidth, various puncturing patterns, and a plurality of streams are considered. Based on different puncturing patterns, an LTF1×240M sequence=[LTF1×80M $0_{23}$ LTF1×80M $0_{23}$ LTF1×80M], an LTF1×240M sequence=[LTF1×80M $0_{23}$−LTF1×80M $0_{23}$ LTF1×80M], or an LTF1×240M sequence=[LTF1×80M $0_{23}$−LTF1×80M $0_{23}$−LTF1×80M] may alternatively be selected.

1-2. There is another possible LTF1×240M sequence=[LTF1×160M $0_{23}$−LTF1×80M]. LTF1×160M is a 160 MHz 1×LTF sequence in the 802.11ax standard. For a specific sequence, refer to the 802.11ax standard. LTF1×80M is an 80 MHz 1×LTF sequence in the 802.11ax standard. For a specific sequence, refer to the 802.11ax standard.

The LTF1×240M sequence has relatively low PAPR values in various puncturing patterns for the 240 MHz.

Specifically, when IFFTsize in fast Fourier transform is set to 3072, PAPR values of the LTF1×240M sequence in puncturing patterns 1 to 10 for the 240 MHz are listed in table 9 below.

TABLE 9

| Sequence: LTF1 × 240M sequence = [LTF1 × 160M $0_{23}$ − LTF1 × 80M] | PAPR [dB] |
|---|---|
| Pattern 1: 240 MHz [1 1 1 1 1 1 1 1 1 1 1 1] | 7.7825 |
| Pattern 2: 200 MHz [0 0 1 1 1 1 1 1 1 1 1 1] | 7.7008 |
| Pattern 3: 200 MHz [1 1 0 0 1 1 1 1 1 1 1 1] | 7.0798 |
| Pattern 4: 200 MHz [1 1 1 1 0 0 1 1 1 1 1 1] | 8.1436 |
| Pattern 5: 200 MHz [1 1 1 1 1 1 0 0 1 1 1 1] | 7.9758 |
| Pattern 6: 200 MHz [1 1 1 1 1 1 1 1 0 0 1 1] | 7.325 |
| Pattern 7: 200 MHz [1 1 1 1 1 1 1 1 1 1 0 0] | 7.4913 |
| Pattern 8: 160 MHz [0 0 0 0 1 1 1 1 1 1 1 1] | 6.8122 |
| Pattern 9: 160 MHz [1 1 1 1 0 0 0 0 1 1 1 1] | 8.3072 |
| Pattern 10: 160 MHz [1 1 1 1 1 1 1 1 0 0 0 0] | 6.2683 |
| Pattern 9 has a maximum PAPR value. | 8.3072 |

Specifically, when IFFTsize in fast Fourier transform is set to 4096, PAPR values of the LTF1×240M sequence in puncturing patterns 1 to 10 for the 240 MHz are listed in table 10 below.

TABLE 10

| Sequence: LTF1 × 240M sequence = [LTF1 × 160M $0_{23}$ − LTF1 × 80M] | PAPR [dB] |
|---|---|
| Pattern 1: 240 MHz [1 1 1 1 1 1 1 1 1 1 1 1] | 7.7825 |
| Pattern 2: 200 MHz [x x 1 1 1 1 1 1 1 1 1 1] | 7.7565 |
| Pattern 3: 200 MHz [1 1 x x 1 1 1 1 1 1 1 1] | 7.0798 |
| Pattern 4: 200 MHz [1 1 1 1 x x 1 1 1 1 1 1] | 8.1436 |
| Pattern 5: 200 MHz [1 1 1 1 1 1 x x 1 1 1 1] | 7.9758 |
| Pattern 6: 200 MHz [1 1 1 1 1 1 1 1 x x 1 1] | 7.325 |
| Pattern 7: 200 MHz [1 1 1 1 1 1 1 1 1 1 x x] | 7.5085 |
| Pattern 8: 160 MHz [x x x x 1 1 1 1 1 1 1 1] | 6.8632 |
| Pattern 9: 160 MHz [1 1 1 1 x x x x 1 1 1 1] | 8.3072 |
| Pattern 10: 160 MHz [1 1 1 1 1 1 1 1 x x x x] | 6.2902 |
| Pattern 9 has a maximum PAPR value. | 8.3072 |

In a method for obtaining the LTF1×240M sequence in 1-2, a sequence structure of the LTF1×240M sequence that is determined in the method is [±LTF1×160M $0_{23}$±LTF1×80M]. Apart from this, other methods are the same as the foregoing sequence construction method.

1-3. There is another possible LTF1×240M sequence=[LTF1×80 $MHz_{left}$ 0−LTF1×80 $MHz_{right}$ $0_{23}$−LTF1×80 $MHz_{left}$ 0 LTF1×80 $MHz_{right}$ $0_{23}$ LTF1×80 $MHz_{left}$ 0 LTF1×80 $MHz_{right}$]. LTF1×80 $MHz_{left}$ is an 80 $MHz_{left}$ 1×LTF sequence in the 802.11ax standard. For a specific sequence, refer to the 802.11ax standard. LTF1×80 $MHz_{right}$ is an 80 $MHz_{right}$ 1×LTF sequence in the 802.11ax standard. For a specific sequence, refer to the 802.11ax standard.

The LTF1×240M sequence has a relatively low PAPR value in puncturing pattern 1 for the 240 MHz. Specifically, the PAPR value of the LTF1×240M sequence in puncturing pattern 1 for the 240 MHz is 7.3553 dB.

In a method for obtaining the LTF1×240M sequence in 1-3, a sequence structure of the LTF1×240M sequence that is determined in the method is [LTF1×80 $MHz_{left}$ 0±LTF1×80 $MHz_{right}$ $0_{23}$±LTF1×80 $MHz_{left}$ 0±LTF1×80 $MHz_{right}$ $0_{23}$±LTF1×80 $MHz_{left}$ 0±LTF1×80 $MHz_{right}$]. Apart from this, other methods are the same as the foregoing sequence construction method.

1-4. There is another possible LTF1×240M sequence=[LTF1×80 $MHz_{left}$ 0 LTF1×80 $MHz_{right}$ $0_{23}$ LTF1×80 $MHz_{left}$ 0 LTF1×80 $MHz_{right}$ $0_{23}$−LTF1×80 $MHz_{left}$ 0−LTF1×80 $MHz_{right}$]. LTF1×80 $MHz_{left}$ is an 80 $MHz_{left}$ 1×LTF sequence in the 802.11ax standard. For a specific sequence, refer to the 802.11ax standard. LTF1×80 $MHz_{right}$ is an 80 $MHz_{right}$ 1×LTF sequence in the 802.11ax standard. For a specific sequence, refer to the 802.11ax standard.

The LTF1×240M sequence has relatively low PAPR values in various puncturing patterns for the 240 MHz.

Specifically, when IFFTsize in fast Fourier transform is set to 3072, PAPR values of the LTF1×240M sequence in puncturing patterns 1 to 10 for the 240 MHz are listed in table 11 below.

TABLE 11

| Sequence: LTF1 × 240M sequence = [LTF1 × 80 $MHz_{left}$ 0 LTF1 × 80 $MHz_{right}$ $0_{23}$ LTF1 × 80 $MHz_{left}$ 0 LTF1 × 80 $MHz_{right}$ $0_{23}$ − LTF1 × 80 $MHz_{left}$ 0 − LTF1 × 80 $MHz_{right}$] | PAPR [dB] |
|---|---|
| Pattern 1: 240 MHz [1 1 1 1 1 1 1 1 1 1 1 1] | 7.5154 |
| Pattern 2: 200 MHz [x x 1 1 1 1 1 1 1 1 1 1] | 7.0253 |
| Pattern 3: 200 MHz [1 1 x x 1 1 1 1 1 1 1 1] | 7.1208 |
| Pattern 4: 200 MHz [1 1 1 1 x x 1 1 1 1 1 1] | 8.2661 |
| Pattern 5: 200 MHz [1 1 1 1 1 1 x x 1 1 1 1] | 7.9758 |
| Pattern 6: 200 MHz [1 1 1 1 1 1 1 1 x x 1 1] | 7.1286 |
| Pattern 7: 200 MHz [1 1 1 1 1 1 1 1 1 1 x x] | 6.9607 |
| Pattern 8: 160 MHz [x x x x 1 1 1 1 1 1 1 1] | 8.148 |

TABLE 11-continued

| Sequence: LTF1 × 240M sequence = [LTF1 × 80 $MHz_{left}$ 0 LTF1 × 80 $MHz_{right}$ $0_{23}$ LTF1 × 80 $MHz_{left}$ 0 LTF1 × 80 $MHz_{right}$ $0_{23}$ − LTF1 × 80 $MHz_{left}$ 0 − LTF1 × 80 $MHz_{right}$] | PAPR [dB] |
|---|---|
| Pattern 9: 160 MHz [1 1 1 1 x x x x 1 1 1 1] | 8.3072 |
| Pattern 10: 160 MHz [1 1 1 1 1 1 1 1 x x x x] | 7.9794 |
| Pattern 9 has a maximum PAPR value. | 8.3072 |

Specifically, when IFFTsize in fast Fourier transform is set to 4096, PAPR values of the LTF1×240M sequence in puncturing patterns 1 to 10 for the 240 MHz are listed in table 12 below.

TABLE 12

| Sequence: LTF1 × 240M sequence = [LTF1 × 80 $MHz_{left}$ 0 LTF1 × 80 $MHz_{right}$ $0_{23}$ LTF1 × 80 $MHz_{left}$ 0 LTF1 × 80 $MHz_{right}$ $0_{23}$ − LTF1 × $80MHz_{left}$ 0 − LTF1 × 80 $MHz_{right}$] | PAPR [dB] |
|---|---|
| Pattern 1: 240 MHz [1 1 1 1 1 1 1 1 1 1 1 1] | 7.5154 |
| Pattern 2: 200 MHz [x x 1 1 1 1 1 1 1 1 1 1] | 7.1151 |
| Pattern 3: 200 MHz [1 1 x x 1 1 1 1 1 1 1 1] | 7.2152 |
| Pattern 4: 200 MHz [1 1 1 1 x x 1 1 1 1 1 1] | 8.2661 |
| Pattern 5: 200 MHz [1 1 1 1 1 1 x x 1 1 1 1] | 7.9758 |
| Pattern 6: 200 MHz [1 1 1 1 1 1 1 1 x x 1 1] | 7.2433 |
| Pattern 7: 200 MHz [1 1 1 1 1 1 1 1 1 1 x x] | 7.0408 |
| Pattern 8: 160 MHz [x x x x 1 1 1 1 1 1 1 1] | 8.148 |
| Pattern 9: 160 MHz [1 1 1 1 x x x x 1 1 1 1] | 8.3072 |
| Pattern 10: 160 MHz [1 1 1 1 1 1 1 1 x x x x] | 8.0064 |
| Pattern 9 has a maximum PAPR value. | 8.3072 |

In a method for obtaining the LTF1×240M sequence in 1-4, a sequence structure of the LTF1×240M sequence that is determined in the method is [LTF1×80 $MHz_{left}$ 0±LTF1×80 $MHz_{right}$ $0_{23}$±LTF1×80 $MHz_{left}$ 0±LTF1×80 $MHz_{right}$ $0_{23}$±LTF1×80 $MHz_{left}$ 0±LTF1×80 $MHz_{right}$]. Apart from this, other methods are the same as the foregoing sequence construction method.

2. 1×LTF Sequence in the 320 MHz Bandwidth (Referred to as an LTF1×320M Sequence for Short)

2-1. There is a possible LTF1×320M sequence=[LTF1×80M $0_{23}$ LTF1×80M $0_{23}$−LTF1×80M $0_{23}$−LTF1×80M]. LTF1×80M is an 80 MHz 1×LTF sequence in the 802.11ax standard. For a specific sequence, refer to the 802.11ax standard. Based on different puncturing patterns, an LTF1×320M sequence=[LTF1×80M $0_{23}$ LTF1×80M $0_{23}$ LTF1×80M $0_{23}$−LTF1×80M], an LTF1×320M sequence=[LTF1×80M $0_{23}$ LTF1×80M $0_{23}$ LTF1×80M $0_{23}$ LTF1×80M], an LTF1×320M sequence=[LTF1×80M $0_{23}$−LTF1×80M $0_{23}$ LTF1×80M $0_{23}$ LTF1×80M], an LTF1×320M sequence=[LTF1×80M $0_{23}$−LTF1×80M $0_{23}$−LTF1×80M $0_{23}$ LTF1×80M], an LTF1×320M sequence=[LTF1×80M $0_{23}$−LTF1×80M $0_{23}$−LTF1×80M $0_{23}$−LTF1×80M], or the like may alternatively be selected.

The LTF1×320M sequence has relatively low PAPR values in the puncturing patterns in (A) of the 320 MHz (that is, 240 MHz puncturing is compatible). For example, a PAPR value of the LTF1×320M sequence in a puncturing pattern in the puncturing patterns in (A) of the 320 MHz is 9.0837 dB. PAPR values in the other puncturing patterns each are less than 9.0837 dB. For example, a PAPR value is 8.9944 dB in puncturing pattern 1.

Specifically, in the puncturing patterns in (A) of the 320 MHz, PAPR values of the LTF1×320M sequence in puncturing patterns X to Y for the 320 MHz are listed in table 13 below.

TABLE 13

| | | | | | | | | |
|---|---|---|---|---|---|---|---|---|
| Pattern 1 | | | | 8.9944 | | | | |
| Patterns 2-9 | 8.0424 | 8.223 | 8.8837 | 8.9778 | 9.0837 | 8.9009 | 8.2149 | 8.2885 |
| Patterns 10-13 | 8.9613 | 8.9613 | 7.5154 | | | 7.5154 | | |
| Patterns 14-19 | 8.2709 | 8.3622 | 8.7755 | 8.5458 | 8.6197 | | 8.5826 | |
| Patterns 23-28 | 8.5199 | 8.4525 | 8.7406 | 8.6802 | 8.1251 | | 8.2758 | |
| Patterns 32-37 | 7.1151 | 7.2152 | 8.2661 | 7.9758 | 7.2433 | | 7.0408 | |
| Patterns 41-46 | 7.2055 | 6.9584 | 8.1436 | 8.0593 | 7.5331 | | 6.9584 | |
| Patterns 20-22 | 8.0064 | 8.148 | | | | 8.3072 | | |
| Patterns 29-31 | 8.3072 | 8.148 | | | | 8.0064 | | |
| Patterns 38-40 | 8.148 | 8.3072 | | | | 8.0064 | | |
| Patterns 47-49 | 8.0064 | 8.3072 | | | | 8.148 | | |

PAPR values of the LTF1×320M sequence in the puncturing patterns in (B) of the 320 MHz (that is, 240 MHz puncturing is incompatible) are listed in table 14 below.

TABLE 14

| Sequence: LTF1 × 320M = [LTF1 × 80M $0_{23}$ LTF1 × 80M $0_{23}$ − LTF1 × 80M $0_{23}$ − LTF1 × 80M] | PAPR [dB] |
|---|---|
| Pattern 1: 320 MHz [1 1 1 1 1 1 1 1 1 1 1 1 1 1 1 1] | 8.9944 |
| Pattern 2: 280 MHz [x x 1 1 1 1 1 1 1 1 1 1 1 1 1 1] | 8.0424 |
| Pattern 3: 280 MHz [1 1 x x 1 1 1 1 1 1 1 1 1 1 1 1] | 8.2230 |
| Pattern 4: 280 MHz [1 1 1 1 x x 1 1 1 1 1 1 1 1 1 1] | 8.8837 |
| Pattern 5: 280 MHz [1 1 1 1 1 1 x x 1 1 1 1 1 1 1 1] | 8.9778 |
| Pattern 6: 280 MHz [1 1 1 1 1 1 1 1 x x 1 1 1 1 1 1] | 9.0837 |
| Pattern 7: 280 MHz [1 1 1 1 1 1 1 1 1 1 x x 1 1 1 1] | 8.9009 |
| Pattern 8: 280 MHz [1 1 1 1 1 1 1 1 1 1 1 1 x x 1 1] | 8.2149 |
| Pattern 9: 280 MHz [1 1 1 1 1 1 1 1 1 1 1 1 1 1 x x] | 8.2885 |
| Pattern 10: 240 MHz [1 1 1 1 x x x x 1 1 1 1 1 1 1 1] | 8.9613 |
| Pattern 11: 240 MHz [1 1 1 1 1 1 1 1 x x x x 1 1 1 1] | 8.9613 |
| Pattern 12: 240 MHz [1 1 1 1 1 1 1 1 1 1 1 1 x x x x] | 7.5154 |
| Pattern 13: 240 MHz [x x x x 1 1 1 1 1 1 1 1 1 1 1 1] | 7.5154 |
| Pattern 6 has a maximum PAPR value. | 9.0837 |

A method for obtaining the LTF1×320M sequence in 2-1 includes:

i. determining a sequence structure of the LTF1×320M sequence, where the sequence structure of the LTF1×320M sequence is [LTF1×80M $0_{23}$±LTF1×80M $0_{23}$±LTF1×80M $0_{23}$±LTF1×80M]; and ii. determining the LTF1×320M sequence=[LTF1×80M $0_{23}$ LTF1×80M $0_{23}$−LTF1×80M $0_{23}$−LTF1×80M] through computer-based searching based on the following design criteria, including: (1) a relatively small PAPR: a requirement on linear power amplification is reduced; (2) a phase rotation at a non-pilot location: a plurality of streams are considered (a size of a P matrix is 2×2, 4×4, 6×6, 8×8, 12×12, or 16×16); (3) consideration of a puncturing issue; and (4) consideration of multiple RU joint transmission or multiple RU combination (a plurality of RUs are allocated to a same STA).

2-2. There is another possible LTF1×320M sequence=[LTF1×80M $0_{23}$ LTF1×80M $0_{23}$−LTF1×80M $0_{23}$ LTF1×80M]. LTF1×80M is an 80 MHz 1×LTF sequence in the 802.11ax standard. For a specific sequence, refer to the 802.11ax standard.

The LTF1×320M sequence has relatively low PAPR values in the puncturing patterns in (B) of the 320 MHz (that is, 240 MHz puncturing is incompatible). Specifically, a PAPR value of the LTF1×320M sequence in puncturing pattern 1 for the 320 MHz is 7.5364 dB.

2-3. There is another possible LTF1×320M sequence=[LTF1×160M $0_{23}$ LTF1×160M]. LTF1×160M is a 160 MHz 1×LTF sequence in the 802.11ax standard. For a specific sequence, refer to the 802.11ax standard.

The LTF1×320M sequence has relatively low PAPR values in various puncturing patterns for the 320 MHz.

For example, a PAPR value of the LTF1×320M sequence in a puncturing pattern in the puncturing patterns in (A) of the 320 MHz is 9.4002 dB. PAPR values in the other puncturing patterns each are less than 9.4002 dB. For example, a PAPR value is 8.4364 dB in puncturing pattern 1.

For another example, in the puncturing patterns in (B) of the 320 MHz (that is, 240 MHz puncturing is incompatible), PAPR values of the LTF1×320M sequence in puncturing patterns 1 to 13 for the 320 MHz are listed in table 15 below.

TABLE 15

| Sequence: LTF1 × 320M = [LTF1 × 160M $0_{23}$ − LTF1 × 160M] | PAPR [dB] |
|---|---|
| Pattern 1: 320 MHz [1 1 1 1 1 1 1 1 1 1 1 1 1 1 1 1] | 8.4364 |
| Pattern 2: 280 MHz [x x 1 1 1 1 1 1 1 1 1 1 1 1 1 1] | 8.6954 |
| Pattern 3: 280 MHz [1 1 x x 1 1 1 1 1 1 1 1 1 1 1 1] | 8.3911 |
| Pattern 4: 280 MHz [1 1 1 1 x x 1 1 1 1 1 1 1 1 1 1] | 8.6469 |
| Pattern 5: 280 MHz [1 1 1 1 1 1 x x 1 1 1 1 1 1 1 1] | 8.1835 |
| Pattern 6: 280 MHz [1 1 1 1 1 1 1 1 x x 1 1 1 1 1 1] | 8.202 |
| Pattern 7: 280 MHz [1 1 1 1 1 1 1 1 1 1 x x 1 1 1 1] | 8.1564 |
| Pattern 8: 280 MHz [1 1 1 1 1 1 1 1 1 1 1 1 x x 1 1] | 8.9977 |
| Pattern 9: 280 MHz [1 1 1 1 1 1 1 1 1 1 1 1 1 1 x x] | 8.2719 |
| Pattern 10: 240 MHz [1 1 1 1 x x x x 1 1 1 1 1 1 1 1] | 7.7825 |
| Pattern 11: 240 MHz [1 1 1 1 1 1 1 1 x x x x 1 1 1 1] | 8.0355 |
| Pattern 12: 240 MHz [1 1 1 1 1 1 1 1 1 1 1 1 x x x x] | 7.7825 |
| Pattern 13: 240 MHz [x x x x 1 1 1 1 1 1 1 1 1 1 1 1] | 7.8234 |
| Pattern 8 has a maximum PAPR value. | 8.9977 |

2-4. There is another possible LTF1×320M sequence=[LTF1×80 $MHz_{left}$ 0 LTF1×80 $MHz_{right}$ $0_{23}$−LTF1×80 $MHz_{left}$ 0−LTF1×80 $MHz_{right}$ $0_{23}$−LTF1×80 $MHz_{left}$ 0−LTF1×80 $MHz_{right}$ $0_{23}$−LTF1×80 $MHz_{left}$ 0 LTF1×80 $MHz_{right}$]. LTF1×80 $MHz_{left}$ is an 80 $MHz_{left}$ 1× LTF sequence in the 802.11ax standard. For a specific sequence, refer to the 802.11ax standard. LTF1×80 $MHz_{right}$ is an 80 $MHz_{right}$ 1×LTF sequence in the 802.11ax standard. For a specific sequence, refer to the 802.11ax standard.

A PAPR value of the LTF1×320M sequence in puncturing pattern 1 in the puncturing patterns in (A) of the 320 MHz is 8. 1 866 dB.

2-5. There is another possible LTF1×320M sequence=[LTF1×80 $MHz_{left}$ 0 LTF1×80 $MHz_{right}$ $0_{23}$ LTF1×80 $MHz_{left}$ 0 LTF1×80 $MHz_{right}$ $0_{23}$−LTF1×80 $MHz_{left}$ 0−LTF1×80 $MHz_{right}$ $0_{23}$−LTF1×80 $MHz_{left}$ 0−LTF1×80 $MHz_{right}$]. LTF1×80 $MHz_{left}$ is an 80 $MHz_{left}$ 1× LTF sequence in the 802.11ax standard. For a specific sequence, refer to the 802.11ax standard. LTF1×80 $MHz_{right}$ is an 80 $MHz_{right}$ 1×LTF sequence in the 802.11ax standard. For a specific sequence, refer to the 802.11ax standard.

A PAPR value of the LTF1×320M sequence in a puncturing pattern in the puncturing patterns in (A) of the 320 MHz is 9.0837 dB. PAPR values in the other puncturing patterns each are less than 9.0837 dB.

2-6. There is another possible LTF1×320M sequence=[LTF1×80 $MHz_{left}$ 0−LTF1×80 $MHz_{right}$ $0_{23}$−LTF1×80 $MHz_{left}$ 0 LTF1×80 $MHz_{right}$ $0_{23}$ LTF1×80 $MHz_{left}$ 0 LTF1×80 $MHz_{right}$ $0_{23}$ LTF1×80 $MHz_{left}$ 0 LTF1×80 $MHz_{right}$]. LTF1×80 $MHz_{left}$ is an 80 $MHz_{left}$ 1× LTF sequence in the 802.11ax standard. For a specific sequence, refer to the 802.11ax standard. LTF1×80 $MHz_{right}$ is an 80 $MHz_{right}$ 1×LTF sequence in the 802.11ax standard. For a specific sequence, refer to the 802.11ax standard.

A PAPR value of the LTF1×320M sequence in puncturing pattern 1 for the 320 MHz is 6.2230 dB.

2-7. There is another possible LTF1×320M sequence=[LTF1×80 $MHz_{left}$ 0−LTF1×80 $MHz_{right}$ $0_{23}$ LTF1×80 $MHz_{left}$ 0 LTF1×80 $MHz_{right}$ $0_{23}$ LTF1×80 $MHz_{left}$ 0 LTF1×80 $MHz_{right}$ $0_{23}$−LTF1×80 $MHz_{left}$ 0−LTF1×80 $MHz_{right}$]. LTF1×80 $MHz_{left}$ is an 80 $MHz_{left}$ 1× LTF sequence in the 802.11ax standard. For a specific sequence, refer to the 802.11ax standard. LTF1×80 $MHz_{right}$ is an 80 $MHz_{right}$ 1×LTF sequence in the 802.11ax standard. For a specific sequence, refer to the 802.11ax standard.

PAPR values of the LTF1×320M sequence in puncturing patterns 1 to 13 in the puncturing patterns in (B) of the 320 MHz are listed in the following table.

| Sequence: LTF1 × 320M = [LTF1 × 80 $MHz_{left}$ 0 − LTF1 × 80 $MHz_{right}$ $0_{23}$ LTF1 × 80 $MHz_{left}$ 0 LTF1 × 80 $MHz_{right}$ $0_{23}$ LTF1 × 80 $MHz_{left}$ 0 LTF1 × 80 $MHz_{right}$ $0_{23}$ − LTF1 × 80 $MHz_{left}$ 0 − LTF1 × 80 $MHz_{right}$] | PAPR [dB] |
|---|---|
| Pattern 1: 320 MHz [1 1 1 1 1 1 1 1 1 1 1 1 1 1 1 1] | 7.2138 |
| Pattern 2: 280 MHz [x x 1 1 1 1 1 1 1 1 1 1 1 1 1 1] | 8.3602 |
| Pattern 3: 280 MHz [1 1 x x 1 1 1 1 1 1 1 1 1 1 1 1] | 7.1859 |
| Pattern 4: 280 MHz [1 1 1 1 x x 1 1 1 1 1 1 1 1 1 1] | 8.0696 |
| Pattern 5: 280 MHz [1 1 1 1 1 1 x x 1 1 1 1 1 1 1 1] | 6.7074 |
| Pattern 6: 280 MHz [1 1 1 1 1 1 1 1 x x 1 1 1 1 1 1] | 8.1376 |
| Pattern 7: 280 MHz [1 1 1 1 1 1 1 1 1 1 x x 1 1 1 1] | 6.7785 |
| Pattern 8: 280 MHz [1 1 1 1 1 1 1 1 1 1 1 1 x x 1 1] | 7.8276 |
| Pattern 9: 280 MHz [1 1 1 1 1 1 1 1 1 1 1 1 1 1 x x] | 7.3592 |
| Pattern 10: 240 MHz [1 1 1 1 x x x x 1 1 1 1 1 1 1 1] | 8.1866 |
| Pattern 11: 240 MHz [1 1 1 1 1 1 1 1 x x x x 1 1 1 1] | 7.4535 |
| Pattern 12: 240 MHz [1 1 1 1 1 1 1 1 1 1 1 1 x x x x] | 8.1341 |
| Pattern 13: 240 MHz [x x x x 1 1 1 1 1 1 1 1 1 1 1 1] | 7.5154 |

-continued

| Sequence: LTF1 × 320M = [LTF1 × 80 $MHz_{left}$ 0 − LTF1 × 80 $MHz_{right}$ $0_{23}$ LTF1 × 80 $MHz_{left}$ 0 LTF1 × 80 $MHz_{right}$ $0_{23}$ LTF1 × 80 $MHz_{left}$ 0 LTF1 × 80 $MHz_{right}$ $0_{23}$ − LTF1 × 80 $MHz_{left}$ 0 − LTF1 × 80 $MHz_{right}$] | PAPR [dB] |
|---|---|
| Pattern 2 has a maximum PAPR value. | 8.3602 |

3. 2×LTF Sequence in the 240 MHz Bandwidth (Referred to as an LTF2×240M Sequence for Short)

3-1. There is a possible LTF2×240M sequence=[LTF2×80M $0_{23}$ LTF2×80M $0_{23}$ LTF2×80M]. LTF2×80M is an 80 MHz 2×LTF sequence in the 802.11ax standard. For a specific sequence, refer to the 802.11ax standard.

The LTF2×240M sequence has relatively low PAPR values in various cases (including a full bandwidth of the 240 MHz, various puncturing patterns for the 240 MHz, and various multiple RU combinations for the 240 MHz) in table A of the 240 MHz. For example, a PAPR value of the LTF2×240M sequence in the full bandwidth, a puncturing pattern, or an RU (or a multiple RU combination) is 10.9621 dB. PAPR values in the other puncturing patterns each are less than 10.9621 dB. For example, a PAPR value is 10.9621 dB in the full bandwidth or puncturing pattern 1.

The sequence has relatively low PAPR values in various cases (including a full bandwidth of the 240 MHz, various puncturing patterns for the 240 MHz, and various multiple RU combinations for the 240 MHz) in table A of the 240 MHz.

For example, the sequence has the following PAPR values on RUs (including a plurality of RU combinations or single RUs) in the $1^{st}$ 80 MHz, the $2^{nd}$ 80 MHz, and the $3^{rd}$ 80 MHz.

PAPR value table for the RUs in the $1^{st}$ 80 MHz, the $2^{nd}$ 80 MHz, and the $3^{rd}$ 80 MHz:

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | | 4.6942 | | | 4.6942 | | 4.6942 | | 7.4339 | | | 7.4339 |
| | 5.42 | | | | | 5.4108 | | | | | 6.4299 | |
| | | | | 5.5768 | | | | | | | 8.2386 | |
| | | | | | | 7.3467 | | | | | | |
| | | | | | | 6.5186 | | | | | | |
| | | | | 5.941 | | | | | | | 6.3682 | |
| | | | | 6.2519 | | | | | | | 6.6061 | |
| | | | | 8.54 | | | | | | | 8.6933 | |
| | | | | | | 8.5308 | | | | | | |

| | | | | | | | | | | | |
|---|---|---|---|---|---|---|---|---|---|---|---|
| 5.6374 | 4.7677 | 7.9454 | 4.7677 | 5.7625 | 5.8494 | 4.7677 | 7.9454 | 4.7677 | 5.6374 | 6.9809 | 5.8494 |
| | 7.4339 | | 5.9301 | | 5.8786 | | 7.4339 | | | | 7.4339 |
| | | 6.7073 | | | | 6.4895 | | | | | 6.4299 |
| | | 8.2386 | | | | | | 7.3104 | | | |
| | | 7.3467 | | | | | | 6.5802 | | | |
| | | | | | | 6.5186 | | | | | |
| | | 6.3682 | | | | | | 6.3682 | | | |
| | | 6.6061 | | | | | | 6.6438 | | | |
| | | 8.6933 | | | | | | 9.6745 | | | |
| | | | | | | 8.5308 | | | | | |

| | | | | | | | | | | | |
|---|---|---|---|---|---|---|---|---|---|---|---|
| 6.9809 | 5.8494 | 4.4605 | 4.4605 | 4.4605 | 4.4605 | 4.4605 | 4.4605 | 4.4605 | 4.4605 | 4.4605 | RU26 |
| 7.4339 | | 4.6942 | | 4.6942 | | | 4.6942 | | 4.6942 | | RU52 |
| 6.4299 | | | 5.4108 | | | | | 5.42 | | | RU106 |
| 7.3104 | | | | | | 5.5768 | | | | | RU242 |
| | | | | | 6.5802 | | | | | | RU484 |
| | | | | | 6.5186 | | | | | | RU996 |
| 6.3682 | | | | | | 5.941 | | | | | RU26 + RU52 |
| 6.6438 | | | | | | 6.2519 | | | | | RU26 + RU106 |
| 9.6745 | | | | | | 8.1652 | | | | | RU242 + RU484 |
| | | | | | 8.5308 | | | | | | RU242 + RU242 |

As shown in FIG. 4, in a row for RU52, there is one RU26 between the $2^{nd}$ RU52 and the $3^{rd}$ RU52, one RU26 between the 6th RU52 and the 7th RU52, one RU26 between the 10th RU52 and the 11th RU52, and one RU26 between the 14th RU52 and the 15th RU52. Accordingly, a value at a corresponding location in the row for RU52 in the table represents a PAPR value on RU26 at the corresponding location.

Similarly, as shown in FIG. 4, in a row for RU106, there is one RU26 between the $1^{st}$ RU106 and the $2^{nd}$ RU106, one RU26 between the $3^{rd}$ RU106 and the 4th RU106, one RU26 between the 5th RU106 and the 6th RU106, and one RU26 between the $7^{th}$ RU106 and the 8th RU106. Accordingly, a value at a corresponding location in the row for RU106 in the table represents a PAPR value on RU26 at the corresponding location.

It should be noted that, values from left to right in the $1^{st}$ row of the foregoing table are sequentially PAPR values on the $1^{st}$ RU26 to the $36^{th}$ RU26 from left to right in 80 MHz for the sequence. Values from left to right in the $2^{nd}$ row of the foregoing table are sequentially PAPR values on the 1st RU52 to the 16th RU52 from left to right in 80 MHz for the sequence. Values from left to right in the 3rd row of the foregoing table are sequentially PAPR values on the 1st RU106 to the 8th RU106 from left to right in 80 MHz for the sequence. Values from left to right in the 4th row of the foregoing table are sequentially PAPR values on the 1st RU242 to the 4th RU242 from left to right in 80 MHz for the sequence. Values from left to right in the 5th row of the foregoing table are sequentially PAPR values on the 1st RU484 and the 2nd RU484 from left to right in 80 MHz for the sequence. A value in the 6th row of the foregoing table is a PAPR value on an RU996 in 80 MHz for the sequence. Values in the 7th row of the foregoing table are PAPR values on the 1st RU26+RU52 to the 4th RU26+RU52 in each 80 MHz for the sequence. Values in the 8th row of the foregoing table are PAPR values on the 1st RU26+RU106 to the 4th RU26+RU106 in each 80 MHz for the sequence. Values in the 9th row of the foregoing table are PAPR values on the 1st RU242+RU484 to the 4th RU242+RU484 in each 80 MHz for the sequence. A value in the 10th row of the foregoing table is a PAPR value on an RU combination (the combination is RU242+RU242, which is formed by the 1st RU242 and the 4th RU242 in each 80 MHz) in the 80 MHz for the sequence.

It should be understood that, a correspondence between a PAPR value and an RU in the foregoing table is applicable to a PAPR value table for other RUs of 80 MHz in this specification. In other words, PAPR values in a PAPR value table for other RUs of 80 MHz in this specification one to one correspond to the RUs described in the previous paragraph. The following description provides only PAPR values in a table. A correspondence between a PAPR value and an RU in the table is not described again.

For another example, the sequence has the following PAPR values on other RUs in more than 80 MHz (namely, RU combinations) in table A.

| | | | | | | | |
|---|---|---|---|---|---|---|---|
| 7.7723 | 9.1804 | 7.7723 | 9.0511 | 7.7723 | 9.1804 | 7.7723 | 9.0511 |
| 9.8921 | 8.733 | 8.9256 | 10.467 | 9.8654 | 8.5781 | 9.3201 | 10.364 |
| 9.9264 | | 10.716 | | 9.9264 | | 10.716 | |
| 9.2012 | | 9.422 | | | 9.2012 | | |
| | | | 10.9621 | | | | |

| | | | | | | |
|---|---|---|---|---|---|---|
| | | | RU484 + RU996 | | | |
| 9.8921 | 8.733 | 8.9256 | 10.467 | 9.8654 | 8.5781 | 9.3201 |
| 9.9264 | | 10.716 | | RU484 + RU2 * 996 | | |
| | | | RU2 * 996 | | | |
| | | | RU3 * 996 | | | |

| | |
|---|---|
| | RU484 + RU996 |
| 10.364 | RU242 + RU484 + RU996 |

-continued

| |
|---|
| RU484 + RU2 * 996 |
| RU2 * 996 |
| RU3 * 996 |

It should be noted that, values from left to right in the 1st row of the foregoing table are sequentially PAPR values on the RU combination in the 1st mode to the RU combination in the 8th mode of RU484+RU996 in the 240 MHz described above. Values from left to right in the 2nd row of the table are sequentially PAPR values on the RU combination in the 1st mode to the RU combination in the 16th mode of RU242+RU484+RU996 in the 240 MHz described above. Values from left to right in the 3rd row of the table are sequentially PAPR values on the RU combination in the 1st mode to the RU combination in the 6th mode of RU484+2*RU996 in the 240 MHz described above. Values from left to right in the 4th row of the table are sequentially PAPR values on the RU combination in the 1st mode to the RU combination in the 3rd mode of 2*RU996 in the 240 MHz described above. A value in the 5th row of the table is a PAPR value on 3*RU996 in the 240 MHz described above.

It should be understood that, a correspondence between a PAPR value of an RU in more than 80 MHz (namely, an RU combination) in the foregoing table and the RU combination is applicable to a PAPR value table for other RUs in more than 80 MHz in this specification. In other words, PAPR values in a PAPR value table for other RUs in more than 80 MHz (namely, RU combinations) one to one correspond to the RU combinations described in the previous paragraph. The following description provides only PAPR values in a table. A correspondence between a PAPR value and an RU combination in the table is not described again.

3-2. There is a possible LTF2×240M sequence=[LTF2×160M $0_{23}$ LTF2×80M]. LTF2×160M is a 160 MHz 2×LTF sequence in the 802.11ax standard. LTF2×80M is an 80 MHz 2×LTF sequence in the 802.11ax standard. For specific sequences, refer to the 802.11ax standard.

The LTF2×240M sequence has relatively low PAPR values in various cases (including a full bandwidth of the 240 MHz, various puncturing patterns for the 240 MHz, and various multiple RU combinations for the 240 MHz) in table A of the 240 MHz. A PAPR value of the LTF2×240M sequence in the full bandwidth or puncturing pattern 1 for the 240 MHz is 9.6089 dB.

The sequence has relatively low PAPR values in various cases (including a full bandwidth of the 240 MHz, various puncturing patterns for the 240 MHz, and various multiple RU combinations for the 240 MHz) in table A of the 240 MHz.

For example, the sequence has the following PAPR values on RUs (including a plurality of RU combinations or single RUs) in the 1st 80 MHz, the 2nd 80 MHz, and the 3rd 80 MHz.

PAPR value table for the RUs in the 1st 80 MHz and the 3rd 80 MHz:

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | | 4.6942 | | | 4.6942 | | 4.6942 | | 7.4339 | | 7.4339 | |
| | 5.42 | | | | | 5.4108 | | | | | 6.4299 | |
| | | | | 5.5768 | | | | | | | 8.2386 | |
| | | | | | | 7.3467 | | | | | | |
| | | | | | | 6.5186 | | | | | | |
| | | | | 5.941 | | | | | | | 6.3682 | |
| | | | | 6.2519 | | | | | | | 6.6061 | |
| | | | | 8.54 | | | | | | | 8.6933 | |
| | | | | | | 8.5308 | | | | | | |
| | 5.6374 | 4.7677 | 7.9454 | 4.7677 | 5.7625 | 5.8494 | 4.7677 | 7.9454 | 4.7677 | 5.6374 | 6.9809 | 5.8494 |
| | | 7.4339 | | 5.9301 | | 5.8786 | | 7.4339 | | | 7.4339 | |
| | | | 6.7073 | | | | 6.4895 | | | | 6.4299 | |
| | | | 8.2386 | | | | | | 7.3104 | | | |
| | | | 7.3467 | | | | | | 6.5802 | | | |
| | | | | | | | 6.5186 | | | | | |

-continued

| | | | | | | | | | | | | |
|---|---|---|---|---|---|---|---|---|---|---|---|---|
| | | | 6.3682 | | | | | | 6.3682 | | | |
| | | | 6.6061 | | | | | | 6.6438 | | | |
| | | | 8.6933 | | | | | | 9.6745 | | | |
| | | | | | | | 8.5308 | | | | | |
| | 6.9809 | 5.8494 | 4.4605 | 4.4605 | 4.4605 | 4.4605 | 4.4605 | 4.4605 | 4.4605 | 4.4605 | 4.4605 | RU26 |
| | 7.4339 | | 4.6942 | | 4.6942 | | | 4.6942 | | 4.6942 | | RU52 |
| | 6.4299 | | | 5.4108 | | | | | 5.42 | | | RU106 |
| | 7.3104 | | | | | | 5.5768 | | | | | RU242 |
| | | | | | | 6.5802 | | | | | | RU484 |
| | | | | | | 6.5186 | | | | | | RU996 |
| | 6.3682 | | | | | | 5.941 | | | | | RU26 + RU52 |
| | 6.6438 | | | | | | 6.2519 | | | | | RU26 + RU106 |
| | 9.6745 | | | | | | 8.1652 | | | | | RU242 + RU484 |
| | | | | | | 8.5308 | | | | | | RU242 + RU242 |

PAPR value table for the RUs in the $2^{nd}$ 80 MHz:

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | | 4.6942 | | | 4.6942 | | 4.6942 | | 7.4339 | | 7.4339 | |
| | 5.42 | | | | | 5.4108 | | | | | 6.4299 | |
| | | | | 5.5768 | | | | | | | 7.3876 | |
| | | | | | | 7.071 | | | | | | |
| | | | | | | 7.5891 | | | | | | |
| | | | | 5.941 | | | | | | | 6.3682 | |
| | | | | 6.2519 | | | | | | | 6.6438 | |
| | | | | 8.2212 | | | | | | | 9.036 | |
| | | | | | | 8.4048 | | | | | | |
| | 5.6374 | 4.7677 | 7.9454 | 4.7677 | 5.8494 | 5.8494 | 4.7677 | 7.9454 | 4.7677 | 5.6374 | 6.9809 | 5.8494 |
| | | 7.4339 | | 5.8786 | | 5.8786 | | 7.4339 | | | 7.4339 | |
| | | | 6.4895 | | | | 6.4895 | | | | 6.4299 | |
| | | | 7.3876 | | | | | | 7.3104 | | | |
| | | | 7.071 | | | | | | 6.8051 | | | |
| | | | | | | | 7.5891 | | | | | |
| | | | 6.3682 | | | | | | 6.3682 | | | |
| | | | 6.6438 | | | | | | 6.6438 | | | |
| | | | 9.036 | | | | | | 7.9638 | | | |
| | | | | | | | 8.4048 | | | | | |
| | 6.9809 | 5.8494 | 4.4605 | 4.4605 | 4.4605 | 4.4605 | 4.4605 | 4.4605 | 4.4605 | 4.4605 | 4.4605 | RU26 |
| | 7.4339 | | 4.6942 | | 4.6942 | | | 4.6942 | | 4.6942 | | RU52 |
| | 6.4299 | | | 5.4108 | | | | | 5.42 | | | RU106 |
| | 7.3104 | | | | | | 5.5768 | | | | | RU242 |
| | | | | | | 6.8051 | | | | | | RU484 |
| | | | | | | 7.5891 | | | | | | RU996 |
| | 6.3682 | | | | | | 5.941 | | | | | RU26 + RU52 |
| | 6.6438 | | | | | | 6.2519 | | | | | RU26 + RU106 |
| | 7.9638 | | | | | | 7.8216 | | | | | RU242 + RU484 |
| | | | | | | 8.4048 | | | | | | RU242 + RU242 |

The sequence has the following PAPR values on other RUs in more than 80 MHz (namely, RU combinations) in table A:

| | | | | | | | |
|---|---|---|---|---|---|---|---|
| 8.5779 | 9.7242 | 8.857 | 7.5067 | 8.5418 | 8.1122 | 8.2065 | 9.4554 |
| 8.4293 | 8.7376 | 9.4543 | 8.5275 | 9.242 | 9.0152 | 7.4505 | 8.4996 |
| | | | 9.6089 | | | | |
| | | | RU484 + RU996 | | | | |
| | 9.3507 | 8.9947 | 7.8446 | 8.4755 | 8.795 | 8.7376 | 8.9479 |
| | | | RU3 * 996 | | | | |
| | | | RU484 + RU996 | | | | |
| | | 8.6984 | | RU242 + RU484 + RU996 | | | |
| | | | RU3 * 996 | | | | |

3-3. There is a possible LTF2×240M sequence=[LTF2×160M $0_{23}$−LTF2×80M]. LTF2×160M is a 160 MHz 2×LTF sequence in the 802.11ax standard. LTF2×80M is an 80 MHz 2×LTF sequence in the 802.11ax standard. For specific sequences, refer to the 802.11ax standard.

The LTF2×240M sequence has relatively low PAPR values in various cases (including a full bandwidth of the 240 MHz, various puncturing patterns for the 240 MHz, and various multiple RU combinations for the 240 MHz) in table A of the 240 MHz. For example, a PAPR value of the LTF2×240M sequence in the full bandwidth, a puncturing pattern, or an RU (or a multiple RU combination) is 9.7242 dB. PAPR values in the other puncturing patterns each are less than 9.7242 dB.

The sequence has relatively low PAPR values in various cases (including a full bandwidth of the 240 MHz, various puncturing patterns for the 240 MHz, and various multiple RU combinations for the 240 MHz) in table A of the 240 MHz.

For example, the sequence has the following PAPR values on RUs (including a plurality of RU combinations or single RUs) in the $1^{st}$ 80 MHz, the $2^{nd}$ 80 MHz, and the $3^{rd}$ 80 MHz.

PAPR table for the RUs in the 1st 80 MHz and the 3rd 80 MHz:

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.42 | | | | | | | | | | 5.4108 | | | | | | | | | 6.4299 | | | |
| | | | | | | | | 5.5768 | | | | | | | | | | | | | | 8.2386 | | | |
| | | | | | | | | | | | | | 7.3467 | | | | | | | | | | | | |
| | | | | | | | | | | | | | 6.5186 | | | | | | | | | | | | |
| | | | | | | | | 5.941 | | | | | | | | | | | | | | 6.3682 | | | |
| | | | | | | | | 6.2519 | | | | | | | | | | | | | | 6.6061 | | | |
| | | | | | | | | 8.54 | | | | | | | | | | | | | | 8.6933 | | | |
| | | | | | | | | | | | | | 8.5308 | | | | | | | | | | | | |
| | | 5.6374 | | 4.7677 | | 7.9454 | | 4.7677 | | 5.7625 | | 5.8494 | | 4.7677 | | 7.9454 | | 4.7677 | | 5.6374 | | 6.9809 | | | 5.8494 |
| | | | | | 7.4339 | | | | 5.9301 | | | | 5.8786 | | | | 7.4339 | | | | | | | 7.4339 | |
| | | | | | | | 6.7073 | | | | | | | | 6.4895 | | | | | | | | | 6.4299 | |
| | | | | | | 8.2386 | | | | | | | | | | | | | 7.3104 | | | | | | |
| | | | | | | 7.3467 | | | | | | | | | | | | | 6.5802 | | | | | | |
| | | | | | | | | | | | | | | 6.5186 | | | | | | | | | | | |
| | | | | | | 6.3682 | | | | | | | | | | | | | 6.3682 | | | | | | |
| | | | | | | 6.6061 | | | | | | | | | | | | | 6.6438 | | | | | | |
| | | | | | | 8.6933 | | | | | | | | | | | | | 9.6745 | | | | | | |
| | | | | | | | | | | | | | | 8.5308 | | | | | | | | | | | |
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | | | 7.4339 | | | | 4.6942 | | | | 4.6942 | | | | | | 4.6942 | | | | 4.6942 | | | | RU52 |
| | | | 6.4299 | | | | | | 5.4108 | | | | | | | | | | 5.42 | | | | | | RU106 |
| | | | 7.3104 | | | | | | | | | | | 5.5768 | | | | | | | | | | | RU242 |
| | | | | | | | | | | | | 6.5802 | | | | | | | | | | | | | RU484 |
| | | | | | | | | | | | | 6.5186 | | | | | | | | | | | | | RU996 |
| | | | 6.3682 | | | | | | | | | | | 5.941 | | | | | | | | | | | RU26 + RU52 |
| | | | 6.6438 | | | | | | | | | | | 6.2519 | | | | | | | | | | | RU26 + RU106 |
| | | | 9.6745 | | | | | | | | | | | 8.1652 | | | | | | | | | | | RU242 + RU484 |
| | | | | | | | | | | | | 8.5308 | | | | | | | | | | | | | RU242 + RU242 |

PAPR table for the RUs in the 2nd 80 MHz:

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.42 | | | | | | | | | | 5.4108 | | | | | | | | | 6.4299 | | | |
| | | | | | | | | 5.5768 | | | | | | | | | | | | | | 7.3876 | | | |
| | | | | | | | | | | | | | 7.071 | | | | | | | | | | | | |
| | | | | | | | | | | | | | 7.5891 | | | | | | | | | | | | |
| | | | | | | | | 5.941 | | | | | | | | | | | | | | 6.3682 | | | |
| | | | | | | | | 6.2519 | | | | | | | | | | | | | | 6.6438 | | | |
| | | | | | | | | 8.2212 | | | | | | | | | | | | | | 9.036 | | | |
| | | | | | | | | | | | | | 8.4048 | | | | | | | | | | | | |
| | | 5.6374 | | 4.7677 | | 7.9454 | | 4.7677 | | 5.8494 | | 5.8494 | | 4.7677 | | 7.9454 | | 4.7677 | | 5.6374 | | 6.9809 | | | 5.8494 |
| | | | | | 7.4339 | | | | 5.8786 | | | | 5.8786 | | | | 7.4339 | | | | | | | 7.4339 | |
| | | | | | | | 6.4895 | | | | | | | | 6.4895 | | | | | | | | | 6.4299 | |
| | | | | | | 7.3876 | | | | | | | | | | | | | 7.3104 | | | | | | |
| | | | | | | 7.071 | | | | | | | | | | | | | 6.8051 | | | | | | |
| | | | | | | | | | | | | | | 7.5891 | | | | | | | | | | | |
| | | | | | | 6.3682 | | | | | | | | | | | | | 6.3682 | | | | | | |
| | | | | | | 6.6438 | | | | | | | | | | | | | 6.6438 | | | | | | |
| | | | | | | 9.036 | | | | | | | | | | | | | 7.9638 | | | | | | |
| | | | | | | | | | | | | | | 8.4048 | | | | | | | | | | | |
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | | | 7.4339 | | | | 4.6942 | | | | 4.6942 | | | | | | 4.6942 | | | | 4.6942 | | | | RU52 |
| | | | 6.4299 | | | | | | 5.4108 | | | | | | | | | | 5.42 | | | | | | RU106 |
| | | | 7.3104 | | | | | | | | | | | 5.5768 | | | | | | | | | | | RU242 |
| | | | | | | | | | | | | 6.8051 | | | | | | | | | | | | | RU484 |
| | | | | | | | | | | | | 7.5891 | | | | | | | | | | | | | RU996 |
| | | | 6.3682 | | | | | | | | | | | 5.941 | | | | | | | | | | | RU26 + RU52 |
| | | | 6.6438 | | | | | | | | | | | 6.2519 | | | | | | | | | | | RU26 + RU106 |
| | | | 7.9638 | | | | | | | | | | | 7.8216 | | | | | | | | | | | RU242 + RU484 |
| | | | | | | | | | | | | 8.4048 | | | | | | | | | | | | | RU242 + RU242 |

The sequence has the following PAPR values on other RUs in more than 80 MHz (namely, RU combinations or single RUs) in table A:

| | | | | | | |
|---|---|---|---|---|---|---|
| 8.5779 | 9.7242 | 8.857 | 7.5067 | 9.1064 | 7.9118 | 8.5779 |
| 8.4293 | 8.7376 | 9.4543 | 8.5275 | 9.242 | 9.0152 | 7.4505 |
| 8.8238 | 9.049 | 9.7195 | 9.5351 | | | |
| 7.8267 | 9.4879 | 7.927 | | | | |
| 8.7432 | | | | | | |
| 9.4713 | RU484 + RU996 | | | | | |
| 8.4996 | 9.0568 | 9.2374 | 8.8124 | 8.6843 | 8.6325 | 8.3252 |
| 9.5351 | 8.7437 | 9.049 | RU484 + RU2 * 996 | | | |
| 7.927 | RU2 * 996 | | | | | |
| 8.7432 | RU3 * 996 | | | | | |
| RU484 + RU996 | | | | | | |
| 9.4718 | 8.1413 | RU242 + RU484 + RU996 | | | | |
| RU484 + RU2 * 996 | | | | | | |
| RU2 * 996 | | | | | | |
| RU3 * 996 | | | | | | |

3-4. There is a possible LTF2×240M sequence=[LTF2×80M$_{part1}$ LTF2×80M$_{part2}$−LTF2×80M$_{part3}$ LTF2×80M$_{part4}$ LTF2×80M$_{part5}$ $0_{23}$ LTF2×80M$_{part1}$ LTF2×80M$_{part2}$−LTF2×80M$_{part3}$−LTF2×80M$_{part4}$−LTF2×80M$_{part5}$ $0_{23}$ LTF2×80M$_{part1}$ LTF2×80M$_{part2}$−LTF2×80M$_{part3}$ LTF2×80M$_{part4}$ LTF2×80M$_{part5}$]. LTF2×80M$_{part1}$, LTF2×80M$_{part2}$, LTF2×80M$_{part3}$, LTF2×80M$_{part4}$, and LTF2×80M$_{part5}$ are respectively an 80 MHz$_{part1}$ 2×LTF sequence, an 80 MHz$_{part2}$ 2×LTF sequence, an 80 MHz$_{part3}$ 2×LTF sequence, an 80 MHz$_{part4}$ 2×LTF sequence, and an 80 MHz$_{part5}$ 2× LTF sequence in the 802.11ax standard. For specific sequences, refer to the 802.11ax standard.

The LTF2×240M sequence has relatively low PAPR values in various cases (including a full bandwidth of the 240 MHz, various puncturing patterns for the 240 MHz, and various multiple RU combinations for the 240 MHz) in table A of the 240 MHz. A PAPR value of the LTF2×240M sequence in puncturing pattern 1 for the 240 MHz is 9.4304 dB.

For example, the sequence has the following PAPR values on RUs (including a plurality of RU combinations or single RUs) in the Pr 80 MHz, the 2$^{nd}$ 80 MHz, and the 3$^{rd}$ 80 MHz.

PAPR value tables for the RUs in the Pr 80 MHz, the 2$^{nd}$ 80 MHz, and the 3$^{rd}$ 80 MHz:

PAPR value table for the RUs in the 1$^{st}$ and the 3$^{rd}$ 80 MHz:

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | 4.6942 | 4.6942 | 4.6942 | 7.4339 | 7.4339 | | | | | | | |
| 5.42 | 5.4108 | 6.4299 | | | | | | | | | | |
| 5.5768 | 7.3876 | | | | | | | | | | | |
| 6.8645 | | | | | | | | | | | | |
| 6.926 | | | | | | | | | | | | |
| 5.941 | 6.3682 | | | | | | | | | | | |
| 6.2519 | 6.6438 | | | | | | | | | | | |
| 8.5036 | 8.937 | | | | | | | | | | | |
| 8.5308 | | | | | | | | | | | | |
| 5.6374 | 4.7677 | 7.9454 | 4.7677 | 5.8494 | 5.7625 | 4.7677 | 7.9454 | 4.7677 | 5.6374 | 6.9809 | 5.8494 | |
| 7.4339 | 5.8786 | 5.9301 | 7.4339 | 7.4339 | | | | | | | | |
| 6.4895 | 6.7073 | 6.4299 | | | | | | | | | | |
| 7.3876 | 8.5833 | | | | | | | | | | | |
| 6.8645 | 7.8577 | | | | | | | | | | | |
| 6.926 | | | | | | | | | | | | |
| 6.3682 | 6.3682 | | | | | | | | | | | |
| 6.6438 | 6.6061 | | | | | | | | | | | |
| 8.937 | 9.4304 | | | | | | | | | | | |
| 8.5308 | | | | | | | | | | | | |
| 6.9809 | 5.8494 | 4.4605 | 4.4605 | 4.4605 | 4.4605 | 4.4605 | 4.4605 | 4.4605 | 4.4605 | 4.4605 | RU26 | |
| 7.4339 | 4.6942 | 4.6942 | 4.6942 | 4.6942 | RU52 | | | | | | | |
| 6.4299 | 5.4108 | 5.42 | RU106 | | | | | | | | | |
| 8.5833 | 5.5768 | RU242 | | | | | | | | | | |
| 7.8577 | RU484 | | | | | | | | | | | |
| 6.926 | RU996 | | | | | | | | | | | |
| 6.3682 | 5.941 | RU26 + RU52 | | | | | | | | | | |
| 6.6061 | 6.2519 | RU26 + RU106 | | | | | | | | | | |
| 9.4304 | 8.4146 | RU242 + RU484 | | | | | | | | | | |
| 8.5308 | RU242 + RU242 | | | | | | | | | | | |

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | 4.6942 | 4.6942 | 4.6942 | 7.4339 | 7.4339 | | | | | | | |
| 5.42 | 5.4108 | 6.4299 | | | | | | | | | | |
| 5.5768 | 7.3876 | | | | | | | | | | | |
| 6.8645 | | | | | | | | | | | | |
| 7.467 | | | | | | | | | | | | |
| 5.941 | 6.3682 | | | | | | | | | | | |
| 6.2519 | 6.6438 | | | | | | | | | | | |
| 7.9972 | 8.0223 | | | | | | | | | | | |
| 8.4048 | | | | | | | | | | | | |
| 5.6374 | 4.7677 | 7.9454 | 4.7677 | 5.8494 | 5.8494 | 4.7677 | 7.9454 | 4.7677 | 5.6374 | 6.9809 | 5.8494 | |
| 7.4339 | 5.8786 | 5.8786 | 7.4339 | 7.4339 | | | | | | | | |

-continued

| | | | | | | | | | | | |
|---|---|---|---|---|---|---|---|---|---|---|---|
| | | 6.4895 | | | | 6.4895 | | | | 6.4299 | |
| | | 7.3876 | | | | | | 7.3104 | | | |
| | | 6.8645 | | | | | | 6.5802 | | | |
| | | | | | | 7.467 | | | | | |
| | | 6.3682 | | | | | | 6.3682 | | | |
| | | 6.6438 | | | | | | 6.6438 | | | |
| | | 8.0223 | | | | | | 9.074 | | | |
| | | | | | | 8.4048 | | | | | |
| 6.9809 | 5.8494 | 4.4605 | 4.4605 | 4.4605 | 4.4605 | 4.4605 | 4.4605 | 4.4605 | 4.4605 | 4.4605 | RU26 |
| 7.4339 | | 4.6942 | | 4.6942 | | | 4.6942 | | 4.6942 | | RU52 |
| 6.4299 | | | 5.4108 | | | | | 5.42 | | | RU106 |
| 7.3104 | | | | | | 5.5768 | | | | | RU242 |
| | | | | | 6.5802 | | | | | | RU484 |
| | | | | | 7.467 | | | | | | RU996 |
| 6.3682 | | | | | | 5.941 | | | | | RU26 + RU52 |
| 6.6438 | | | | | | 6.2519 | | | | | RU26 + RU106 |
| 9.074 | | | | | | 8.1221 | | | | | RU242 + RU484 |
| | | | | | 8.4048 | | | | | | RU242 + RU242 |

The sequence has the following PAPR values on other RUs in more than 80 MHz (namely, RU combinations or single RUs) in table A:

| | | | | | | |
|---|---|---|---|---|---|---|
| 9.048 | 9.4288 | 8.2796 | 8.7402 | 8.0348 | 9.0751 | 9.1005 |
| 8.7317 | 8.4039 | 9.3231 | 9.0419 | 8.6762 | 7.7661 | 8.8347 |
| | | | 9.3606 | | | |
| | | | 9.1825 | | | |
| | 8.6683 | 8.3135 | 7.8758 | 8.5974 | 8.7712 | |
| | | | 9.3606 | | | |
| | | 9.1825 | | | RU484 + RU996 | |
| | 8.2548 | 8.5053 | 9.0897 | 8.8459 | RU242 + RU484 + RU996 | |
| | | 9.3606 | | | RU3 * 996 | |

3-5. There is a possible LTF2×240M sequence=[LTF2×$80M_{part1}$ −LTF2×$80M_{part2}$ −LTF2×$80M_{part3}$ −LTF2×$80M_{part4}$ LTF2×$80M_{part5}$ $0_{23}$ −LTF2×$80M_{part1}$ LTF2×$80M_{part2}$ −LTF2×$80M_{part3}$ −LTF2×$80M_{part4}$ LTF2×$80M_{part5}$ $0_{23}$ LTF2×$80M_{part1}$ LTF2×$80M_{part2}$ −LTF2×$80M_{part3}$ LTF2×$80M_{part4}$ LTF2×$80M_{part5}$]. LTF2×$80M_{part1}$, LTF2×$80M_{part2}$, LTF2×$80M_{part3}$, LTF2×$80M_{part4}$, and LTF2×$80M_{part5}$ are respectively an 80 $MHz_{part1}$ 2×LTF sequence, an 80 $MHz_{part2}$ 2×LTF sequence, an 80 $MHz_{part3}$ 2×LTF sequence, an 80 $MHz_{part4}$ 2×LTF sequence, and an 80 $MHz_{part5}$ 2× LTF sequence in the 802.11ax standard. For specific sequences, refer to the 802.11ax standard.

The LTF2×240M sequence has relatively low PAPR values in various cases (including a full bandwidth of the 240 MHz, various puncturing patterns for the 240 MHz, and various multiple RU combinations for the 240 MHz) in table A of the 240 MHz. For example, a PAPR value of the LTF2×240M sequence in a puncturing pattern is 9.6179 dB. PAPR values in the other puncturing patterns each are less than 9.6179 dB.

The sequence has relatively low PAPR values in various cases (including a full bandwidth of the 240 MHz, various puncturing patterns for the 240 MHz, and various multiple RU combinations for the 240 MHz) in table A of the 240 MHz.

For example, the sequence has the following PAPR values on RUs (including a plurality of RU combinations or single RUs) in the 1st 80 MHz, the 2nd 80 MHz, and the 3rd 80 MHz.

Table for the RUs in the 1st 80 MHz:

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | | 4.6942 | | | 4.6942 | | 4.6942 | | 7.4339 | | | 7.4339 |
| | 5.42 | | | | | 5.4108 | | | | | 6.4299 | |
| | | | | 5.5768 | | | | | | | 8.2386 | |
| | | | | | | 7.4499 | | | | | | |
| | | | | | | 6.6768 | | | | | | |
| | | | | 5.941 | | | | | | | 6.3682 | |
| | | | | 6.2519 | | | | | | | 6.6061 | |
| | | | | 8.0772 | | | | | | | 9.6179 | |
| | | | | | | 8.5308 | | | | | | |
| | 5.6374 | 4.7677 | 7.9454 | 4.7677 | 5.7625 | 5.8494 | 4.7677 | 7.9454 | 4.7677 | 5.6374 | 6.9809 | 5.8494 |
| | | 7.4339 | | 5.9301 | | 5.8786 | | 7.4339 | | | | 7.4339 |
| | | | 6.7073 | | | | 6.4895 | | | | | 6.4299 |
| | | | 8.2386 | | | | | | 7.3104 | | | |
| | | | 7.4499 | | | | | | 6.8051 | | | |
| | | | | | | | 6.6768 | | | | | |
| | | | 6.3682 | | | | | | 6.3682 | | | |
| | | | 6.6061 | | | | | | 6.6438 | | | |
| | | | 9.6179 | | | | | | 8.6916 | | | |
| | | | | | | | 8.5308 | | | | | |
| | 6.9809 | 5.8494 | 4.4605 | 4.4605 | 4.4605 | 4.4605 | 4.4605 | 4.4605 | 4.4605 | 4.4605 | 4.4605 | RU26 |
| | 7.4339 | | 4.6942 | | 4.6942 | | | 4.6942 | | 4.6942 | | RU52 |
| | 6.4299 | | | 5.4108 | | | | | 5.42 | | | RU106 |
| | 7.3104 | | | | | | 5.5768 | | | | | RU242 |
| | | | | | | 6.8051 | | | | | | RU484 |
| | | | | | | 6.6768 | | | | | | RU996 |

-continued

| | | | | | | | | | | | | | | | | | | | | | | | | | |
|---|---|---|---|---|---|---|---|---|---|---|---|---|---|---|---|---|---|---|---|---|---|---|---|---|---|
| | | | 6.3682 | | | | | | | | | | | 5.941 | | | | | | | | | | | RU26 + RU52 |
| | | | 6.6438 | | | | | | | | | | | 6.2519 | | | | | | | | | | | RU26 + RU106 |
| | | | 8.6916 | | | | | | | | | | | 8.8069 | | | | | | | | | | | RU242 + RU484 |
| | | | | | | | | | | | | 8.5308 | | | | | | | | | | | | | RU242 + RU242 |

Table for the RUs in the 2nd 80 MHz:

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.42 | | | | | | | | | | 5.4108 | | | | | | | | | 6.4299 | | | |
| | | | | | | | | 5.5768 | | | | | | | | | | | | | | 7.3876 | | | |
| | | | | | | | | | | | | | 7.071 | | | | | | | | | | | | |
| | | | | | | | | | | | | | 7.5891 | | | | | | | | | | | | |
| | | | | | | | | 5.941 | | | | | | | | | | | | | | 6.3682 | | | |
| | | | | | | | | 6.2519 | | | | | | | | | | | | | | 6.6438 | | | |
| | | | | | | | | 8.2212 | | | | | | | | | | | | | | 9.036 | | | |
| | | | | | | | | | | | | | 8.4048 | | | | | | | | | | | | |

| | | | | | | | | | | | | | | | | | | | | | | | | | |
|---|---|---|---|---|---|---|---|---|---|---|---|---|---|---|---|---|---|---|---|---|---|---|---|---|---|
| | | 5.6374 | | 4.7677 | | 7.9454 | | 4.7677 | | 5.8494 | | 5.8494 | | 4.7677 | | 7.9454 | | 4.7677 | | 5.6374 | | 6.9809 | | | 5.8494 |
| | | | | | 7.4339 | | | | 5.8786 | | | | 5.8786 | | | | 7.4339 | | | | | | | 7.4339 | |
| | | | | | | | 6.4895 | | | | | | | | 6.4895 | | | | | | | | | 6.4299 | |
| | | | | | | 7.3876 | | | | | | | | | | | | | 7.3104 | | | | | | |
| | | | | | | 7.071 | | | | | | | | | | | | | 6.8051 | | | | | | |
| | | | | | | | | | | | | | | 7.5891 | | | | | | | | | | | |
| | | | | | | 6.3682 | | | | | | | | | | | | | 6.3682 | | | | | | |
| | | | | | | 6.6438 | | | | | | | | | | | | | 6.6438 | | | | | | |
| | | | | | | 9.036 | | | | | | | | | | | | | 7.9638 | | | | | | |
| | | | | | | | | | | | | | | 8.4048 | | | | | | | | | | | |

| | | | | | | | | | | | | | | | | | | | | | | | | | |
|---|---|---|---|---|---|---|---|---|---|---|---|---|---|---|---|---|---|---|---|---|---|---|---|---|---|
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | | | 7.4339 | | | | 4.6942 | | | | 4.6942 | | | | | | 4.6942 | | | | 4.6942 | | | | RU52 |
| | | | 6.4299 | | | | | | 5.4108 | | | | | | | | | | 5.42 | | | | | | RU106 |
| | | | 7.3104 | | | | | | | | | | | 5.5768 | | | | | | | | | | | RU242 |
| | | | | | | | | | | | | 6.8051 | | | | | | | | | | | | | RU484 |
| | | | | | | | | | | | | 7.5891 | | | | | | | | | | | | | RU996 |
| | | | 6.3682 | | | | | | | | | | | 5.941 | | | | | | | | | | | RU26 + RU52 |
| | | | 6.6438 | | | | | | | | | | | 6.2519 | | | | | | | | | | | RU26 + RU106 |
| | | | 7.9638 | | | | | | | | | | | 7.8216 | | | | | | | | | | | RU242 + RU484 |
| | | | | | | | | | | | | 8.4048 | | | | | | | | | | | | | RU242 + RU242 |

Table for the RUs in the 3rd 80 MHz:

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.42 | | | | | | | | | | 5.4108 | | | | | | | | | 6.4299 | | | |
| | | | | | | | | 5.5768 | | | | | | | | | | | | | | 7.3876 | | | |
| | | | | | | | | | | | | | 6.8645 | | | | | | | | | | | | |
| | | | | | | | | | | | | | 6.926 | | | | | | | | | | | | |
| | | | | | | | | 5.941 | | | | | | | | | | | | | | 6.3682 | | | |
| | | | | | | | | 6.2519 | | | | | | | | | | | | | | 6.6438 | | | |
| | | | | | | | | 8.5036 | | | | | | | | | | | | | | 8.937 | | | |
| | | | | | | | | | | | | | 8.5308 | | | | | | | | | | | | |

| | | | | | | | | | | | | | | | | | | | | | | | | | |
|---|---|---|---|---|---|---|---|---|---|---|---|---|---|---|---|---|---|---|---|---|---|---|---|---|---|
| | | 5.6374 | | 4.7677 | | 7.9454 | | 4.7677 | | 5.8494 | | 5.7625 | | 4.7677 | | 7.9454 | | 4.7677 | | 5.6374 | | 6.9809 | | | 5.8494 |
| | | | | | 7.4339 | | | | 5.8786 | | | | 5.9301 | | | | 7.4339 | | | | | | | 7.4339 | |
| | | | | | | | 6.4895 | | | | | | | | 6.7073 | | | | | | | | | 6.4299 | |
| | | | | | | 7.3876 | | | | | | | | | | | | | 8.5833 | | | | | | |
| | | | | | | 6.8645 | | | | | | | | | | | | | 7.8577 | | | | | | |
| | | | | | | | | | | | | | | 6.926 | | | | | | | | | | | |
| | | | | | | 6.3682 | | | | | | | | | | | | | 6.3682 | | | | | | |
| | | | | | | 6.6438 | | | | | | | | | | | | | 6.6061 | | | | | | |
| | | | | | | 8.937 | | | | | | | | | | | | | 9.4304 | | | | | | |
| | | | | | | | | | | | | | | 8.5308 | | | | | | | | | | | |

| | | | | | | | | | | | | | | | | | | | | | | | | | |
|---|---|---|---|---|---|---|---|---|---|---|---|---|---|---|---|---|---|---|---|---|---|---|---|---|---|
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | | | 7.4339 | | | | 4.6942 | | | | 4.6942 | | | | | | 4.6942 | | | | 4.6942 | | | | RU52 |
| | | | 6.4299 | | | | | | 5.4108 | | | | | | | | | | 5.42 | | | | | | RU106 |
| | | | 8.5833 | | | | | | | | | | | 5.5768 | | | | | | | | | | | RU242 |
| | | | | | | | | | | | | 7.8577 | | | | | | | | | | | | | RU484 |
| | | | | | | | | | | | | 6.926 | | | | | | | | | | | | | RU996 |

-continued

| | | |
|---|---|---|
| 6.3682 | 5.941 | RU26 + RU52 |
| 6.6061 | 6.2519 | RU26 + RU106 |
| 9.4304 | 8.4146 | RU242 + RU484 |
| | 8.5308 | RU242 + RU242 |

For another example, the sequence has the following PAPR values on other RUs in more than 80 MHz (namely, RU combinations) in table A.

| | | | | | | | | | | |
|---|---|---|---|---|---|---|---|---|---|---|
| 8.9909 | 8.9993 | 9.1422 | 8.1417 | 9.3959 | 8.3772 | 8.7142 | | | 9.2975 | |
| 8.5024 | 8.9639 | 8.3662 | 8.6109 | 8.6682 | 8.9119 | 7.8619 | | | 8.6701 | |
| 9.2581 | | 8.6046 | | 9.5535 | | | | 9.3087 | | |
| 7.4638 | | 9.5899 | | | | | 7.3504 | | | |
| | | | | | | 8.7061 | | | | |
| | | | | | 9.2975 | | | | | RU484 + RU996 |
| | 8.7556 | 9.5175 | | 8.7914 | 8.3456 | 8.4336 | 8.2923 | 9.2927 | 8.552 | RU242 + RU484 + RU996 |
| | 8.3311 | | | | | 9.2032 | | | | RU484 + RU2 * 996 |
| | | | | | 7.3504 | | | | | RU2 * 996 |
| | | | | | 8.7061 | | | | | RU3 * 996 |

4. 2×LTF Sequence in the 320 MHz Bandwidth (Referred to as an LTF2×320M Sequence for Short)

4-1. There is a possible LTF2×320M sequence=[LTF2×80M $0_{23}$ LTF2×80M $0_{23}$−LTF2×80M $0_{23}$−LTF2×80M]. LTF2×80M is an 80 MHz 2×LTF sequence in the 802.11ax standard. For a specific sequence, refer to the 802.11ax standard.

The sequence has relatively low PAPR values in various cases (including a full bandwidth of the 320 MHz, various puncturing patterns for the 320 MHz, and various multiple RU combinations for the 320 MHz) in table B of the 320 MHz. For example, a PAPR value of the LTF2×320M sequence in the full bandwidth, a puncturing pattern, or an RU (or a multiple RU combination) is 10.9310 dB. PAPR values in the other puncturing patterns each are less than 10.9310 dB. For example, a PAPR value is 10.4917 dB in the full bandwidth or puncturing pattern 1.

For example, the sequence has the following PAPR values on RUs (including a plurality of RU combinations or single RUs) in the 1st 80 MHz, the 2nd 80 MHz, the 3rd 80 MHz, and the 4th 80 MHz.

PAPR value table for the RUs in the 1st, the 2nd, the 3rd, and the 4th 80 MHz:

| | | | | | | | | | | | | | |
|---|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 | |
| 4.6942 | | 4.6942 | | | 4.6942 | | 4.6942 | | 7.4339 | | | 7.4339 | |
| | 5.4199 | | | | | 5.4109 | | | | | 6.4299 | | |
| | | | | 5.5768 | | | | | | | 8.2385 | | |
| | | | | | | 7.3472 | | | | | | | |
| | | | | | | 6.5164 | | | | | | | |
| | | | | 5.9411 | | | | | | | 6.3682 | | |
| | | | | 6.2519 | | | | | | | 6.6065 | | |
| | | | | 8.5628 | | | | | | | 8.6875 | | |
| | | | | | | 8.5308 | | | | | | | |
| | 5.6374 | 4.7677 | 7.9454 | 4.7677 | 5.7625 | 5.8494 | 4.7677 | 7.9454 | 4.7677 | 5.6374 | 6.9809 | 5.8494 | |
| | | 7.4339 | | 5.9301 | | 5.8786 | | 7.4339 | | | | 7.4339 | |
| | | | 6.7073 | | | | 6.4895 | | | | | 6.4299 | |
| | | | 8.2385 | | | | | | 7.3114 | | | | |
| | | | 7.3472 | | | | | | 6.5837 | | | | |
| | | | | | | | 6.5164 | | | | | | |
| | | | 6.3682 | | | | | | 6.3682 | | | | |
| | | | 6.6065 | | | | | | 6.644 | | | | |
| | | | 8.6875 | | | | | | 9.6763 | | | | |
| | | | | | | | 8.5308 | | | | | | |
| | 6.9809 | 5.8494 | 4.4605 | 4.4605 | 4.4605 | 4.4605 | 4.4605 | 4.4605 | 4.4605 | 4.4605 | 4.4605 | | RU26 |
| | 7.4339 | | 4.6942 | | 4.6942 | | | 4.6942 | | 4.6942 | | | RU52 |
| | 6.4299 | | | 5.4109 | | | | | 5.4199 | | | | RU106 |
| | 7.3114 | | | | | | 5.5768 | | | | | | RU242 |
| | | | | | | 6.5837 | | | | | | | RU484 |
| | | | | | | 6.5164 | | | | | | | RU996 |
| | 6.3682 | | | | | | 5.9411 | | | | | | RU26 + RU52 |
| | 6.644 | | | | | | 6.2519 | | | | | | RU26 + RU106 |
| | 9.6763 | | | | | | 8.1829 | | | | | | RU242 + RU484 |
| | | | | | | 8.5308 | | | | | | | RU242 + RU242 |

For another example, the sequence has the following PAPR values on other RUs in more than 80 MHz (namely, RU combinations) in table B.

| | | | | | | |
|---|---|---|---|---|---|---|
| 7.7723 | 9.1539 | 7.7919 | 9.0583 | 7.7723 | 9.1539 | 7.7919 |
| 9.9366 8.6878 | 8.9345 10.492 | 9.8654 8.5346 | 9.4097 10.364 | 9.9366 8.6878 | 8.9345 10.492 | 9.8654 8.5346 |
| 9.0793 | 9.991 | 10.152 | 10.714 | 10.02 | 10.931 | 9.0257 |
| 10.107 | 10.107 | 8.6961 | | 8.6961 | | |
| 8.9611 | 9.9059 | 9.5392 | 10.689 | 9.3293 | 10.153 | |
| 9.3124 | 10.461 | 9.6129 | 10.431 | 8.9207 | 10.027 | |
| 8.1092 | 9.0498 | 9.0633 | 9.8325 | 7.943 | 9.079 | |
| 7.9181 | 8.9584 | 9.0418 | 9.9572 | 8.2538 | 8.8582 | |
| 9.2012 | 9.422 | | | 9.4879 | | |
| 9.4879 | 9.422 | | | 9.2012 | | |
| 9.422 | 9.4879 | | | 9.2012 | | |
| 9.2012 | 9.4879 | | | 9.422 | | |
| | | | 10.1401 | | | |
| | | 9.0583 | | | RU484 + RU996 | |
| | 9.4097 | | 10.364 | | RU242 + RU484 + RU996 | |
| | | 9.6559 | | | RU484 + RU3 * 996 | |
| | | 8.6961 | | | RU3 * 996 | |
| | | 10.153 | | | RU484 + RU2 * 996 | |
| | | 10.027 | | | | |
| | | 9.079 | | | | |
| | | 8.8582 | | | | |
| | | 9.4879 | | | RU2 * 996 | |
| | | 9.2012 | | | | |
| | | 9.2012 | | | | |
| | | 9.422 | | | | |
| | | 10.1401 | | | RU4 * 996 | |

It should be noted that, values from left to right in the $1^{st}$ row of the foregoing table are sequentially PAPR values on the RU combination in the $1^{st}$ mode to the RU combination in the 8th mode of RU484+RU996 in the 320 MHz described above. Values from left to right in the $2^{nd}$ row of the table are sequentially PAPR values on the RU combination in the $1^{st}$ mode to the RU combination in the 16th mode of RU242+RU484+RU996 in the 320 MHz described above. Values from left to right in the $3^{rd}$ row of the table are sequentially PAPR values on the RU combination in the $1^{st}$ mode to the RU combination in the 8th mode of RU484+3*RU996 in the 320 MHz described above. Values from left to right in the $4^{th}$ row of the table are sequentially PAPR values on the RU combination in the $1^{st}$ mode to the RU combination in the 4th mode of 3*RU996 in the 320 MHz described above. Values from left to right in the $5^{th}$ row of the table are sequentially PAPR values on the RU combination in the $1^{st}$ mode to the RU combination in the 24th mode of RU484+2*RU996 in the 320 MHz described above. Values from left to right in each sub-row of the $5^{th}$ row are sequentially PAPR values on the RU combination in the $1^{st}$ mode to the RU combination in the 6th mode of RU484+2*RU996 in each 80 MHz of the 320 MHz. Values from left to right in the $6^{th}$ row of the table are sequentially PAPR values on the RU combination in the $1^{st}$ mode to the RU combination in the $12^{th}$ mode of 2*RU996 in the 320 MHz described above. Values from left to right in each sub-row of the $6^{th}$ row are sequentially PAPR values on the RU combination in the $1^{st}$ mode to the RU combination in the $3^{rd}$ mode of 2*RU996 in each 80 MHz of the 320 MHz. A value in the 7th row of the table is a PAPR value on the 4*RU996 combination in the 320 MHz described above.

It should be understood that, a correspondence between a PAPR value of an RU in more than 80 MHz (namely, an RU combination) in the foregoing table and the RU combination is applicable to a PAPR value table for other RUs in more than 80 MHz in this specification. In other words, PAPR values in a PAPR value table for other RUs in more than 80 MHz (namely, RU combinations) one to one correspond to the RU combinations described in the previous paragraph. The following description provides only PAPR values in a table. A correspondence between a PAPR value and an RU combination in the table is not described again.

4-2. There is a possible LTF2×320M sequence=[LTF2×160M $0_{23}$ LTF2×160M]. LTF2×160M is a 160 MHz 2×LTF sequence in the 802.11ax standard. For a specific sequence, refer to the 802.11ax standard. A PAPR value of the LTF2×320M sequence in the full bandwidth or puncturing pattern 1 for the 320 MHz is 10.1655 dB. Alternatively, the sequence has relatively low PAPR values in various cases (including a full bandwidth of the 320 MHz, various puncturing patterns for the 320 MHz, and various multiple RU combinations for the 320 MHz) in table B of the 320 MHz.

For example, a PAPR value of the LTF2×320M sequence in the full bandwidth, a puncturing pattern, or an RU combination is 10.5867 dB. PAPR values in the other puncturing patterns each are less than 10.5867 dB.

For example, the sequence has the following PAPR values on RUs (including a plurality of RU combinations or single RUs) in the $1^{st}$ 80 MHz, the $2^{nd}$ 80 MHz, the $3^{rd}$ 80 MHz, and the $4^{th}$ 80 MHz.

Table for the RUs in the $1^{st}$ and the $3^{rd}$ 80 MHz:

| | | | | | | | | | | | | | | | | | | | | |
|---|---|---|---|---|---|---|---|---|---|---|---|---|---|---|---|---|---|---|---|---|
| 4.4605 | | 4.4605 | | 4.4605 | | 4.4605 | 4.4605 | 4.4605 | | 4.4605 | | 4.4605 | | 4.4605 | 5.8494 | | 6.9809 | 5.8494 | | 6.9809 |
| | 4.6942 | | | | 4.6942 | | | | 4.6942 | | | | 4.6942 | | | 7.4339 | | | 7.4339 | |
| | | | 5.4199 | | | | | | | | 5.4109 | | | | | | | 6.4299 | | |
| | | | | | | | 5.5768 | | | | | | | | | | | 8.2385 | | |
| | | | | | | | | | | | 7.3472 | | | | | | | | | |
| | | | | | | | | | | | 6.5164 | | | | | | | | | |
| | | | | | | | 5.9411 | | | | | | | | | | | 6.3682 | | |
| | | | | | | | 6.2519 | | | | | | | | | | | 6.6065 | | |
| | | | | | | | 8.5628 | | | | | | | | | | | 8.6875 | | |

| | | | | | | | | | | | | | | | | | | | |
|---|---|---|---|---|---|---|---|---|---|---|---|---|---|---|---|---|---|---|---|
| 5.6374 | 4.7677 | | 7.9454 | | 4.7677 | | 5.7625 | 5.8494 | | 4.7677 | | 7.9454 | | 4.7677 | | 5.6374 | 6.9809 | | 5.8494 |
| | | 7.4339 | | | | 5.9301 | | | 5.8786 | | | | 7.4339 | | | | | 7.4339 | |
| | | | | 6.7073 | | | | | | | 6.4895 | | | | | | | 6.4299 | |
| | | | 8.2385 | | | | | | | | | | | | 7.3114 | | | | |
| | | | 7.3472 | | | | | | | | | | | | 6.5837 | | | | |
| | | | | | | | | | | 6.5164 | | | | | | | | | |
| | | | 6.3682 | | | | | | | | | | | | 6.3682 | | | | |
| | | | 6.6065 | | | | | | | | | | | | 6.644 | | | | |
| | | | 8.6875 | | | | | | | | | | | | 9.6763 | | | | |

| | | | | | | | | | | | | | | | | | | |
|---|---|---|---|---|---|---|---|---|---|---|---|---|---|---|---|---|---|---|
| 6.9809 | | 5.8494 | 4.4605 | | 4.4605 | | 4.4605 | | 4.4605 | 4.4605 | 4.4605 | | 4.4605 | | 4.4605 | | 4.4605 | RU26 |
| | 7.4339 | | | 4.6942 | | | | 4.6942 | | | | 4.6942 | | | | 4.6942 | | RU52 |
| | 6.4299 | | | | | 5.4109 | | | | | | | | 5.4199 | | | | RU106 |
| | 7.3114 | | | | | | | | | 5.5768 | | | | | | | | RU242 |
| | | | | | | | | | 6.5837 | | | | | | | | | RU484 |
| | | | | | | | | | 6.5164 | | | | | | | | | RU996 |
| | 6.3682 | | | | | | | | | 5.9411 | | | | | | | | RU26 + RU52 |
| | 6.644 | | | | | | | | | 6.2519 | | | | | | | | RU26 + RU106 |
| | 9.6763 | | | | | | | | | 8.1829 | | | | | | | | RU242 + RU484 |

Table for the RUs in the 2$^{nd}$ and the 4th 80 MHz:

| | | | | | | | | | | | | | | | | | | | | |
|---|---|---|---|---|---|---|---|---|---|---|---|---|---|---|---|---|---|---|---|---|
| 4.4605 | | 4.4605 | | 4.4605 | | 4.4605 | 4.4605 | 4.4605 | | 4.4605 | | 4.4605 | | 4.4605 | 5.8494 | | 6.9809 | 5.8494 | | 6.9809 |
| | 4.6942 | | | | 4.6942 | | | | 4.6942 | | | | 4.6942 | | | 7.4339 | | | 7.4339 | |
| | | | 5.4199 | | | | | | | | 5.4109 | | | | | | | 6.4299 | | |
| | | | | | | | 5.5768 | | | | | | | | | | | 7.3876 | | |
| | | | | | | | | | | | 7.0698 | | | | | | | | | |
| | | | | | | | | | | | 7.5947 | | | | | | | | | |
| | | | | | | | 5.9411 | | | | | | | | | | | 6.3682 | | |
| | | | | | | | 6.2519 | | | | | | | | | | | 6.644 | | |
| | | | | | | | 8.2131 | | | | | | | | | | | 9.04 | | |

| | | | | | | | | | | | | | | | | | | | |
|---|---|---|---|---|---|---|---|---|---|---|---|---|---|---|---|---|---|---|---|
| 5.6374 | 4.7677 | | 7.9454 | | 4.7677 | | 5.8494 | 5.8494 | | 4.7677 | | 7.9454 | | 4.7677 | | 5.6374 | 6.9809 | | 5.8494 |
| | | 7.4339 | | | | 5.8786 | | | 5.8786 | | | | 7.4339 | | | | | 7.4339 | |
| | | | | 6.4895 | | | | | | | 6.4895 | | | | | | | 6.4299 | |
| | | | 7.3876 | | | | | | | | | | | | 7.3114 | | | | |
| | | | 7.0698 | | | | | | | | | | | | 6.8051 | | | | |
| | | | | | | | | | | 7.5947 | | | | | | | | | |
| | | | 6.3682 | | | | | | | | | | | | 6.3682 | | | | |
| | | | 6.644 | | | | | | | | | | | | 6.644 | | | | |
| | | | 9.04 | | | | | | | | | | | | 7.9723 | | | | |

| | | | | | | | | | | | | | | | | | | |
|---|---|---|---|---|---|---|---|---|---|---|---|---|---|---|---|---|---|---|
| 6.9809 | | 5.8494 | 4.4605 | | 4.4605 | | 4.4605 | | 4.4605 | 4.4605 | 4.4605 | | 4.4605 | | 4.4605 | | 4.4605 | RU26 |
| | 7.4339 | | | 4.6942 | | | | 4.6942 | | | | 4.6942 | | | | 4.6942 | | RU52 |
| | 6.4299 | | | | | 5.4109 | | | | | | | | 5.4199 | | | | RU106 |
| | 7.3114 | | | | | | | | | 5.5768 | | | | | | | | RU242 |
| | | | | | | | | | 6.8051 | | | | | | | | | RU484 |
| | | | | | | | | | 7.5947 | | | | | | | | | RU996 |
| | 6.3682 | | | | | | | | | 5.9411 | | | | | | | | RU26 + RU52 |
| | 6.644 | | | | | | | | | 6.2519 | | | | | | | | RU26 + RU106 |
| | 7.9723 | | | | | | | | | 7.8201 | | | | | | | | RU242 + RU484 |

The sequence has the following PAPR values on other RUs in more than 80 MHz (namely, RU combinations) in table B.

| | | | | | | | | |
|---|---|---|---|---|---|---|---|---|
| 8.5779 | 9.7901 | 8.8384 | 7.5067 | 8.5779 | 9.7901 | 8.8384 | 7.5067 | RU484 + RU996 |
| 9.8211 | 10.421 | 10.587 | 9.8727 | 9.8211 | 10.459 | 10.587 | 9.3701 | RU484 + RU3 * 996 |
| 9.6089 | | 9.3181 | | 9.6089 | | 9.2212 | | RU3 * 996 |
| 7.8599 | | | | 7.8599 | | | | RU2 * 996 |
| 10.1655 | | | | | | | | RU4 * 996 |

4-3. There is a possible LTF2×320M sequence=[LTF2×160M $0_{23}$–LTF2×160M]. LTF2×160M is a 160 MHz 2×LTF sequence in the 802.11ax standard. For a specific sequence, refer to the 802.11ax standard.

The LTF2×320M sequence has relatively low PAPR values in various cases (including a full bandwidth of the 320 MHz, various puncturing patterns for the 320 MHz, and various multiple RU combinations for 320 MHz) in table B of the 320 MHz. For example, a PAPR value in the full bandwidth, a puncturing pattern, or an RU (or a multiple RU combination) is 11.2017 dB.

For example, the sequence has the following PAPR values on RUs (including a plurality of RU combinations or single RUs) in the $1^{st}$ 80 MHz, the $2^{nd}$ 80 MHz, the $3^{rd}$ 80 MHz, and the $4^{th}$ 80 MHz.

Table for the RUs in the $1^{st}$ and the $3^{rd}$ 80 MHz:

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | | 4.6942 | | | 4.6942 | | 4.6942 | | 7.4339 | | | 7.4339 |
| | 5.4199 | | | | | 5.4109 | | | | | 6.4299 | |
| | | | | 5.5768 | | | | | | | 8.2385 | |
| | | | | | | 7.3472 | | | | | | |
| | | | | | | 6.5164 | | | | | | |
| | | | | 5.9411 | | | | | | | 6.3682 | |
| | | | | 6.2519 | | | | | | | 6.6065 | |
| | | | | 8.5628 | | | | | | | 8.6875 | |
| | | | | | | 8.5308 | | | | | | |

| | | | | | | | | | | | |
|---|---|---|---|---|---|---|---|---|---|---|---|
| 5.6374 | 4.7677 | 7.9454 | 4.7677 | 5.7625 | 5.8494 | 4.7677 | 7.9454 | 4.7677 | 5.6374 | 6.9809 | 5.8494 |
| | 7.4339 | | 5.9301 | | 5.8786 | | 7.4339 | | | | 7.4339 |
| | | 6.7073 | | | | 6.4895 | | | | | 6.4299 |
| | | 8.2385 | | | | | | 7.3114 | | | |
| | | 7.3472 | | | | | | 6.5837 | | | |
| | | | | | | 6.5164 | | | | | |
| | | 6.3682 | | | | | | 6.3682 | | | |
| | | 6.6065 | | | | | | 6.644 | | | |
| | | 8.6875 | | | | | | 9.6763 | | | |
| | | | | | | 8.5308 | | | | | |

| | | | | | | | | | | | |
|---|---|---|---|---|---|---|---|---|---|---|---|
| 6.9809 | 5.8494 | 4.4605 | 4.4605 | 4.4605 | 4.4605 | 4.4605 | 4.4605 | 4.4605 | 4.4605 | 4.4605 | RU26 |
| 7.4339 | | 4.6942 | | 4.6942 | | | 4.6942 | | 4.6942 | | RU52 |
| 6.4299 | | | 5.4109 | | | | | 5.4199 | | | RU106 |
| 7.3114 | | | | | | 5.5768 | | | | | RU242 |
| | | | | | 6.5837 | | | | | | RU484 |
| | | | | | 6.5164 | | | | | | RU996 |
| 6.3682 | | | | | | 5.9411 | | | | | RU26 + RU52 |
| 6.644 | | | | | | 6.2519 | | | | | RU26 + RU106 |
| 9.6763 | | | | | | 8.1829 | | | | | RU242 + RU484 |
| | | | | | 8.5308 | | | | | | RU242 + RU242 |

Table for the RUs in the 2nd and the 4th 80 MHz:

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| | 4.6942 | | 4.6942 | | | 4.6942 | | 4.6942 | | 7.4339 | | 7.4339 |
| | | 5.4199 | | | | | 5.4109 | | | | 6.4299 | |
| | | | | 5.5768 | | | | | | | 7.3876 | |
| | | | | | | | 7.0698 | | | | | |
| | | | | | | | 7.5947 | | | | | |
| | | | | 5.9411 | | | | | | | 6.3682 | |
| | | | | 6.2519 | | | | | | | 6.644 | |
| | | | | 8.2131 | | | | | | | 9.04 | |
| | | | | | | | 8.4249 | | | | | |

| | | | | | | | | | | | | |
|---|---|---|---|---|---|---|---|---|---|---|---|---|
| | 5.6374 | 4.7677 | 7.9454 | 4.7677 | 5.8494 | 5.8494 | 4.7677 | 7.9454 | 4.7677 | 5.6374 | 6.9809 | 5.8494 |
| | | | 7.4339 | | 5.8786 | | 5.8786 | | 7.4339 | | | 7.4339 |
| | | | | 6.4895 | | | | 6.4895 | | | | 6.4299 |
| | | | 7.3876 | | | | | | | 7.3114 | | |
| | | | 7.0698 | | | | | | | 6.8051 | | |
| | | | | | | | 7.5947 | | | | | |
| | | | 6.3682 | | | | | | | 6.3682 | | |
| | | | 6.644 | | | | | | | 6.644 | | |
| | | | 9.04 | | | | | | | 7.9723 | | |
| | | | | | | | 8.4249 | | | | | |

| | | | | | | | | | | | | |
|---|---|---|---|---|---|---|---|---|---|---|---|---|
| | 6.9809 | 5.8494 | 4.4605 | 4.4605 | 4.4605 | 4.4605 | 4.4605 | 4.4605 | 4.4605 | 4.4605 | 4.4605 | RU26 |
| | | 7.4339 | | 4.6942 | | 4.6942 | | | 4.6942 | | 4.6942 | RU52 |
| | | 6.4299 | | | 5.4109 | | | | | 5.4199 | | RU106 |
| | | 7.3114 | | | | | 5.5768 | | | | | RU242 |
| | | | | | | 6.8051 | | | | | | RU484 |
| | | | | | | 7.5947 | | | | | | RU996 |
| | | 6.3682 | | | | | 5.9411 | | | | | RU26 + RU52 |
| | | 6.644 | | | | | 6.2519 | | | | | RU26 + RU106 |
| | | 7.9723 | | | | | 7.8201 | | | | | RU242 + RU484 |
| | | | | | | 8.4249 | | | | | | RU242 + RU242 |

For another example, the sequence has the following PAPR values on other RUs in more than 80 MHz (namely, RU combinations) in table B.

| | | | | | | |
|---|---|---|---|---|---|---|
| 8.5779 | 9.7901 | 8.8384 | 7.5067 | 8.5779 | 9.7901 | 8.8384 |
| 8.4293 8.7376 | 9.5118 8.5275 | 9.2946 9.0886 | 7.4902 8.5144 | 8.4293 8.7376 | 9.5118 8.5275 | 9.2946 9.0886 |
| 9.6939 | 10.684 | 10.19 | 9.1133 | 9.6939 | 10.34 | 10.034 |
| 8.968 | 9.5228 | 8.7432 | | | 9.5228 | |
| 8.1123 | 9.8583 | 8.441 | 9.1406 | 10.129 | | 9.5351 |
| 10.555 | 11.202 | 9.392 | 8.1659 | 9.1577 | | 9.0528 |
| 8.8054 | 9.1334 | 9.7195 | 9.5351 | 8.9477 | | 9.049 |
| 9.2871 | 8.1322 | 10.555 | 10.932 | 9.1577 | | 8.1294 |
| 7.8599 | 7.6716 | | | 9.4879 | | |
| 10.382 | 7.6716 | | | 7.8599 | | |
| 7.8147 | 9.4879 | | | 7.8599 | | |
| 7.8599 | 10.382 | | | 7.8147 | | |
| | | | 10.2552 | | | |

| | | | | | |
|---|---|---|---|---|---|
| | | 7.5067 | | | RU484 + RU996 |
| | 7.4902 | | 8.5144 | | RU242 + RU484 + RU996 |
| | | 9.4725 | | | RU484 + RU3 * 996 |
| | | 9.5228 | | | RU3 * 996 |
| | | 9.5351 | | | RU484 + RU2 * 996 |
| | | 9.0528 | | | |
| | | 9.049 | | | |
| | | 8.1294 | | | |
| | | 9.4879 | | | RU2 * 996 |
| | | 7.8599 | | | |
| | | 7.8599 | | | |
| | | 7.8147 | | | |
| | | 10.2552 | | | RU4 * 996 |

4-4. There is a possible LTF2×320M sequence=[LTF2×80M$_{part1}$ LTF2×80M$_{part2}$−LTF2×80M$_{part3}$ LTF2×80M$_{part4}$ LTF2×80M$_{part5}$ $0_{23}$ LTF2×80M$_{part1}$ LTF2×80M$_{part2}$ LTF2×80M$_{part3}$−LTF2×80M$_{part4}$−LTF2×80M$_{part5}$ $0_{23}$ LTF2×80M$_{part1}$−LTF2×80M$_{part2}$ LTF2×80M$_{part3}$ LTF2×80M$_{part4}$−LTF2×80M$_{part5}$ $0_{23}$ LTF2×80M$_{part1}$ LTF2×80M$_{part2}$−LTF2×80M$_{part3}$ LTF2×80M$_{part4}$ LTF2×80M$_{part5}$]. LTF2×80M$_{part1}$, LTF2×80M$_{part2}$, LTF2×80M$_{part3}$, LTF2×80M$_{part4}$, and LTF2×80M$_{part5}$ are respectively an 80 MHz$_{part1}$ 2×LTF sequence, an 80 MHz$_{part2}$ 2×LTF sequence, an 80 MHz$_{part3}$ 2×LTF sequence, an 80 MHz$_{part4}$ 2×LTF sequence, and an 80 MHz$_{part5}$ 2×LTF sequence in the 802.11ax standard. For specific sequences, refer to the 802.11ax standard.

The LTF2×320M sequence has relatively low PAPR values in various cases (including a full bandwidth of the 320 MHz, various puncturing patterns for the 320 MHz, and various multiple RU combinations for 320 MHz) in table B of the 320 MHz.

For example, the sequence has the following PAPR values on RUs (a plurality of RU combinations or single RUs) in the 1st 80 MHz to the 4th 80 MHz.

Table for the RUs in the 1st and the 4th 80 MHz:

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | | 4.6942 | | | 4.6942 | | 4.6942 | | 7.4339 | | 7.4339 | |
| | 5.4199 | | | | | 5.4109 | | | | | 6.4299 | |
| | | | | 5.5768 | | | | | | | 7.3876 | |
| | | | | | | 6.8645 | | | | | | |
| | | | | | | 6.9319 | | | | | | |
| | | | | 5.9411 | | | | | | | 6.3682 | |
| | | | | 6.2519 | | | | | | | 6.644 | |
| | | | | 8.5262 | | | | | | | 8.9353 | |
| | | | | | | 8.5308 | | | | | | |

| | | | | | | | | | | | | |
|---|---|---|---|---|---|---|---|---|---|---|---|---|
| | 5.6374 | 4.7677 | 7.9454 | 4.7677 | 5.8494 | 5.7625 | 4.7677 | 7.9454 | 4.7677 | 5.6374 | 6.9809 | 5.8494 |
| | | 7.4339 | | 5.8786 | | 5.9301 | | 7.4339 | | | 7.4339 | |
| | | | 6.4895 | | | | 6.7073 | | | | 6.4299 | |
| | | | 7.3876 | | | | | | 8.5832 | | | |
| | | | 6.8645 | | | | | | 7.8591 | | | |
| | | | | | | | 6.9319 | | | | | |
| | | | 6.3682 | | | | | | 6.3682 | | | |
| | | | 6.644 | | | | | | 6.6065 | | | |
| | | | 8.9353 | | | | | | 9.4363 | | | |
| | | | | | | | 8.5308 | | | | | |

| | | | | | | | | | | | | |
|---|---|---|---|---|---|---|---|---|---|---|---|---|
| | 6.9809 | 5.8494 | 4.4605 | 4.4605 | 4.4605 | 4.4605 | 4.4605 | 4.4605 | 4.4605 | 4.4605 | 4.4605 | RU26 |
| | 7.4339 | | 4.6942 | | 4.6942 | | | 4.6942 | | 4.6942 | | RU52 |
| | 6.4299 | | | 5.4109 | | | | | 5.4199 | | | RU106 |
| | 8.5832 | | | | | | 5.5768 | | | | | RU242 |
| | | | | | | 7.8591 | | | | | | RU484 |
| | | | | | | 6.9319 | | | | | | RU996 |
| | 6.3682 | | | | | | 5.9411 | | | | | RU26 + RU52 |
| | 6.6065 | | | | | | 6.2519 | | | | | RU26 + RU106 |
| | 9.4363 | | | | | | 8.4131 | | | | | RU242 + RU484 |
| | | | | | | 8.5308 | | | | | | RU242 + RU242 |

Table for the RUs in the 2nd 80 MHz:

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | | 4.6942 | | | 4.6942 | | 4.6942 | | 7.4339 | | 7.4339 | |
| | 5.4199 | | | | | 5.4109 | | | | | 6.4299 | |
| | | | | 5.5768 | | | | | | | 7.3876 | |
| | | | | | | 6.8645 | | | | | | |
| | | | | | | 7.4709 | | | | | | |
| | | | | 5.9411 | | | | | | | 6.3682 | |
| | | | | 6.2519 | | | | | | | 6.644 | |
| | | | | 7.9972 | | | | | | | 8.0269 | |
| | | | | | | 8.4249 | | | | | | |

| | | | | | | | | | | | | |
|---|---|---|---|---|---|---|---|---|---|---|---|---|
| | 5.6374 | 4.7677 | 7.9454 | 4.7677 | 5.8494 | 5.8494 | 4.7677 | 7.9454 | 4.7677 | 5.6374 | 6.9809 | 5.8494 |
| | | 7.4339 | | 5.8786 | | 5.8786 | | 7.4339 | | | 7.4339 | |
| | | | 6.4895 | | | | 6.4895 | | | | 6.4299 | |
| | | | 7.3876 | | | | | | 7.3114 | | | |
| | | | 6.8645 | | | | | | 6.5837 | | | |
| | | | | | | | 7.4709 | | | | | |
| | | | 6.3682 | | | | | | 6.3682 | | | |
| | | | 6.644 | | | | | | 6.644 | | | |
| | | | 8.0269 | | | | | | 9.0745 | | | |
| | | | | | | | 8.4249 | | | | | |

| | | | | | | | | | | | | |
|---|---|---|---|---|---|---|---|---|---|---|---|---|
| | 6.9809 | 5.8494 | 4.4605 | 4.4605 | 4.4605 | 4.4605 | 4.4605 | 4.4605 | 4.4605 | 4.4605 | 4.4605 | RU26 |
| | 7.4339 | | 4.6942 | | 4.6942 | | | 4.6942 | | 4.6942 | | RU52 |
| | 6.4299 | | | 5.4109 | | | | | 5.4199 | | | RU106 |
| | 7.3144 | | | | | | 5.5768 | | | | | RU242 |
| | | | | | | 6.5837 | | | | | | RU484 |
| | | | | | | 7.4709 | | | | | | RU996 |

-continued

| | | | | | | | | | | | | |
|---|---|---|---|---|---|---|---|---|---|---|---|---|
| | 6.3682 | | | | | | 5.9411 | | | | | RU26 + RU52 |
| | 6.644 | | | | | | 6.2519 | | | | | RU26 + RU106 |
| | 9.0745 | | | | | | 8.1309 | | | | | RU242 + RU484 |
| | | | | | | 8.4249 | | | | | | RU242 + RU242 |

Table for the RUs in the 3rd 80 MHz:

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | | 4.6942 | | | 4.6942 | | 4.6942 | | 7.4339 | | | 7.4339 |
| | 5.4199 | | | | | 5.4109 | | | | | 6.4299 | |
| | | | | 5.5768 | | | | | | | 7.3876 | |
| | | | | | | 7.0698 | | | | | | |
| | | | | | | 7.5947 | | | | | | |
| | | | | 5.9411 | | | | | | | 6.3682 | |
| | | | | 6.2519 | | | | | | | 6.644 | |
| | | | | 8.2131 | | | | | | | 9.04 | |
| | | | | | | 8.4249 | | | | | | |
| | 5.6374 | 4.7677 | 7.9454 | 4.7677 | 5.8494 | 5.8494 | 4.7677 | 7.9454 | 4.7677 | 5.6374 | 6.9809 | 5.8494 |
| | | 7.4339 | | 5.8786 | | 5.8786 | | 7.4339 | | | | 7.4339 |
| | | | 6.4895 | | | | 6.4895 | | | | | 6.4299 |
| | | | 7.3876 | | | | | | 7.3114 | | | |
| | | | 7.0698 | | | | | | 6.8051 | | | |
| | | | | | | | 7.5947 | | | | | |
| | | | 6.3682 | | | | | | 6.3682 | | | |
| | | | 6.644 | | | | | | 6.644 | | | |
| | | | 9.04 | | | | | | 7.9723 | | | |
| | | | | | | | 8.4249 | | | | | |
| | 6.9809 | 5.8494 | 4.4605 | 4.4605 | 4.4605 | 4.4605 | 4.4605 | 4.4605 | 4.4605 | 4.4605 | 4.4605 | RU26 |
| | 7.4339 | | 4.6942 | | 4.6942 | | | 4.6942 | | 4.6942 | | RU52 |
| | 6.4299 | | | 5.4109 | | | | | 5.4199 | | | RU106 |
| | 7.3144 | | | | | | 5.5768 | | | | | RU242 |
| | | | | | | 6.8051 | | | | | | RU484 |
| | | | | | | 7.5947 | | | | | | RU996 |
| | 6.3682 | | | | | | 5.9411 | | | | | RU26 + RU52 |
| | 6.644 | | | | | | 6.2519 | | | | | RU26 + RU106 |
| | 7.9723 | | | | | | 7.8201 | | | | | RU242 + RU484 |
| | | | | | | 8.4249 | | | | | | RU242 + RU242 |

The sequence has the following PAPR values on other RUs in more than 80 MHz (namely, RU combinations) in table B.

| | | | | | | | | |
|---|---|---|---|---|---|---|---|---|
| 9.0574 | 9.4301 | 8.3108 | 8.7531 | 8.7164 | 8.23 | 8.6556 | | 9.3442 |
| 8.7518 | 8.3692 | 9.3091 | 9.0233 | 8.6327 | 7.7906 | 8.7934 | 8.7139 | 9.0544 |
| | 9.3128 | | | | 9.3606 | | | 8.7851 |
| | | | | | 9.3274 | | | |
| | | | | 9.3442 | | | | RU484 + RU996 |
| | 8.2555 | 8.0522 | 8.3967 | 8.9592 | 8.4126 | 8.7432 | 8.9054 | RU242 + RU484 + RU996 |
| | | 8.7851 | | | 8.802 | | | RU3 * 996 |
| | | | 9.3274 | | | | | RU4 * 996 |

4-5. There is a possible LTF2×320M sequence=[$LTF2\times80M_{part1}$ $-LTF2\times80M_{part2}$ $-LTF2\times80M_{part3}$ $-LTF2\times80M_{part}$ $LTF2\times80M_{part5}$ $0_{23}$ $-LTF2\times80M_{part1}$ $LTF2\times80M_{part2}$ $-LTF2\times80M_{part3}$ $-LTF2\times80M_{part}$ $LTF2\times80M_{part5}$ $0_{23}$ $LTF2\times80M_{part1}$ $LTF2\times80M_{part2}$ $-LTF2\times80M_{part3}$ $LTF2\times80M_{part4}$ $LTF2\times80M_{part5}$ $0_{23}$ $LTF2\times80M_{part1}$ $-LTF2\times80M_{part2}$ $-LTF2\times80M_{part3}$ $-LTF2\times80M_{part4}$ $-LTF2\times80M_{part5}$]. $LTF2\times80M_{part1}$, $LTF2\times80M_{part2}$, $LTF2\times80M_{part3}$, $LTF2\times80M_{part4}$, and $LTF2\times80M_{part5}$ are respectively an 80 $MHz_{part1}$ 2×LTF sequence, an 80 $MHz_{part2}$ 2×LTF sequence, an 80 $MHz_{part3}$ 2×LTF sequence, an 80 $MHz_{part4}$ 2×LTF sequence, and an 80 $MHz_{part5}$ 2×LTF sequence in the 802.11ax standard. For specific sequences, refer to the 802.11ax standard.

The LTF2×320M sequence has relatively low PAPR values in various cases (including a full bandwidth of the 320 MHz, various puncturing patterns for the 320 MHz, and various multiple RU combinations for 320 MHz) in table B of the 320 MHz.

For example, the sequence has the following PAPR values on RUs (a plurality of RU combinations or single RUs) in the 1st 80 MHz to the 4th 80 MHz.

Table for the RUs in the 1st 80 MHz:

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.4199 | | | | | | | | | | 5.4109 | | | | | | | | | 6.4299 | | | |
| | | | | | | | | 5.5768 | | | | | | | | | | | | | | 8.2385 | | | |
| | | | | | | | | | | | | | 7.4499 | | | | | | | | | | | | |
| | | | | | | | | | | | | | 6.6821 | | | | | | | | | | | | |
| | | | | | | | | 5.9411 | | | | | | | | | | | | | | 6.3682 | | | |
| | | | | | | | | 6.2519 | | | | | | | | | | | | | | 6.6065 | | | |
| | | | | | | | | 8.0759 | | | | | | | | | | | | | | 9.6228 | | | |
| | | | | | | | | | | | | | 8.5308 | | | | | | | | | | | | |
| | | 5.6374 | | 4.7677 | | 7.9454 | | 4.7677 | | 5.8494 | | 5.8494 | | 4.7677 | | 7.9454 | | 4.7677 | | 5.6374 | | 6.9809 | | | 5.8494 |
| | | | | | 7.4339 | | | | 5.9301 | | | | 5.8786 | | | | 7.4339 | | | | | | | 7.4339 | |
| | | | | | | | 6.7073 | | | | | | | | 6.4895 | | | | | | | | | 6.4299 | |
| | | | | | | 8.2385 | | | | | | | | | | | | | 7.3114 | | | | | | |
| | | | | | | 7.4499 | | | | | | | | | | | | | 6.8051 | | | | | | |
| | | | | | | | | | | | | | | 6.6821 | | | | | | | | | | | |
| | | | | | | 6.3682 | | | | | | | | | | | | | 6.3682 | | | | | | |
| | | | | | | 6.6065 | | | | | | | | | | | | | 6.644 | | | | | | |
| | | | | | | 9.6228 | | | | | | | | | | | | | 8.6909 | | | | | | |
| | | | | | | | | | | | | | | 8.5308 | | | | | | | | | | | |
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | | | 7.4339 | | | | 4.6942 | | | | 4.6942 | | | | | | 4.6942 | | | | 4.6942 | | | | RU52 |
| | | | 6.4299 | | | | | | 5.4109 | | | | | | | | | | 5.4199 | | | | | | RU106 |
| | | | 7.3144 | | | | | | | | | | | 5.5768 | | | | | | | | | | | RU242 |
| | | | | | | | | | | | | 6.8051 | | | | | | | | | | | | | RU484 |
| | | | | | | | | | | | | 6.6821 | | | | | | | | | | | | | RU996 |
| | | | 6.3682 | | | | | | | | | | | 5.9411 | | | | | | | | | | | RU26 + RU52 |
| | | | 6.644 | | | | | | | | | | | 6.2519 | | | | | | | | | | | RU26 + RU106 |
| | | | 8.6909 | | | | | | | | | | | 8.8288 | | | | | | | | | | | RU242 + RU484 |
| | | | | | | | | | | | | 8.5308 | | | | | | | | | | | | | RU242 + RU242 |

Table for the RUs in the 2nd 80 MHz:

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.4199 | | | | | | | | | | 5.4109 | | | | | | | | | 6.4299 | | | |
| | | | | | | | | 5.5768 | | | | | | | | | | | | | | 7.3876 | | | |
| | | | | | | | | | | | | | 7.0698 | | | | | | | | | | | | |
| | | | | | | | | | | | | | 7.5947 | | | | | | | | | | | | |
| | | | | | | | | 5.9411 | | | | | | | | | | | | | | 6.3682 | | | |
| | | | | | | | | 6.2519 | | | | | | | | | | | | | | 6.644 | | | |
| | | | | | | | | 8.2131 | | | | | | | | | | | | | | 9.04 | | | |
| | | | | | | | | | | | | | 8.4249 | | | | | | | | | | | | |
| | | 5.6374 | | 4.7677 | | 7.9454 | | 4.7677 | | 5.8494 | | 5.8494 | | 4.7677 | | 7.9454 | | 4.7677 | | 5.6374 | | 6.9809 | | | 5.8494 |
| | | | | | 7.4339 | | | | 5.8786 | | | | 5.8786 | | | | 7.4339 | | | | | | | 7.4339 | |
| | | | | | | | 6.4895 | | | | | | | | 6.4895 | | | | | | | | | 6.4299 | |
| | | | | | | 7.3876 | | | | | | | | | | | | | 7.3114 | | | | | | |
| | | | | | | 7.0698 | | | | | | | | | | | | | 6.8051 | | | | | | |
| | | | | | | | | | | | | | | 7.5947 | | | | | | | | | | | |
| | | | | | | 6.3682 | | | | | | | | | | | | | 6.3682 | | | | | | |
| | | | | | | 6.644 | | | | | | | | | | | | | 6.644 | | | | | | |
| | | | | | | 9.04 | | | | | | | | | | | | | 7.9723 | | | | | | |
| | | | | | | | | | | | | | | 8.4249 | | | | | | | | | | | |
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | | | 7.4339 | | | | 4.6942 | | | | 4.6942 | | | | | | 4.6942 | | | | 4.6942 | | | | RU52 |
| | | | 6.4299 | | | | | | 5.4109 | | | | | | | | | | 5.4199 | | | | | | RU106 |
| | | | 7.3144 | | | | | | | | | | | 5.5768 | | | | | | | | | | | RU242 |
| | | | | | | | | | | | | 6.8051 | | | | | | | | | | | | | RU484 |
| | | | | | | | | | | | | 7.5947 | | | | | | | | | | | | | RU996 |
| | | | 6.3682 | | | | | | | | | | | 5.9411 | | | | | | | | | | | RU26 + RU52 |
| | | | 6.644 | | | | | | | | | | | 6.2519 | | | | | | | | | | | RU26 + RU106 |
| | | | 7.9723 | | | | | | | | | | | 7.8201 | | | | | | | | | | | RU242 + RU484 |
| | | | | | | | | | | | | 8.4249 | | | | | | | | | | | | | RU242 + RU242 |

Table for the RUs in the 3rd 80 MHz:

| | | | | | | | | | | | | | | | | | | | | | | | | |
|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | 6.9809 |
| | 4.6942 | | | | 4.6942 | | | | | | 4.6942 | | | | 4.6942 | | | | 7.4339 | | | | 7.4339 | |
| | | | 5.4199 | | | | | | | | | | 5.4109 | | | | | | | | | 6.4299 | | |
| | | | | | | | | 5.5768 | | | | | | | | | | | | | | 7.3876 | | |
| | | | | | | | | | | | | | 6.8645 | | | | | | | | | | | |
| | | | | | | | | | | | | | 6.9319 | | | | | | | | | | | |
| | | | | | | | | 5.9411 | | | | | | | | | | | | | | 6.3682 | | |
| | | | | | | | | 6.2519 | | | | | | | | | | | | | | 6.644 | | |
| | | | | | | | | 8.5262 | | | | | | | | | | | | | | 8.9353 | | |
| | | | | | | | | | | | | | 8.5308 | | | | | | | | | | | |

| | | | | | | | | | | | | | | | | | | | | | | | | |
|---|---|---|---|---|---|---|---|---|---|---|---|---|---|---|---|---|---|---|---|---|---|---|---|---|
| | | 5.6374 | | 4.7677 | | 7.9454 | | 4.7677 | | 5.8494 | | 5.7625 | | 4.7677 | | 7.9454 | | 4.7677 | | 5.6374 | | 6.9809 | | 5.8494 |
| | | | | | 7.4339 | | | | 5.8786 | | | | 5.9301 | | | | 7.4339 | | | | | | 7.4339 | |
| | | | | | | | 6.4895 | | | | | | | | 6.7073 | | | | | | | | 6.4299 | |
| | | | | | | 7.3876 | | | | | | | | | | | | | 8.5832 | | | | | |
| | | | | | | 6.8645 | | | | | | | | | | | | | 7.8591 | | | | | |
| | | | | | | | | | | | | | | 6.9319 | | | | | | | | | | |
| | | | | | | 6.3682 | | | | | | | | | | | | | 6.3682 | | | | | |
| | | | | | | 6.644 | | | | | | | | | | | | | 6.6065 | | | | | |
| | | | | | | 8.9353 | | | | | | | | | | | | | 9.4363 | | | | | |
| | | | | | | | | | | | | | | 8.5308 | | | | | | | | | | |

| | | | | | | | | | | | | | | | | | | | | | | | | |
|---|---|---|---|---|---|---|---|---|---|---|---|---|---|---|---|---|---|---|---|---|---|---|---|---|
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | RU26 |
| | | | 7.4339 | | | | 4.6942 | | | | 4.6942 | | | | | | 4.6942 | | | | 4.6942 | | | RU52 |
| | | | 6.4299 | | | | | | 5.4109 | | | | | | | | | | 5.4199 | | | | | RU106 |
| | | | 8.5832 | | | | | | | | | | | 5.5768 | | | | | | | | | | RU242 |
| | | | | | | | | | | | | 7.8591 | | | | | | | | | | | | RU484 |
| | | | | | | | | | | | | 6.9319 | | | | | | | | | | | | RU996 |
| | | | 6.3682 | | | | | | | | | | | 5.9411 | | | | | | | | | | RU26 + RU52 |
| | | | 6.6065 | | | | | | | | | | | 6.2519 | | | | | | | | | | RU26 + RU106 |
| | | | 9.4363 | | | | | | | | | | | 8.4131 | | | | | | | | | | RU242 + RU484 |
| | | | | | | | | | | | | 8.5308 | | | | | | | | | | | | RU242 + RU242 |

Table for the RUs in the 4th 80 MHz:

| | | | | | | | | | | | | | | | | | | | | | | | | |
|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | 6.9809 |
| | 4.6942 | | | | 4.6942 | | | | | | 4.6942 | | | | 4.6942 | | | | 7.4339 | | | | 7.4339 | |
| | | | 5.4199 | | | | | | | | | | 5.4109 | | | | | | | | | 6.4299 | | |
| | | | | | | | | 5.5768 | | | | | | | | | | | | | | 8.2385 | | |
| | | | | | | | | | | | | | 7.4499 | | | | | | | | | | | |
| | | | | | | | | | | | | | 8.6291 | | | | | | | | | | | |
| | | | | | | | | 5.9411 | | | | | | | | | | | | | | 6.3682 | | |
| | | | | | | | | 6.2519 | | | | | | | | | | | | | | 6.6065 | | |
| | | | | | | | | 7.9972 | | | | | | | | | | | | | | 8.6875 | | |
| | | | | | | | | | | | | | 8.4249 | | | | | | | | | | | |

| | | | | | | | | | | | | | | | | | | | | | | | | |
|---|---|---|---|---|---|---|---|---|---|---|---|---|---|---|---|---|---|---|---|---|---|---|---|---|
| | | 5.6374 | | 4.7677 | | 7.9454 | | 4.7677 | | 5.7625 | | 5.8494 | | 4.7677 | | 7.9454 | | 4.7677 | | 5.6374 | | 6.9809 | | 5.8494 |
| | | | | | 7.4339 | | | | 5.9301 | | | | 5.8786 | | | | 7.4339 | | | | | | 7.4339 | |
| | | | | | | | 6.7073 | | | | | | | | 6.4895 | | | | | | | | 6.4299 | |
| | | | | | | 8.2385 | | | | | | | | | | | | | 7.3114 | | | | | |
| | | | | | | 7.4499 | | | | | | | | | | | | | 6.5837 | | | | | |
| | | | | | | | | | | | | | | 8.6291 | | | | | | | | | | |
| | | | | | | 6.3682 | | | | | | | | | | | | | 6.3682 | | | | | |
| | | | | | | 6.6065 | | | | | | | | | | | | | 6.644 | | | | | |
| | | | | | | 8.6875 | | | | | | | | | | | | | 8.6909 | | | | | |
| | | | | | | | | | | | | | | 8.4249 | | | | | | | | | | |

| | | | | | | | | | | | | | | | | | | | | | | | | |
|---|---|---|---|---|---|---|---|---|---|---|---|---|---|---|---|---|---|---|---|---|---|---|---|---|
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | RU26 |
| | | | 7.4339 | | | | 4.6942 | | | | 4.6942 | | | | | | 4.6942 | | | | 4.6942 | | | RU52 |
| | | | 6.4299 | | | | | | 5.4109 | | | | | | | | | | 5.4199 | | | | | RU106 |
| | | | 7.3114 | | | | | | | | | | | 5.5768 | | | | | | | | | | RU242 |
| | | | | | | | | | | | | 6.5837 | | | | | | | | | | | | RU484 |
| | | | | | | | | | | | | 8.6291 | | | | | | | | | | | | RU996 |
| | | | 6.3682 | | | | | | | | | | | 5.9411 | | | | | | | | | | RU26 + RU52 |
| | | | 6.644 | | | | | | | | | | | 6.2519 | | | | | | | | | | RU26 + RU106 |
| | | | 8.6909 | | | | | | | | | | | 8.324 | | | | | | | | | | RU242 + RU484 |
| | | | | | | | | | | | | 8.4249 | | | | | | | | | | | | RU242 + RU242 |

The sequence has the following PAPR values on other RUs in more than 80 MHz (namely, RU combinations) in table B.

| | | | | |
|---|---|---|---|---|
| 8.9909 | 9.0351 | 9.1822 | 8.1417 | 9.8931 |
| 8.4684 8.9951 | 8.3434 8.6109 | 8.6953 8.9452 | 7.881 8.6712 | 10.222 |
| 8.7956 | 9.8176 | 9.53 | 10.099 | 9.8289 |
| 9.9757 | 8.6326 | 8.9312 | | 8.9612 |
| 9.3369 | 9.5801 | 9.5133 | 9.0196 | 10.118 |
| 8.9206 | 9.594 | 9.3901 | 9.6588 | 8.3 |
| 9.265 | 8.6646 | 9.5535 | 9.4094 | 8.4876 |
| 10.213 | 9.2738 | 9.9448 | 9.3384 | 8.4989 |
| 9.4526 | 10.008 | | 9.651 | |
| 9.2615 | 10.008 | | 7.4103 | |
| 7.4901 | 9.651 | | 7.4103 | |
| 9.4526 | 9.2615 | | 7.4901 | |
| | | 9.6608 | | |
| 9.8931 | 7.8954 | 8.3108 | 8.1246 | RU484 + RU996 |
| 8.8605 | 8.2692 9.8572 | 10.208 7.7906 | 7.928 10.15 | RU242 + RU484 + RU996 |
| 9.8289 | 8.4202 | 9.5776 | 9.4929 | RU484 + RU3 * 996 |
| | | 8.9612 | | RU3 * 996 |
| 10.118 | | 10.075 | | RU484 + RU2 * 996 |
| 8.3 | | 8.6299 | | |
| 8.4876 | | 9.2206 | | |
| 8.4989 | | 8.9168 | | |
| | | 9.651 | | RU2 * 996 |
| | | 7.4103 | | |
| | | 7.4103 | | |
| | | 7.4901 | | |
| | | 9.6608 | | RU4 * 996 |

4-6. There is another possible LTF2x320M sequence=[LTF2x80M$_{part1}$, LTF2x80M$_{part2}$, (−1)*LTF2x80M$_{part3}$, LTF2x80M$_{part4}$, LTF2x80M$_{part5}$, 0$_{23}$, (−1)*LTF2x80M$_{part1}$, LTF2x80M$_{part2}$, (−1)*LTF2x80M$_{part3}$, (−1)*LTF2x80M$_{part4}$, LTF2x80M$_{part5}$, 0$_{23}$, (−1)*LTF2x80M$_{part1}$, (−1)*LTF2x80M$_{part2}$, LTF2x80M$_{part3}$, LTF2x80M$_{part4}$, LTF2x80M$_{part5}$, 0$_{23}$, LTF2x80M$_{part1}$, (−1)*LTF2x80M$_{part2}$, (−1)*LTF2x80M$_{part3}$, (−1)*LTF2x80M$_{part4}$, LTF2x80M$_{part5}$].

The sequence has relatively low PAPR values in various cases (including a full bandwidth of the 320 MHz, various puncturing patterns for the 320 MHz, and various multiple RU combinations for the 320 MHz) in table B of the 320 MHz.

Specifically, PAPR values on RUs (a plurality of RU combinations or single RUs) in the 1$^{st}$ 80 MHz to the 4$^{th}$ 80 MHz are provided below. The RUs are sorted in sequence. For example, RU26 in the 1$^{st}$ 80 MHz are sequentially the 1$^{st}$ to the 36th RU26 in the 320 MHz bandwidth based on an order in the table; and RU26 in the 2$^{nd}$ 80 MHz are sequentially the 37$^{th}$ to the 72$^{nd}$ RU26 in the 320 MHz bandwidth based on the order in the table.

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | | 4.6942 | | | 4.6942 | | 4.6942 | | 7.4339 | | 7.4339 | |
| | 5.4199 | | | | | 5.4109 | | | | | 6.4299 | |
| | | | | 5.5768 | | | | | | | 7.3876 | |
| | | | | | | 6.8645 | | | | | | |
| | | | | | | 6.9319 | | | | | | |
| | | | | 5.9411 | | | | | | | 6.3682 | |
| | | | | 6.2519 | | | | | | | 6.644 | |
| | | | | 8.5262 | | | | | | | 8.9353 | |
| | 5.6374 | 4.7677 | 7.9454 | 4.7677 | 5.8494 | 5.7625 | 4.7677 | 7.9454 | 4.7677 | 5.6374 | 6.9809 | 5.8494 |
| | | 7.4339 | | 5.8786 | | 5.9301 | | 7.4339 | | | 7.4339 | |
| | | | 6.4895 | | | | 6.7073 | | | | 6.4299 | |
| | | | 7.3876 | | | | | | 8.5832 | | | |
| | | | 6.8645 | | | | | | 7.8591 | | | |
| | | | | | | | 6.9319 | | | | | |
| | | | 6.3682 | | | | | | 6.3682 | | | |
| | | | 6.644 | | | | | | 6.6065 | | | |
| | | | 8.9353 | | | | | | 9.4363 | | | |
| | 6.9809 | 5.8494 | 4.4605 | 4.4605 | 4.4605 | 4.4605 | 4.4605 | 4.4605 | 4.4605 | 4.4605 | 4.4605 | RU26 |
| | 7.4339 | | 4.6942 | | 4.6942 | | | 4.6942 | | 4.6942 | | RU52 |
| | 6.4299 | | | 5.4109 | | | | | 5.4199 | | | RU106 |
| | 8.5832 | | | | | | 5.5768 | | | | | RU242 |
| | | | | | | 7.8591 | | | | | | RU484 |
| | | | | | | 6.9319 | | | | | | RU996 |
| | 6.3682 | | | | | | 5.9411 | | | | | RU26 + RU52 |
| | 6.6065 | | | | | | 6.2519 | | | | | RU26 + RU106 |
| | 9.4363 | | | | | | 8.4131 | | | | | RU242 + RU484 |

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.4199 | | | | | | | | | | 5.4109 | | | | | | | | | 6.4299 | | | |
| | | | | | | | | 5.5768 | | | | | | | | | | | | | | 7.3876 | | | |
| | | | | | | | | | | | | | 7.0698 | | | | | | | | | | | | |
| | | | | | | | | | | | | | 7.5947 | | | | | | | | | | | | |
| | | | | | | | | 5.9411 | | | | | | | | | | | | | | 6.3682 | | | |
| | | | | | | | | 6.2519 | | | | | | | | | | | | | | 6.644 | | | |
| | | | | | | | | 8.2131 | | | | | | | | | | | | | | 9.04 | | | |

| | | | | | | | | | | | | | | | | | | | | | | | | | |
|---|---|---|---|---|---|---|---|---|---|---|---|---|---|---|---|---|---|---|---|---|---|---|---|---|---|
| | | 5.6374 | | 4.7677 | | 7.9454 | | 4.7677 | | 5.8494 | | 5.8494 | | 4.7677 | | 7.9454 | | 4.7677 | | 5.6374 | | 6.9809 | | | 5.8494 |
| | | | | | 7.4339 | | | | 5.8786 | | | | 5.8786 | | | | 7.4339 | | | | | | | 7.4339 | |
| | | | | | | | 6.4895 | | | | | | | | 6.4895 | | | | | | | | | 6.4299 | |
| | | | | | | 7.3876 | | | | | | | | | | | | | 7.3114 | | | | | | |
| | | | | | | 7.0698 | | | | | | | | | | | | | 6.8051 | | | | | | |
| | | | | | | | | | | | | | | 7.5947 | | | | | | | | | | | |
| | | | | | | 6.3682 | | | | | | | | | | | | | 6.3682 | | | | | | |
| | | | | | | 6.644 | | | | | | | | | | | | | 6.644 | | | | | | |
| | | | | | | 9.04 | | | | | | | | | | | | | 7.9723 | | | | | | |

| | | | | | | | | | | | | | | | | | | | | | | | | | |
|---|---|---|---|---|---|---|---|---|---|---|---|---|---|---|---|---|---|---|---|---|---|---|---|---|---|
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | | | 7.4339 | | | | 4.6942 | | | | 4.6942 | | | | | | 4.6942 | | | | 4.6942 | | | | RU52 |
| | | | 6.4299 | | | | | | 5.4109 | | | | | | | | | | 5.4199 | | | | | | RU106 |
| | | | 7.3114 | | | | | | | | | | | 5.5768 | | | | | | | | | | | RU242 |
| | | | | | | | | | | | | 6.8051 | | | | | | | | | | | | | RU484 |
| | | | | | | | | | | | | 7.5947 | | | | | | | | | | | | | RU996 |
| | | | 6.3682 | | | | | | | | | | | 5.9411 | | | | | | | | | | | RU26 + RU52 |
| | | | 6.644 | | | | | | | | | | | 6.2519 | | | | | | | | | | | RU26 + RU106 |
| | | | 7.9723 | | | | | | | | | | | 7.8201 | | | | | | | | | | | RU242 + RU484 |

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.4199 | | | | | | | | | | 5.4109 | | | | | | | | | 6.4299 | | | |
| | | | | | | | | 5.5768 | | | | | | | | | | | | | | 7.3876 | | | |
| | | | | | | | | | | | | | 6.8465 | | | | | | | | | | | | |
| | | | | | | | | | | | | | 7.4709 | | | | | | | | | | | | |
| | | | | | | | | 5.9411 | | | | | | | | | | | | | | 6.3682 | | | |
| | | | | | | | | 6.2519 | | | | | | | | | | | | | | 6.644 | | | |
| | | | | | | | | 7.9972 | | | | | | | | | | | | | | 8.0269 | | | |

| | | | | | | | | | | | | | | | | | | | | | | | | | |
|---|---|---|---|---|---|---|---|---|---|---|---|---|---|---|---|---|---|---|---|---|---|---|---|---|---|
| | | 5.6374 | | 4.7677 | | 7.9454 | | 4.7677 | | 5.8494 | | 5.8494 | | 4.7677 | | 7.9454 | | 4.7677 | | 5.6374 | | 6.9809 | | | 5.8494 |
| | | | | | 7.4339 | | | | 5.8786 | | | | 5.8786 | | | | 7.4339 | | | | | | | 7.4339 | |
| | | | | | | | 6.4895 | | | | | | | | 6.4895 | | | | | | | | | 6.4299 | |
| | | | | | | 7.3876 | | | | | | | | | | | | | 7.3114 | | | | | | |
| | | | | | | 6.8465 | | | | | | | | | | | | | 6.5837 | | | | | | |
| | | | | | | | | | | | | | | 7.4709 | | | | | | | | | | | |
| | | | | | | 6.3682 | | | | | | | | | | | | | 6.3682 | | | | | | |
| | | | | | | 6.644 | | | | | | | | | | | | | 6.644 | | | | | | |
| | | | | | | 8.0269 | | | | | | | | | | | | | 9.0745 | | | | | | |

| | | | | | | | | | | | | | | | | | | | | | | | | | |
|---|---|---|---|---|---|---|---|---|---|---|---|---|---|---|---|---|---|---|---|---|---|---|---|---|---|
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | | | 7.4339 | | | | 4.6942 | | | | 4.6942 | | | | | | 4.6942 | | | | 4.6942 | | | | RU52 |
| | | | 6.4299 | | | | | | 5.4109 | | | | | | | | | | 5.4199 | | | | | | RU106 |
| | | | 7.3114 | | | | | | | | | | | 5.5768 | | | | | | | | | | | RU242 |
| | | | | | | | | | | | | 6.5837 | | | | | | | | | | | | | RU484 |
| | | | | | | | | | | | | 7.4709 | | | | | | | | | | | | | RU996 |
| | | | 6.3682 | | | | | | | | | | | 5.9411 | | | | | | | | | | | RU26 + RU52 |
| | | | 6.644 | | | | | | | | | | | 6.2519 | | | | | | | | | | | RU26 + RU106 |
| | | | 9.0745 | | | | | | | | | | | 8.1309 | | | | | | | | | | | RU242 + RU484 |

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.4199 | | | | | | | | | | 5.4109 | | | | | | | | | 6.4299 | | | |
| | | | | | | | | 5.5768 | | | | | | | | | | | | | | 8.2385 | | | |
| | | | | | | | | | | | | | 7.4499 | | | | | | | | | | | | |
| | | | | | | | | | | | | | 6.6821 | | | | | | | | | | | | |
| | | | | | | | | 5.9411 | | | | | | | | | | | | | | 6.3682 | | | |
| | | | | | | | | 6.2519 | | | | | | | | | | | | | | 6.6065 | | | |
| | | | | | | | | 8.0759 | | | | | | | | | | | | | | 9.6228 | | | |

-continued

| | | | | | | | | | | | | | | | | | | | | | | | |
|---|---|---|---|---|---|---|---|---|---|---|---|---|---|---|---|---|---|---|---|---|---|---|---|
| 5.6374 | | 4.7677 | | 7.9454 | | 4.7677 | | 5.7625 | | 5.8494 | | 4.7677 | | 7.9454 | | 4.7677 | | 5.6374 | | 6.9809 | | | 5.8494 |
| | | | 7.4339 | | | | 5.9301 | | | | 5.8786 | | | | 7.4339 | | | | | | | 7.4339 | |
| | | | | | 6.7073 | | | | | | | | 6.4895 | | | | | | | | | 6.4299 | |
| | | | | 8.2385 | | | | | | | | | | | | | 7.3114 | | | | | | |
| | | | | 7.4499 | | | | | | | | | | | | | 6.8051 | | | | | | |
| | | | | | | | | | | | | 6.6821 | | | | | | | | | | | |
| | | | | 6.3682 | | | | | | | | | | | | | 6.3682 | | | | | | |
| | | | | 6.6065 | | | | | | | | | | | | | 6.644 | | | | | | |
| | | | | 9.6228 | | | | | | | | | | | | | 8.6909 | | | | | | |
| 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | 7.4339 | | | | 4.6942 | | | | 4.6942 | | | | | | 4.6942 | | | | 4.6942 | | | | RU52 |
| | 6.4299 | | | | | | 5.4109 | | | | | | | | | | 5.4199 | | | | | | RU106 |
| | 7.3114 | | | | | | | | | | | 5.5768 | | | | | | | | | | | RU242 |
| | | | | | | | | | | 6.8051 | | | | | | | | | | | | | RU484 |
| | | | | | | | | | | 6.6821 | | | | | | | | | | | | | RU996 |
| | 6.3682 | | | | | | | | | | | 5.9411 | | | | | | | | | | | RU26 + RU52 |
| | 6.644 | | | | | | | | | | | 6.2519 | | | | | | | | | | | RU26 + RU106 |
| | 8.6909 | | | | | | | | | | | 8.8288 | | | | | | | | | | | RU242 + RU484 |

The sequence has the following PAPR values on other RUs in more than 80 MHz (namely, RU combinations or single RUs) in table B:

| | | | | | | | | | | | | | | | |
|---|---|---|---|---|---|---|---|---|---|---|---|---|---|---|---|
| 8.226 | | 9.2131 | | 9.4269 | | 8.0198 | | 7.8088 | | 8.8753 | | 9.3779 | | 8.3036 | RU484 + RU996 |
| | | | 7.6781 | | | | | | | | 7.5651 | | | | RU2 * 996 |
| 9.319 | | 9.2606 | | 8.6742 | | 9.1361 | | 9.4099 | | 8.8471 | | 9.0799 | | 9.2767 | RU484 + RU3 * 996 |
| 9.1911 | | 8.8715 | | 9.4079 | | | | | | 8.7804 | | | | | RU3 * 996 |
| | | | | | | | 7.7631 | | | | | | | | RU4 * 996 |

4-7. There is another possible $LTF2\times320M$ sequence= [$LTF2\times80M_{part1}$, $LTF2\times80M_{part2}$, (−1)*$LTF2\times80M_{part3}$, (−1)*$LTF2\times80M_{part4}$, (−1)*$LTF2\times80M_{part5}$, $0_{23}$, (−1)*$LTF2\times80M_{part1}$, (−1)*$LTF2\times80M_{part2}$, (−1)*$LTF2\times80M_{part3}$, (−1)*$LTF2\times80M_{part4}$, (−1)*$LTF2\times80M_{part5}$, $0_{23}$, (−1)*$LTF2\times80M_{part1}$, $LTF2\times80M_{part2}$, $LTF2\times80M_{part3}$, $LTF2\times80M_{part4}$, $LTF2\times80M_{part5}$, $0_{23}$, $LTF2\times80M_{part1}$, $LTF2\times80M_{part2}$, $LTF2\times80M_{part3}$, $LTF2\times80M_{part4}$, $LTF2\times80M_{part5}$].

The sequence has relatively low PAPR values in various cases (including a full bandwidth of the 320 MHz, various puncturing patterns for the 320 MHz, and various multiple RU combinations for the 320 MHz) in table B of the 320 MHz.

For example, the sequence has the following PAPR values on RUs (a plurality of RU combinations or single RUs) in the $1^{st}$ 80 MHz to the 4th 80 MHz. Table for the RUs in the $1^{st}$ 80 MHz

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.4199 | | | | | | | | | | 5.4109 | | | | | | | | | 6.4299 | | | |
| | | | | | | | | 5.5768 | | | | | | | | | | | | | | 7.3876 | | | |
| | | | | | | | | | | | | | 6.8645 | | | | | | | | | | | | |
| | | | | | | | | | | | | | 7.4709 | | | | | | | | | | | | |
| | | | | | | | | 5.9411 | | | | | | | | | | | | | | 6.3682 | | | |
| | | | | | | | | 6.2519 | | | | | | | | | | | | | | 6.644 | | | |
| | | | | | | | | 7.9972 | | | | | | | | | | | | | | 8.0269 | | | |
| | | 5.6374 | | 4.7677 | | 7.9454 | | 4.7677 | | 5.8494 | | 5.8494 | | 4.7677 | | 7.9454 | | 4.7677 | | 5.6374 | | 6.9809 | | | 5.8494 |
| | | | | | 7.4339 | | | | 5.8786 | | | | 5.8786 | | | | 7.4339 | | | | | | | 7.4339 | |
| | | | | | | | 6.7073 | | | | | | | | 6.4895 | | | | | | | | | 6.4299 | |
| | | | | | | 7.3876 | | | | | | | | | | | | | 7.3114 | | | | | | |
| | | | | | | 6.8645 | | | | | | | | | | | | | 6.5837 | | | | | | |
| | | | | | | | | | | | | | | 7.4709 | | | | | | | | | | | |
| | | | | | | 6.3682 | | | | | | | | | | | | | 6.3682 | | | | | | |
| | | | | | | 6.644 | | | | | | | | | | | | | 6.644 | | | | | | |
| | | | | | | 8.0269 | | | | | | | | | | | | | 9.0745 | | | | | | |
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | | | 7.4339 | | | | 4.6942 | | | | 4.6942 | | | | | | 4.6942 | | | | 4.6942 | | | | RU52 |
| | | | 6.4299 | | | | | | 5.4109 | | | | | | | | | | 5.4199 | | | | | | RU106 |
| | | | 7.3114 | | | | | | | | | | | 5.5768 | | | | | | | | | | | RU242 |
| | | | | | | | | | | | | 6.5837 | | | | | | | | | | | | | RU484 |
| | | | | | | | | | | | | 7.4709 | | | | | | | | | | | | | RU996 |
| | | | 6.3682 | | | | | | | | | | | 5.9411 | | | | | | | | | | | RU26 + RU52 |
| | | | 6.644 | | | | | | | | | | | 6.2519 | | | | | | | | | | | RU26 + RU106 |
| | | | 9.0745 | | | | | | | | | | | 8.1309 | | | | | | | | | | | RU242 + RU484 |

Table for the RUs in the 2nd 80 MHz

| | | | | | | | | | | | | | | | | | | | | | | | | | |
|---|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | | 6.9809 |
| | 4.6942 | | | | 4.6942 | | | | | | 4.6942 | | | | 4.6942 | | | | 7.4339 | | | | | 7.4339 | |
| | | | 5.4199 | | | | | | | | | | 5.4109 | | | | | | | | | 6.4299 | | | |
| | | | | | | | | 5.5768 | | | | | | | | | | | | | | 8.2385 | | | |
| | | | | | | | | | | | | | 7.3472 | | | | | | | | | | | | |
| | | | | | | | | | | | | | 6.5164 | | | | | | | | | | | | |
| | | | | | | | | 5.9411 | | | | | | | | | | | | | | 6.3682 | | | |
| | | | | | | | | 6.2519 | | | | | | | | | | | | | | 6.6065 | | | |
| | | | | | | | | 8.5628 | | | | | | | | | | | | | | 8.6875 | | | |
| | | 5.6374 | | 4.7677 | | 7.9454 | | 4.7677 | | 5.7625 | | 5.8494 | | 4.7677 | | 7.9454 | | 4.7677 | | 5.6374 | | 6.9809 | | | 5.8494 |
| | | | | | 7.4339 | | | | 5.9301 | | | | 5.8786 | | | | 7.4339 | | | | | | | 7.4339 | |
| | | | | | | | 6.7073 | | | | | | | | 6.4895 | | | | | | | | | 6.4299 | |
| | | | | | | 8.2385 | | | | | | | | | | | | | 7.3114 | | | | | | |
| | | | | | | 7.3472 | | | | | | | | | | | | | 6.5837 | | | | | | |
| | | | | | | | | | | | | | | 6.5164 | | | | | | | | | | | |
| | | | | | | 6.3682 | | | | | | | | | | | | | 6.3682 | | | | | | |
| | | | | | | 6.6065 | | | | | | | | | | | | | 6.644 | | | | | | |
| | | | | | | 8.6875 | | | | | | | | | | | | | 9.6763 | | | | | | |
| | | 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 |
| | | | 7.4339 | | | | 4.6942 | | | | 4.6942 | | | | | | 4.6942 | | | | 4.6942 | | | | RU52 |
| | | | 6.4299 | | | | | | 5.4109 | | | | | | | | | | 5.4199 | | | | | | RU106 |
| | | | 7.3114 | | | | | | | | | | | 5.5768 | | | | | | | | | | | RU242 |
| | | | | | | | | | | | | 6.5837 | | | | | | | | | | | | | RU484 |
| | | | | | | | | | | | | 6.5164 | | | | | | | | | | | | | RU996 |
| | | | 6.3682 | | | | | | | | | | | 5.9411 | | | | | | | | | | | RU26 + RU52 |
| | | | 6.644 | | | | | | | | | | | 6.2519 | | | | | | | | | | | RU26 + RU106 |
| | | | 9.6763 | | | | | | | | | | | 8.1829 | | | | | | | | | | | RU242 + RU484 |

Table for the RUs in the 3rd 80 MHz

| | | | | | | | | | | | | | | | | | | | | | | | | |
|---|---|---|---|---|---|---|---|---|---|---|---|---|---|---|---|---|---|---|---|---|---|---|---|---|
| 4.4605 | | 4.4605 | | 4.4605 | | 4.4605 | | 4.4605 | | 4.4605 | | 4.4605 | | 4.4605 | | 4.4605 | | 5.8494 | | 6.9809 | | 5.8494 | | 6.9809 |
| | 4.6942 | | | | 4.6942 | | | | | | 4.6942 | | | | 4.6942 | | | | 7.4339 | | | | 7.4339 | |
| | | | 5.4199 | | | | | | | | | | 5.4109 | | | | | | | | 6.4299 | | | |
| | | | | | | | | 5.5768 | | | | | | | | | | | | | 8.2385 | | | |
| | | | | | | | | | | | | 7.4499 | | | | | | | | | | | | |
| | | | | | | | | | | | | 8.6291 | | | | | | | | | | | | |
| | | | | | | | | 5.9411 | | | | | | | | | | | | | 6.3682 | | | |
| | | | | | | | | 6.2519 | | | | | | | | | | | | | 6.6065 | | | |
| | | | | | | | | 7.9972 | | | | | | | | | | | | | 8.6875 | | | |
| | 5.6374 | | | 4.7677 | | 7.9454 | | 4.7677 | | 5.7625 | | 5.8494 | | 4.7677 | | 7.9454 | | 4.7677 | | 5.6374 | | 6.9809 | | 5.8494 |
| | | | | | 7.43399 | | | | 5.9301 | | | | 5.8786 | | | | 7.4339 | | | | | | 7.4339 | |
| | | | | | | | 6.7073 | | | | | | | | 6.4895 | | | | | | | | 6.4299 | |
| | | | | | 8.2385 | | | | | | | | | | | | | 7.3114 | | | | | | |
| | | | | | 7.4499 | | | | | | | | | | | | | 6.5837 | | | | | | |
| | | | | | | | | | | | | 8.6291 | | | | | | | | | | | | |
| | | | | | 6.3682 | | | | | | | | | | | | | 6.3682 | | | | | | |
| | | | | | 6.6065 | | | | | | | | | | | | | 6.644 | | | | | | |
| | | | | | 8.6875 | | | | | | | | | | | | | 8.6909 | | | | | | |
| 6.9809 | | 5.8494 | | 4.4605 | | 4.4605 | | 4.4605 | | 4.4605 | | 4.4605 | | 4.4605 | | 4.4605 | | 4.4605 | | 4.4605 | | | RU26 | |
| | 7.4339 | | | | 4.6942 | | | | 4.6942 | | | | | | 4.6942 | | | | 4.6942 | | | | RU52 | |
| | 6.4299 | | | | | | 5.4109 | | | | | | | | | | 5.4199 | | | | | | RU106 | |
| | 7.3114 | | | | | | | | | | | 5.5768 | | | | | | | | | | | RU242 | |
| | | | | | | | | | | 6.5837 | | | | | | | | | | | | | RU484 | |
| | | | | | | | | | | 8.6291 | | | | | | | | | | | | | RU996 | |
| | 6.3682 | | | | | | | | | | | 5.9411 | | | | | | | | | | | RU26 + RU52 | |
| | 6.644 | | | | | | | | | | | 6.2519 | | | | | | | | | | | RU26 + RU106 | |
| | 8.6909 | | | | | | | | | | | 8.324 | | | | | | | | | | | RU242 + RU484 | |

The sequence has the following PAPR values on other RUs in more than 80 MHz (namely, RU combinations or single RUs):

| | | | | | | | | |
|---|---|---|---|---|---|---|---|---|
| | | 7.8418 | | | | 10.047 | | RU2 * 996 |
| 9.9503 | 9.4954 | 9.3479 | 9.0787 | 9.834 | 8.7716 | 9.4144 | 9.5244 | RU484 + RU3 * 996 |
| 8.7827 | 9.2171 | 8.7827 | 8.8965 | | | | | RU3 * 996 |
| | | | 9.5890 | | | | | RU4 * 996 |

| | | | | | | |
|---|---|---|---|---|---|---|
| 9.7038 | 9.3527 | 8.3182 | 8.8433 | 9.4922 | 9.3837 | |
| 9.3124 | 9.8853 | 8.8523 | 8.8747 | 8.2622 | 9.6814 | RU2 * 996 + RU484 |
| 9.0595 | 10.043 | 8.7657 | 9.0575 | 8.9771 | 9.0549 | |
| 8.5889 | 9.4114 | 9.0418 | 9.8471 | 8.6334 | 8.8241 | |

4-8. There is another possible LTF2×320M sequence=[LTF2×80M$_{part1}$, LTF2×80M$_{part2}$, (−1)*LTF2×80M$_{part3}$, (−1)*LTF2×80M$_{part4}$, (−1)*LTF2×80M$_{part5}$, $0_{23}$, (−1)*LTF2×80M$_{part1}$, (−1)*LTF2×80M$_{part2}$, (−1)*LTF2×80M$_{part3}$, (−1)*LTF2×80M$_{part4}$, (−1)*LTF2×80M$_{part5}$, $0_{23}$, (−1)*LTF2×80M$_{part1}$, LTF2×80M$_{part2}$, LTF2×80M$_{part3}$, LTF2×80M$_{part4}$, LTF2×80M$_{part5}$, $0_{23}$, LTF2×80M$_{part1}$, LTF2×80M$_{part2}$, LTF2×80M$_{part3}$, LTF2×80M$_{part4}$, LTF2×80M$_{part5}$].

The sequence has relatively low PAPR values in various cases (including a full bandwidth of the 320 MHz, various puncturing patterns for the 320 MHz, and various multiple RU combinations for the 320 MHz) in table B of the 320 MHz.

For example, the sequence has the following PAPR values on RUs (a plurality of RU combinations or single RUs) in the 1st 80 MHz to the 4th 80 MHz. Table for the RUs in the 1st 80 MHz.

| | | | | | | | | | | | | | |
|---|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 | |
| 4.6942 | 4.6942 | 4.6942 | 4.6942 | 7.4339 | 7.4339 | | | | | | | | |
| 5.4199 | 5.4109 | 6.4299 | | | | | | | | | | | |
| 5.5768 | 7.3876 | | | | | | | | | | | | |
| 6.8645 | | | | | | | | | | | | | |
| 7.4709 | | | | | | | | | | | | | |
| 5.9411 | 6.3682 | | | | | | | | | | | | |
| 6.2519 | 6.644 | | | | | | | | | | | | |
| 7.9972 | 8.0269 | | | | | | | | | | | | |
| 5.6374 | 4.7677 | 7.9454 | 4.7677 | 5.8494 | 5.8494 | 4.7677 | 7.9454 | 4.7677 | 5.6374 | 6.9809 | 5.8494 | | |
| 7.43399 | 5.8786 | 5.8786 | 7.4339 | 7.4339 | | | | | | | | | |
| 6.4895 | 6.4895 | 6.4299 | | | | | | | | | | | |
| 7.3876 | 7.3114 | | | | | | | | | | | | |
| 6.8645 | 6.5837 | | | | | | | | | | | | |
| 7.4709 | | | | | | | | | | | | | |
| 6.3682 | 6.3682 | | | | | | | | | | | | |
| 6.644 | 6.644 | | | | | | | | | | | | |
| 8.0269 | 9.0745 | | | | | | | | | | | | |
| 6.9809 | 5.8494 | 4.4605 | 4.4605 | 4.4605 | 4.4605 | 4.4605 | 4.4605 | 4.4605 | 4.4605 | 4.4605 | | | RU26 |
| 7.4339 | 4.6942 | 4.6942 | 4.6942 | 4.6942 | | | | | | | | | RU52 |
| 6.4299 | 5.4109 | 5.4199 | | | | | | | | | | | RU106 |
| 7.3114 | 5.5768 | | | | | | | | | | | | RU242 |
| 6.5837 | | | | | | | | | | | | | RU484 |
| 7.4709 | | | | | | | | | | | | | RU996 |
| 6.3682 | 5.9411 | | | | | | | | | | | | RU26 + RU52 |
| 6.644 | 6.2519 | | | | | | | | | | | | RU26 + RU106 |
| 9.0745 | 8.1309 | | | | | | | | | | | | RU242 + RU484 |

Table for the RUs in the 2nd 80 MHz

| | | | | | | | | | | | | | |
|---|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 | |
| 4.6942 | 4.6942 | 4.6942 | 4.6942 | 7.4339 | 7.4339 | | | | | | | | |
| 5.4199 | 5.4109 | 6.4299 | | | | | | | | | | | |
| 5.5768 | 8.2385 | | | | | | | | | | | | |
| 7.3472 | | | | | | | | | | | | | |
| 6.5164 | | | | | | | | | | | | | |
| 5.9411 | 6.3682 | | | | | | | | | | | | |
| 6.2519 | 6.6065 | | | | | | | | | | | | |
| 8.5628 | 8.6875 | | | | | | | | | | | | |
| 5.6374 | 4.7677 | 7.9454 | 4.7677 | 5.7625 | 5.8494 | 4.7677 | 7.9454 | 4.7677 | 5.6374 | 6.9809 | 5.8494 | | |
| 7.43399 | 5.9301 | 5.8786 | 7.4339 | 7.4339 | | | | | | | | | |
| 6.7073 | 6.4895 | 6.4299 | | | | | | | | | | | |
| 8.2385 | 7.3114 | | | | | | | | | | | | |
| 7.3472 | 6.5837 | | | | | | | | | | | | |
| 6.5164 | | | | | | | | | | | | | |
| 6.3682 | 6.3682 | | | | | | | | | | | | |
| 6.6065 | 6.644 | | | | | | | | | | | | |
| 8.6875 | 9.6763 | | | | | | | | | | | | |
| 6.9809 | 5.8494 | 4.4605 | 4.4605 | 4.4605 | 4.4605 | 4.4605 | 4.4605 | 4.4605 | 4.4605 | 4.4605 | | | RU26 |
| 7.4339 | 4.6942 | 4.6942 | 4.6942 | 4.6942 | | | | | | | | | RU52 |
| 6.4299 | 5.4109 | 5.4199 | | | | | | | | | | | RU106 |
| 7.3114 | 5.5768 | | | | | | | | | | | | RU242 |
| 6.5837 | | | | | | | | | | | | | RU484 |
| 6.5164 | | | | | | | | | | | | | RU996 |
| 6.3682 | 5.9411 | | | | | | | | | | | | RU26 + RU52 |
| 6.644 | 6.2519 | | | | | | | | | | | | RU26 + RU106 |
| 9.6763 | 8.1829 | | | | | | | | | | | | RU242 + RU484 |

Table for the RUs in the $3^{rd}$ 80 MHz

| | | | | | | | | | | | | |
|---|---|---|---|---|---|---|---|---|---|---|---|---|
| 4.4605 | 4.4605 | 4.4605 | 4.4605 | 4.4605 | 4.4605 | 4.4605 | 4.4605 | 4.4605 | 5.8494 | 6.9809 | 5.8494 | 6.9809 |
| 4.6942 | | 4.6942 | | | 4.6942 | | 4.6942 | | 7.4339 | | 7.4339 | |
| | 5.4199 | | | | | 5.4109 | | | | 6.4299 | | |
| | | | | 5.5768 | | | | | | 8.2385 | | |
| | | | | | | 7.4499 | | | | | | |
| | | | | | | 8.6291 | | | | | | |
| | | | | 5.9411 | | | | | | 6.3682 | | |
| | | | | 6.2519 | | | | | | 6.6065 | | |
| | | | | 7.9972 | | | | | | 8.6875 | | |
| 5.6374 | | 4.7677 | 7.9454 | 4.7677 | 5.7625 | 5.8494 | 4.7677 | 7.9454 | 4.7677 | 5.6374 | 6.9809 | 5.8494 |
| | | 7.43399 | | 5.9301 | | 5.8786 | | 7.4339 | | | 7.4339 | |
| | | | 6.7073 | | | | 6.4895 | | | | 6.4299 | |
| | | 8.2385 | | | | | | | 7.3114 | | | |
| | | 7.4499 | | | | | | | 6.5837 | | | |
| | | | | | | 8.6291 | | | | | | |
| | | 6.3682 | | | | | | | 6.3682 | | | |
| | | 6.6065 | | | | | | | 6.644 | | | |
| | | 8.6875 | | | | | | | 8.6909 | | | |
| 6.9809 | 5.8494 | 4.4605 | 4.4605 | 4.4605 | 4.4605 | 4.4605 | 4.4605 | 4.4605 | 4.4605 | 4.4605 | | RU26 |
| 7.4339 | | 4.6942 | | 4.6942 | | | 4.6942 | | 4.6942 | | | RU52 |
| 6.4299 | | | 5.4109 | | | | | 5.4199 | | | | RU106 |
| 7.3114 | | | | | | 5.5768 | | | | | | RU242 |
| | | | | | 6.5837 | | | | | | | RU484 |
| | | | | | 8.6291 | | | | | | | RU996 |
| 6.3682 | | | | | | 5.9411 | | | | | | RU26 + RU52 |
| 6.644 | | | | | | 6.2519 | | | | | | RU26 + RU106 |
| 8.6909 | | | | | | 8.324 | | | | | | RU242 + RU484 |

The sequence has the following PAPR values on other RUs in more than 80 MHz (namely, RU combinations or single RUs):

| | | | | | | | | |
|---|---|---|---|---|---|---|---|---|
| 9.9503 | 9.4954 | 9.3479 | 9.0787 | 9.834 | 8.7716 | 9.4144 | 9.5244 | RU484 + RU3 * 996 |
| 8.7827 | 9.2171 | 8.7827 | | | 8.8965 | | | RU3 * 996 |
| 9.7038 | 9.3527 | 8.3182 | 8.8433 | 9.4922 | | 9.3837 | | |
| 9.3124 | 9.8853 | 8.8523 | 8.8747 | 8.2622 | | 9.3814 | | |
| 9.0595 | 10.043 | 8.7657 | 9.0575 | 8.9771 | | 9.0549 | | RU2 * 996 + RU484 |
| 8.5889 | 9.4114 | 9.0418 | 9.8471 | 8.6334 | | 8.8241 | | |
| 10.047 | 7.9376 | | | 8.9745 | | | | |
| 9.4879 | 7.9376 | | | 7.8418 | | | | |
| 8.6498 | 8.9745 | | | 7.8418 | | | | RU2 * 996 |
| 10.047 | 9.4879 | | | 8.6498 | | | | |
| 7.7723 | 9.0647 | 8.4855 | 9.9838 | 7.7723 | 8.0424 | 9.9091 | 7.9129 | RU484 + RU996 |
| | | | 9.589 | | | | | RU4 * 996 |

5. 4×LTF Sequence in the 240 MHz Bandwidth (Referred to as an LTF4×240M Sequence for Short)

5-1. There is a possible LTF4×240M sequence=[LTF4×80M $0_{23}$ LTF4×80M $0_{23}$-LTF4×80M]. LTF4×80M is an 80 MHz 4×LTF sequence in the 802.11ax standard. For a specific sequence, refer to the 802.11ax standard.

The LTF4×240M sequence has a relatively low PAPR value in a full bandwidth, a puncturing pattern, or an RU (or a multiple RU combination) in the 240 MHz. For example, a PAPR value of the sequence in the full bandwidth of 240 MHz is 9.8723 dB. PAPR values in the other puncturing patterns each are less than 9.8723 dB. The LTF4×240M sequence has relatively low PAPR values in table A of the 240 MHz. For example, a PAPR value of the sequence in a puncturing pattern or a multiple RU is 9.7535 dB. PAPR values in the other puncturing patterns each are less than 9.7535 dB.

Specifically, the sequence has the following PAPR values on RUs (a plurality of RU combinations or single RUs) in the 1st 80 MHz to the 3rd 80 MHz.

Table for the RUs in the 1st, the 2nd, and the 3rd 80 MHz:

| | | | | | | | | | | | | | |
|---|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 | |
| 4.967 | | 4.4366 | | | 4.967 | | 4.4366 | | 6.7961 | | 7.145 | | |
| | 5.3765 | | | | | 5.351 | | | | 6.6952 | | | |
| | | | | 5.4964 | | | | | | 7.0805 | | | |
| | | | | | | 6.1863 | | | | | | | |
| | | | | | | 6.8692 | | | | | | | |
| | | | | 6.2946 | | | | | | 6.8965 | | | |
| | | | | 6.2889 | | | | | | 7.4226 | | | |
| | | | | 8.1143 | | | | | | 8.522 | | | |
| | | | | | | 7.4282 | | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 | |
| | | 8.476 | | 7.4108 | | 7.4968 | | 7.0082 | | | 7.807 | | |
| | | | 6.4196 | | | | 6.5107 | | | | 5.8426 | | |
| | | 7.0805 | | | | | | | 6.9761 | | | | |
| | | 6.1863 | | | | | | | 7.3989 | | | | |
| | | | | | | 6.8692 | | | | | | | |
| | | 6.8965 | | | | | | | 6.5092 | | | | |
| | | 7.4226 | | | | | | | 6.9054 | | | | |
| | | 8.522 | | | | | | | 8.1606 | | | | |
| | | | | | | 7.4282 | | | | | | | |
| 6.8009 | 5.6995 | 3.7821 | 3.7821 | 3.7821 | 3.7821 | 3.7821 | 3.7821 | 3.7821 | 3.7821 | 3.7821 | | | RU26 |
| 6.9222 | | 4.967 | | 4.4366 | | | 4.967 | | 4.4366 | | | | RU52 |
| 5.8426 | | | 5.4753 | | | | | 5.4976 | | | | | RU106 |
| 6.9761 | | | | | | 5.5275 | | | | | | | RU242 |
| | | | | | 7.3989 | | | | | | | | RU484 |
| | | | | | 6.8692 | | | | | | | | RU996 |
| 6.5092 | | | | | | 6.4576 | | | | | | | RU26 + RU52 |
| 6.9054 | | | | | | 6.1881 | | | | | | | RU26 + RU106 |
| 8.1606 | | | | | | 7.8998 | | | | | | | RU242 + RU484 |
| | | | | | 7.4282 | | | | | | | | RU242 + RU242 |

The sequence has the following PAPR values on other RUs in more than 80 MHz (namely, RU combinations) in table A:

| | | | | | | | | | | | |
|---|---|---|---|---|---|---|---|---|---|---|---|
| 8.7459 | 8.5822 | 8.7459 | 8.5822 | 8.929 | 8.8759 | 8.9593 | | 8.8759 | | | |
| 9.6477 | 9.7215 | 9.3463 | 9.8723 | 9.6477 | 9.7215 | 9.4333 | 9.8723 | 9.5375 | 9.3608 | 9.5795 | |
| 8.158 | | 8.7457 | | 9.5808 | | 8.9032 | | 8.158 | | 8.698 | |
| 9.7535 | | 9.7047 | | | | | 9.5495 | | | | |
| | | | | | 8.9129 | | | | | | |
| | | 8.8759 | | | | | | | | | RU484 + RU996 |
| 9.7748 | 9.4869 | 9.1673 | 9.5795 | 9.7806 | | | | | | | RU242 + RU484 + RU996 |
| | | 8.698 | | | | | | | | | RU484 + RU2 * 996 |
| | | 9.5495 | | | | | | | | | RU2 * 996 |
| | | 8.9129 | | | | | | | | | RU3 * 996 |

5-2. There is a possible LTF4×240M sequence=[LTF4×160M $0_{23}$ LTF4×80M]. LTF4×160M is a 160 MHz 4×LTF sequence in the 802.11ax standard. LTF4×80M is an 80 MHz 4×LTF sequence in the 802.11ax standard. For specific sequences, refer to the 802.11ax standard. The LTF4×240M sequence has relatively low PAPR values in table A of the 240 MHz. For example, a PAPR value of the LTF4×240M sequence in the full bandwidth of the 240 MHz is 9.2127 dB.

Specifically, the sequence has the following PAPR values on RUs (a plurality of RU combinations or single RUs) in the 1st 80 MHz to the 3rd 80 MHz.

Table for the RUs in the 1st and the 3rd 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7961 | | 7.145 | |
| | 5.3765 | | | | | 5.351 | | | | 6.6952 | | |
| | | | | 5.4964 | | | | | | 7.0805 | | |
| | | | | | | 6.1863 | | | | | | |
| | | | | | | 6.8692 | | | | | | |
| | | | | 6.2946 | | | | | | 6.8965 | | |
| | | | | 6.2889 | | | | | | 7.4226 | | |
| | | | | 8.1143 | | | | | | 8.522 | | |
| | | | | | | 7.4282 | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | 7.807 | |
| | | | 6.4196 | | | | 6.5107 | | | | 5.8426 | |
| | | 7.0805 | | | | | | | 6.9761 | | | |
| | | 6.1863 | | | | | | | 7.3989 | | | |
| | | | | | | 6.8692 | | | | | | |
| | | 6.8965 | | | | | | | 6.5092 | | | |
| | | 7.4226 | | | | | | | 6.9054 | | | |
| | | 8.522 | | | | | | | 8.1606 | | | |
| | | | | | | 7.4282 | | | | | | |
| 6.8009 | 5.6995 | 3.7821 | 3.7821 | 3.7821 | 3.7821 | 3.7821 | 3.7821 | 3.7821 | 3.7821 | 3.7821 | | RU26 |
| 6.9222 | | 4.967 | | 4.4366 | | | 4.967 | | 4.4366 | | | RU52 |
| 5.8426 | | | 5.4753 | | | | | 5.4976 | | | | RU106 |
| 6.9761 | | | | | | 5.5275 | | | | | | RU242 |
| | | | | | 7.3989 | | | | | | | RU484 |
| | | | | | 6.8692 | | | | | | | RU996 |
| 6.5092 | | | | | | 6.4576 | | | | | | RU26 + RU52 |
| 6.9054 | | | | | | 6.1881 | | | | | | RU26 + RU106 |
| 8.1606 | | | | | | 7.8998 | | | | | | RU242 + RU484 |
| | | | | | 7.4282 | | | | | | | RU242 + RU242 |

Table for the RUs in the 2nd 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7961 | | 7.145 | |
| | 5.3765 | | | | | 5.351 | | | | 6.6952 | | |
| | | | | 5.4964 | | | | | | 7.0805 | | |
| | | | | | | 6.1863 | | | | | | |
| | | | | | | 7.4221 | | | | | | |
| | | | | 6.2946 | | | | | | 6.8965 | | |
| | | | | 6.2889 | | | | | | 7.4226 | | |
| | | | | 8.7232 | | | | | | 7.5843 | | |
| | | | | | | 7.7321 | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | 7.807 | |
| | | | 6.4196 | | | | 6.5107 | | | | 5.8426 | |
| | | 7.0805 | | | | | | | 6.9761 | | | |
| | | 6.1863 | | | | | | | 7.3989 | | | |
| | | | | | | 7.4221 | | | | | | |
| | | 6.8965 | | | | | | | 6.5092 | | | |
| | | 7.4226 | | | | | | | 6.9054 | | | |
| | | 7.5843 | | | | | | | 8.369 | | | |
| | | | | | | 7.4282 | | | | | | |

-continued

| | | | | | | | | | | | |
|---|---|---|---|---|---|---|---|---|---|---|---|
| 6.8009 | 5.6995 | 3.7821 | 3.7821 | 3.7821 | 3.7821 | 3.7821 | 3.7821 | 3.7821 | 3.7821 | 3.7821 | RU26 |
| 6.9222 | | 4.967 | | 4.4366 | | | 4.967 | | 4.4366 | | RU52 |
| 5.8426 | | | 5.4753 | | | | | 5.4976 | | | RU106 |
| 6.9761 | | | | | | 5.5275 | | | | | RU242 |
| | | | | | 7.3989 | | | | | | RU484 |
| | | | | | 7.4221 | | | | | | RU996 |
| 6.5092 | | | | | | 6.4576 | | | | | RU26 + RU52 |
| 6.9054 | | | | | | 6.1881 | | | | | RU26 + RU106 |
| 8.369 | | | | | | 7.94 | | | | | RU242 + RU484 |
| | | | | | 7.7321 | | | | | | RU242 + RU242 |

The sequence has the following PAPR values on other RUs in more than 80 MHz (namely, RU combinations) in table A:

| | | | | | | | | |
|---|---|---|---|---|---|---|---|---|
| 9.0469 | 9.2127 | 8.9593 | 8.5822 | 8.929 | 8.5822 | 9.148 | 9.2127 | |
| 7.8349 | 8.047 | 7.5989 | 8.0785 | 8.3465 | 7.9724 | 8.1934 | 7.8393 | 8.3465 |
| | | | | 8.9967 | | | | |
| | | | 9.2127 | | | | RU484 + RU996 | |
| 9.0706 | 8.3958 | 8.03 | 7.735 | 8.3189 | 8.3832 | 8.341 | RU242 + RU484 + RU996 | |
| | | | 8.9967 | | | | RU3 * 996 | |

5-3. There is a possible LTF4×240M sequence=[LTF4×160M $0_{23}$−LTF4×80M]. LTF4×160M is a 160 MHz 4×LTF sequence in the 802.11ax standard. LTF4×80M is an 80 MHz 4×LTF sequence in the 802.11ax standard. For specific sequences, refer to the 802.11ax standard.

The LTF4×240M sequence has relatively low PAPR values in table A of the 240 MHz. For example, a PAPR value of the sequence in the full bandwidth or a puncturing pattern for the 240 MHz is 9.7047 dB. PAPR values in the other puncturing patterns each are less than 9.7047 dB.

The sequence has relatively low PAPR values in various cases (including a full bandwidth of the 240 MHz, various puncturing patterns for the 240 MHz, and various multiple RU combinations for the 240 MHz) in table A of the 240 MHz. For example, the sequence has the following PAPR values on RUs (a plurality of RU combinations or single RUs) in the 1st 80 MHz to the 3rd 80 MHz.

Table for the RUs in the 1st and the 3rd 80 MHz:

| | | | | | | | | | | | | | |
|---|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 | |
| 4.967 | | 4.4366 | | | 4.967 | | 4.4366 | | 6.7961 | | 7.145 | | |
| | 5.3765 | | | | | 5.351 | | | | 6.6952 | | | |
| | | | | 5.4964 | | | | | | 7.0805 | | | |
| | | | | | | 6.1863 | | | | | | | |
| | | | | | | 6.8692 | | | | | | | |
| | | | | 6.2946 | | | | | | 6.8965 | | | |
| | | | | 6.2889 | | | | | | 7.4226 | | | |
| | | | | 8.1143 | | | | | | 8.522 | | | |
| | | | | | | 7.4282 | | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 | |
| | | 8.476 | | 7.4108 | | 7.4968 | | 7.0082 | | | 7.807 | | |
| | | | 6.4196 | | | | 6.5107 | | | | 5.8426 | | |
| | | 7.0805 | | | | | | | 6.9761 | | | | |
| | | 6.1863 | | | | | | | 7.3989 | | | | |
| | | | | | | 6.8692 | | | | | | | |
| | | 6.8965 | | | | | | | 6.5092 | | | | |
| | | 7.4226 | | | | | | | 6.9054 | | | | |
| | | 8.522 | | | | | | | 8.1606 | | | | |
| | | | | | | 7.4282 | | | | | | | |
| 6.8009 | 5.6995 | 3.7821 | 3.7821 | 3.7821 | 3.7821 | 3.7821 | 3.7821 | 3.7821 | 3.7821 | 3.7821 | | | RU26 |
| 6.9222 | | 4.967 | | 4.4366 | | | 4.967 | | 4.4366 | | | | RU52 |
| 5.8426 | | | 5.4753 | | | | | 5.4976 | | | | | RU106 |
| 6.9761 | | | | | | 5.5275 | | | | | | | RU242 |
| | | | | | 7.3989 | | | | | | | | RU484 |
| | | | | | 6.8692 | | | | | | | | RU996 |
| 6.5092 | | | | | | 6.4576 | | | | | | | RU26 + RU52 |
| 6.9054 | | | | | | 6.1881 | | | | | | | RU26 + RU106 |
| 8.1606 | | | | | | 7.8998 | | | | | | | RU242 + RU484 |
| | | | | | 7.4282 | | | | | | | | RU242 + RU242 |

Table for the RUs in the $2^{nd}$ 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7961 | | 7.145 | |
| | 5.3765 | | | | | 5.351 | | | | 6.6952 | | |
| | | | | 5.4964 | | | | | | 7.0805 | | |
| | | | | | | 6.1863 | | | | | | |
| | | | | | | 7.4221 | | | | | | |
| | | | | 6.2946 | | | | | | 6.8965 | | |
| | | | | 6.2889 | | | | | | 7.4226 | | |
| | | | | 8.7232 | | | | | | 7.5843 | | |
| | | | | | | 7.7321 | | | | | | |

| | | | | | | | | | | | | |
|---|---|---|---|---|---|---|---|---|---|---|---|---|
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | 7.807 | |
| | | | 6.4196 | | | | 6.5107 | | | | 5.8426 | |
| | | 7.0805 | | | | | | | 6.9761 | | | |
| | | 6.1863 | | | | | | | 7.3989 | | | |
| | | | | | | 7.4221 | | | | | | |
| | | 6.8965 | | | | | | | 6.5092 | | | |
| | | 7.4226 | | | | | | | 6.9054 | | | |
| | | 7.5843 | | | | | | | 8.369 | | | |
| | | | | | | 7.4282 | | | | | | |

| | | | | | | | | | | | |
|---|---|---|---|---|---|---|---|---|---|---|---|
| 6.8009 | 5.6995 | 3.7821 | 3.7821 | 3.7821 | 3.7821 | 3.7821 | 3.7821 | 3.7821 | 3.7821 | 3.7821 | RU26 |
| 6.9222 | | 4.967 | | 4.4366 | | | 4.967 | | 4.4366 | | RU52 |
| 5.8426 | | | 5.4753 | | | | | 5.4976 | | | RU106 |
| 6.9761 | | | | | | 5.5275 | | | | | RU242 |
| | | | | | 7.3989 | | | | | | RU484 |
| | | | | | 7.4221 | | | | | | RU996 |
| 6.5092 | | | | | | 6.4576 | | | | | RU26 + RU52 |
| 6.9054 | | | | | | 6.1881 | | | | | RU26 + RU106 |
| 8.369 | | | | | | 7.94 | | | | | RU242 + RU484 |
| | | | | | 7.7321 | | | | | | RU242 + RU242 |

The sequence has the following PAPR values on other RUs in more than 80 MHz (namely, RU combinations) in table A:

| | | | | | | | | | |
|---|---|---|---|---|---|---|---|---|---|
| 9.0469 | 9.2127 | 8.9593 | 8.5822 | 8.7459 | 8.8759 | 9.3132 | | 8.7075 | |
| 7.8349 | 8.047 | 7.5989 | 8.0785 | 8.3465 | 7.9724 | 8.1934 | 7.8393 | 8.2845 | 9.1633 |
| 8.5636 | | 8.5102 | | 9.0885 | | 8.9032 | | 8.4782 | |
| 7.263 | | 9.7047 | | | | 7.8024 | | | |
| | | | | 9.219 | | | | | |

| | | | | | | |
|---|---|---|---|---|---|---|
| | | 8.7075 | | | | RU484 + RU996 |
| 8.0877 | 8.5058 | 8.7004 | 7.7487 | 8.7176 | 8.5443 | RU242 + RU484 + RU996 |
| | | 8.6426 | | | | RU484 + RU2 * 996 |
| | | 7.8024 | | | | RU2 * 996 |
| | | 9.219 | | | | RU3 * 996 |

5-4. There is a possible LTF4×240M sequence=[LTF4×80 $MHz_{left}$ 0 LTF4×80 $MHz_{right}$ $0_{23}$ LTF4×80 $MHz_{left}$ 0−LTF4×80 $MHz_{right}$ $0_{23}$ LTF4×80 $MHz_{left}$ 0 LTF4×80 $MHz_{right}$]. LTF4×80 $MHz_{left}$ is an 80 $MHz_{left}$ 4×LTF sequence in the 802.11ax standard. LTF4×80 $MHz_{right}$ is an 80 $MHz_{right}$ 4×LTF sequence in the 802.11ax standard. For specific sequences, refer to the 802.11ax standard.

The LTF4×240M sequence has relatively low PAPR values in table A of the 240 MHz. A PAPR value of the LTF4×240M sequence in the full bandwidth of the 240 MHz is 9.2127 dB.

The sequence has relatively low PAPR values in various cases (including a full bandwidth of the 240 MHz, various puncturing patterns for the 240 MHz, and various multiple RU combinations for the 240 MHz) in table A of the 240 MHz.

For example, the sequence has the following PAPR values on RUs (a plurality of RU combinations or single RUs) in the 1st 80 MHz to the 3rd 80 MHz.

Table for the RUs in the 1st and the 3rd 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7961 | | 7.145 | |
| | 5.3765 | | | | | 5.351 | | | | 6.6952 | | |
| | | | | 5.4964 | | | | | | 7.0805 | | |
| | | | | | | 6.1863 | | | | | | |
| | | | | | | 6.8692 | | | | | | |
| | | | | 6.2946 | | | | | | 6.8965 | | |
| | | | | 6.2889 | | | | | | 7.4226 | | |
| | | | | 8.1143 | | | | | | 8.522 | | |
| | | | | | | 7.4282 | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | 7.807 | |
| | | | 6.4196 | | | | 6.5107 | | | | 5.8426 | |
| | | 7.0805 | | | | | | | 6.9761 | | | |
| | | 6.1863 | | | | | | | 7.3989 | | | |
| | | | | | | 6.8692 | | | | | | |
| | | 6.8965 | | | | | | | 6.5092 | | | |
| | | 7.4226 | | | | | | | 6.9054 | | | |
| | | 8.522 | | | | | | | 8.1606 | | | |
| | | | | | | 7.4282 | | | | | | |
| 6.8009 | | 5.6995 | 3.7821 | 3.7821 | 3.7821 | 3.7821 | 3.7821 | 3.7821 | 3.7821 | 3.7821 | 3.7821 | RU26 |
| | 6.9222 | | 4.967 | | 4.4366 | | | 4.967 | | 4.4366 | | RU52 |
| | 5.8426 | | | 5.4753 | | | | | 5.4976 | | | RU106 |
| | 6.9761 | | | | | | 5.5275 | | | | | RU242 |
| | | | | | 7.3989 | | | | | | | RU484 |
| | | | | | 6.8692 | | | | | | | RU996 |
| | 6.5092 | | | | | | 6.4576 | | | | | RU26 + RU52 |
| | 6.9054 | | | | | | 6.1881 | | | | | RU26 + RU106 |
| | 8.1606 | | | | | | 7.8998 | | | | | RU242 + RU484 |
| | | | | | 7.4282 | | | | | | | RU242 + RU242 |

Table for the RUs in the 2nd 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7961 | | 7.145 | |
| | 5.3765 | | | | | 5.351 | | | | 6.6952 | | |
| | | | | 5.4964 | | | | | | 7.0805 | | |
| | | | | | | 6.1863 | | | | | | |
| | | | | | | 7.4221 | | | | | | |
| | | | | 6.2946 | | | | | | 6.8965 | | |
| | | | | 6.2889 | | | | | | 7.4226 | | |
| | | | | 8.7232 | | | | | | 7.5843 | | |
| | | | | | | 7.7321 | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | 7.807 | |
| | | | 6.4196 | | | | 6.5107 | | | | 5.8426 | |
| | | 7.0805 | | | | | | | 6.9761 | | | |
| | | 6.1863 | | | | | | | 7.3989 | | | |
| | | | | | | 7.4221 | | | | | | |
| | | 6.8965 | | | | | | | 6.5092 | | | |
| | | 7.4226 | | | | | | | 6.9054 | | | |
| | | 7.5843 | | | | | | | 8.369 | | | |
| | | | | | | 7.7321 | | | | | | |
| 6.8009 | | 5.6995 | 3.7821 | 3.7821 | 3.7821 | 3.7821 | 3.7821 | 3.7821 | 3.7821 | 3.7821 | 3.7821 | RU26 |
| | 6.9222 | | 4.967 | | 4.4366 | | | 4.967 | | 4.4366 | | RU52 |
| | 5.8426 | | | 5.4753 | | | | | 5.4976 | | | RU106 |
| | 6.9761 | | | | | | 5.5275 | | | | | RU242 |
| | | | | | 7.3989 | | | | | | | RU484 |
| | | | | | 7.4221 | | | | | | | RU996 |

-continued

| | | |
|---|---|---|
| 6.5092 | 6.4576 | RU26 + RU52 |
| 6.9054 | 6.1881 | RU26 + RU106 |
| 8.369 | 7.94 | RU242 + RU484 |
| | 7.7321 | RU242 + RU242 |

The sequence has the following PAPR values on other RUs in more than 80 MHz (namely. RU combinations) in table A:

| | | | | | | | | |
|---|---|---|---|---|---|---|---|---|
| 9.0469 | 9.2127 | 8.9593 | 8.5822 | 8.929 | 8.5822 | 9.148 | 9.2127 | |
| 7.8349 | 8.047 | 7.5989 | 8.0785 | 8.3465 | 7.9724 | 8.1934 | 7.8393 | 8.3465 |
| | | | | 8.9967 | | | | |
| | | | 9.2127 | | | | RU484 + RU996 | |
| 9.0706 | 8.3958 | 8.03 | 7.735 | 8.3189 | 8.3832 | 8.341 | RU242 + RU484 + RU996 | |
| | | | 8.9967 | | | | RU3 * 996 | |

5-5. There is a possible LTF4×240M sequence=[LTF4×80 $\text{MHz}_{left}$ 0 LTF4×80 $\text{MHz}_{right}$ $0_{23}$ LTF4×80 $\text{MHz}_{left}$ 0−LTF4×80 $\text{MHz}_{right}$ $0_{23}$−LTF4×80 $\text{MHz}_{left}$ 0−LTF4×80 $\text{MHz}_{right}$]. LTF4×80 $\text{MHz}_{left}$ is an 80 $\text{MHz}_{left}$ 4×LTF sequence in the 802.11ax standard. LTF4×80 $\text{MHz}_{right}$ is an 80 $\text{MHz}_{right}$ 4×LTF sequence in the 802.11ax standard. For specific sequences, refer to the 802.11ax standard.

The LTF4×240M sequence has relatively low PAPR values in table A of the 240 MHz. For example, a PAPR value of the sequence in the full bandwidth or a puncturing pattern for the 240 MHz is 9.7047 dB. PAPR values in the other puncturing patterns each are less than 9.7047 dB.

The sequence has relatively low PAPR values in various cases (including a full bandwidth of the 240 MHz, various puncturing patterns for the 240 MHz, and various multiple RU combinations for the 240 MHz) in table A of the 240 MHz.

For example, the sequence has the following PAPR values on RUs (a plurality of RU combinations or single RUs) in the 1st 80 MHz to the 3rd 80 MHz.

Table for the RUs in the 1st and the 3rd 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7961 | | 7.145 | |
| | 5.3765 | | | | | 5.351 | | | | | 6.6952 | |
| | | | | 5.4964 | | | | | | | 7.0805 | |
| | | | | | | 6.1863 | | | | | | |
| | | | | | | 6.8692 | | | | | | |
| | | | | 6.2946 | | | | | | | 6.8965 | |
| | | | | 6.2889 | | | | | | | 7.4226 | |
| | | | | 8.1143 | | | | | | | 8.522 | |
| | | | | | | 7.4282 | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | | 7.807 |
| | | | 6.4196 | | | | 6.5107 | | | | | 5.8426 |
| | | 7.0805 | | | | | | | 6.9761 | | | |
| | | 6.1863 | | | | | | | 7.3989 | | | |
| | | | | | | 6.8692 | | | | | | |
| | | 6.8965 | | | | | | | 6.5092 | | | |
| | | 7.4226 | | | | | | | 6.9054 | | | |
| | | 8.522 | | | | | | | 8.1606 | | | |
| | | | | | | 7.7321 | | | | | | |
| 6.8009 | | 5.6995 | 3.7821 | 3.7821 | 3.7821 | 3.7821 | 3.7821 | 3.7821 | 3.7821 | 3.7821 | 3.7821 | RU26 |
| | 6.9222 | | 4.967 | | 4.4366 | | | 4.967 | | 4.4366 | | RU52 |
| | 5.8426 | | | 5.4753 | | | | | 5.4976 | | | RU106 |
| | 6.9761 | | | | | | 5.5275 | | | | | RU242 |
| | | | | | 7.3989 | | | | | | | RU484 |
| | | | | | 6.8692 | | | | | | | RU996 |
| | 6.5092 | | | | | | 6.4576 | | | | | RU26 + RU52 |
| | 6.9054 | | | | | | 6.1881 | | | | | RU26 + RU106 |
| | 8.1606 | | | | | | 7.8998 | | | | | RU242 + RU484 |
| | | | | | 7.4282 | | | | | | | RU242 + RU242 |

Table for the RUs in the $2^{nd}$ 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7961 | | 7.145 | |
| | 5.3765 | | | | | 5.351 | | | | 6.6952 | | |
| | | | | 5.4964 | | | | | | 7.0805 | | |
| | | | | | | 6.1863 | | | | | | |
| | | | | | | 7.4221 | | | | | | |
| | | | | 6.2946 | | | | | | 6.8965 | | |
| | | | | 6.2889 | | | | | | 7.4226 | | |
| | | | | 8.7232 | | | | | | 7.5843 | | |
| | | | | | | 7.7321 | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | 7.807 | |
| | | | 6.4196 | | | | 6.5107 | | | | 5.8426 | |
| | | 7.0805 | | | | | | | 6.9761 | | | |
| | | 6.1863 | | | | | | | 7.3989 | | | |
| | | | | | | 7.4221 | | | | | | |
| | | 6.8965 | | | | | | | 6.5092 | | | |
| | | 7.4226 | | | | | | | 6.9054 | | | |
| | | 7.5843 | | | | | | | 8.369 | | | |
| | | | | | | 7.7321 | | | | | | |
| 6.8009 | | 5.6995 | 3.7821 | 3.7821 | 3.7821 | 3.7821 | 3.7821 | 3.7821 | 3.7821 | 3.7821 | 3.7821 | RU26 |
| | 6.9222 | | 4.967 | | 4.4366 | | | 4.967 | | 4.4366 | | RU52 |
| | 5.8426 | | | 5.4753 | | | | | 5.4976 | | | RU106 |
| | 6.9761 | | | | | | 5.5275 | | | | | RU242 |
| | | | | | 7.3989 | | | | | | | RU484 |
| | | | | | 7.4221 | | | | | | | RU996 |
| | 6.5092 | | | | | | 6.4576 | | | | | RU26 + RU52 |
| | 6.9054 | | | | | | 6.1881 | | | | | RU26 + RU106 |
| | 8.369 | | | | | | 7.94 | | | | | RU242 + RU484 |
| | | | | | 7.7321 | | | | | | | RU242 + RU242 |

The sequence has the following PAPR values on other RUs in more than 80 MHz (namely, RU combinations) in table A:

| | | | | | | | | | |
|---|---|---|---|---|---|---|---|---|---|
| 9.0469 | 9.2127 | 8.9593 | 8.5822 | 8.7459 | 8.8759 | 9.3132 | | 8.7075 | |
| 7.8349 | 8.047 | 7.5989 | 8.0785 | 8.3465 | 7.9724 | 8.1934 | 7.8393 | | 8.2845 |
| 8.5636 | | 8.5102 | | 9.0885 | | 8.9032 | | | 8.4782 |
| 7.263 | | 9.7047 | | | | 7.8024 | | | |
| | | | | 9.219 | | | | | |
| | | | 8.7075 | | | | | RU484 + RU996 | |
| 9.1633 | 8.0877 | 8.5058 | 8.7004 | 7.7487 | 8.7176 | 8.5443 | | RU242 + RU484 + RU996 | |
| 8.4782 | | | 8.6426 | | | | | RU484 + RU2 * 996 | |
| | | | 7.8024 | | | | | RU2 * 996 | |
| | | | 9.219 | | | | | RU3 * 996 | |

6. 4×LTF Sequence in the 320 MHz Bandwidth (Referred to as an LTF4×320M Sequence for Short)

6-1. There is a possible LTF4×320M sequence=[LTF4×80M $0_{23}$ LTF4×80M $0_{23}$−LTF4×80M $0_{23}$−LTF4×80M]. LTF4×80M is an 80 MHz 4×LTF sequence in the 802.11ax standard. For a specific sequence, refer to the 802.11ax standard.

The LTF4×320M sequence has relatively low PAPR values in various cases (including a full bandwidth of the 320 MHz, various puncturing patterns for the 320 MHz, and various multiple RU combinations for the 320 MHz) in table B of the 320 MHz. For example, a PAPR value of the sequence in a puncturing pattern for the 320 MHz is 10.7708 dB. PAPR values in the other puncturing patterns each are less than 10.7708 dB. For example, a PAPR value is 10.3033 dB in puncturing pattern 1.

Specifically, the sequence has the following PAPR values on RUs (a plurality of RU combinations or single RUs) in the $1^{st}$ 80 MHz to the $4^{th}$ 80 MHz.

Table for the RUs in the $1^{st}$, the $2^{nd}$, the $3^{rd}$, and the $4^{th}$ 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | 6.6954 | | |
| | | | | 5.4964 | | | | | | 7.08 | | |
| | | | | | | 6.1862 | | | | | | |
| | | | | | | 6.8794 | | | | | | |
| | | | | 6.2945 | | | | | | 6.8965 | | |
| | | | | 6.2888 | | | | | | 7.4227 | | |
| | | | | 8.1123 | | | | | | 8.5181 | | |
| | | | | | | 7.4446 | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | 7.807 | |
| | | | 6.4197 | | | | 6.5108 | | | | 5.8427 | |
| | | 7.08 | | | | | | | 6.9765 | | | |
| | | 6.1862 | | | | | | | 7.4039 | | | |
| | | | | | | 6.8794 | | | | | | |
| | | 6.8965 | | | | | | | 6.5092 | | | |
| | | 7.4227 | | | | | | | 6.9053 | | | |
| | | 8.5181 | | | | | | | 8.1683 | | | |
| | | | | | | 7.4446 | | | | | | |
| 6.8009 | | 5.6995 | 3.7821 | 3.7821 | 3.7821 | 3.7821 | 3.7821 | 3.7821 | 3.7821 | 3.7821 | 3.7821 | RU26 |
| | 6.9222 | | 4.967 | | 4.4366 | | | 4.967 | | 4.4366 | | RU52 |
| | 5.8427 | | | 5.4754 | | | | | 5.4977 | | | RU106 |
| | 6.9765 | | | | | | 5.5275 | | | | | RU242 |
| | | | | | 7.4039 | | | | | | | RU484 |
| | | | | | 6.8794 | | | | | | | RU996 |
| | 6.5092 | | | | | | 6.4576 | | | | | RU26 + RU52 |
| | 6.9053 | | | | | | 6.1879 | | | | | RU26 + RU106 |
| | 8.1683 | | | | | | 7.9065 | | | | | RU242 + RU484 |
| | | | | | 7.4446 | | | | | | | RU242 + RU242 |

The sequence has the following PAPR values on other RUs in more than 80 MHz (namely, RU combinations) in table B.

| | | | | | | | | |
|---|---|---|---|---|---|---|---|---|
| 8.7459 | 8.5822 | 8.7459 | 8.5822 | 8.7459 | 8.5822 | 8.7459 | 8.5822 | |
| 9.6477 | 9.7929 | 9.3463 | 9.8723 | 9.6477 | 9.7215 | 9.4947 | 9.8723 | 9.6477 |
| 9.6212 | | 9.8446 | | 10.436 | | 10.172 | | 10.227 |
| 10.27 | | 10.27 | | 8.9129 | | | 8.9129 | |
| 9.5702 | | 9.3248 | | 9.9801 | | 10.419 | | 9.7444 |
| 9.8472 | | 10.163 | | 9.911 | | 9.8872 | | 9.6101 |
| 8.158 | | 8.8489 | | 9.5808 | | 8.9032 | | 8.1879 |
| 8.3182 | | 8.0885 | | 9.0885 | | 9.8451 | | 8.3883 |
| 9.5495 | | 9.7535 | | | | 9.7047 | | |
| 9.7047 | | 9.7535 | | | | 9.5495 | | |
| 9.7535 | | 9.7047 | | | | 9.5495 | | |
| 9.5495 | | 9.7047 | | | | 9.7535 | | |
| | | | | 10.3033 | | | | |
| | | | 8.5822 | | | | | RU484 + RU996 |
| 9.7929 | 9.3463 | 9.8723 | 9.6477 | 9.7215 | 9.4947 | 9.8723 | | RU242 + RU484 + RU996 |
| 10.227 | 10.771 | | 9.5687 | | 9.3672 | | | RU484 + RU3 * 996 |
| | | | 8.9129 | | | | | RU3 * 996 |
| 9.7444 | | | 9.7008 | | | | | RU484 + |

-continued

| | | |
|---|---|---|
| 9.6101 | 9.6519 | RU2 * |
| 8.1879 | 8.8044 | 996 |
| 8.3883 | 8.1813 | |
| | 9.7047 | RU2 * |
| | 9.5495 | 996 |
| | 9.5495 | |
| | 9.7535 | |
| | 10.3033 | RU4 * |
| | | 996 |

6-2. There is a possible LTF4×320M sequence=[LTF4×160M $0_{23}$ LTF4×160M]. LTF4×160M is a 160 MHz 4×LTF sequence in the 802.11ax standard. For a specific sequence, refer to the 802.11ax standard.

The LTF2×320M sequence has relatively low PAPR values in various cases (including a full bandwidth of the 320 MHz, various puncturing patterns for the 320 MHz, and various multiple RU combinations for the 320 MHz) in table B of the 320 MHz. A PAPR value of the LTF4×320M sequence in the full bandwidth or puncturing pattern 1 for the 240 MHz is 9.9610 dB.

Specifically, the sequence has the following PAPR values on RUs (a plurality of RU combinations or single RUs) in the 1st 80 MHz to the 4th 80 MHz.

Table for the RUs in the 1st and the 3rd 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | | 6.6954 | |
| | | | | 5.4964 | | | | | | | 7.08 | |
| | | | | | | 6.1862 | | | | | | |
| | | | | | | 6.8794 | | | | | | |
| | | | | 6.2945 | | | | | | | 6.8965 | |
| | | | | 6.2888 | | | | | | | 7.4227 | |
| | | | | 8.1123 | | | | | | | 8.5181 | |
| | | | | | | 7.4446 | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | 7.807 | |
| | | | 6.4197 | | | | 6.5108 | | | | 5.8427 | |
| | | 7.08 | | | | | | | 6.9765 | | | |
| | | 6.1862 | | | | | | | 7.4039 | | | |
| | | | | | | 6.8794 | | | | | | |
| | | 6.8965 | | | | | | | 6.5092 | | | |
| | | 7.4227 | | | | | | | 6.9053 | | | |
| | | 8.5181 | | | | | | | 8.1683 | | | |
| | | | | | | 7.7321 | | | | | | |
| 6.8009 | | 5.6995 | 3.7821 | 3.7821 | 3.7821 | 3.7821 | 3.7821 | 3.7821 | 3.7821 | 3.7821 | 3.7821 | RU26 |
| | 6.9222 | | 4.967 | | 4.4366 | | | 4.967 | | 4.4366 | | RU52 |
| | 5.8427 | | | 5.4754 | | | | | 5.4977 | | | RU106 |
| | 6.9765 | | | | | | 5.5275 | | | | | RU242 |
| | | | | | 7.4039 | | | | | | | RU484 |
| | | | | | 6.8794 | | | | | | | RU996 |
| | 6.5092 | | | | | | 6.4576 | | | | | RU26 + RU52 |
| | 6.9053 | | | | | | 6.1879 | | | | | RU26 + RU106 |
| | 8.1683 | | | | | | 7.9065 | | | | | RU242 + RU484 |
| | | | | | 7.4446 | | | | | | | RU242 + RU242 |

Table for the RUs in the 2nd and the 4th 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3765 | | | | | 5.351 | | | | | 6.6954 | |
| | | | | 5.4964 | | | | | | | 7.08 | |
| | | | | | | 6.1862 | | | | | | |
| | | | | | | 7.4087 | | | | | | |
| | | | | 6.2945 | | | | | | | 6.8965 | |
| | | | | 6.2888 | | | | | | | 7.4227 | |

-continued

| | | | | | | | | | | | |
|---|---|---|---|---|---|---|---|---|---|---|---|
| | | | 8.7348 | | | | | | 7.5746 | | |
| | | | | | 7.726 | | | | | | |
| 6.977 | 6.1076 | 7.2882 | 6.3562 | 6.4568 | 6.0199 | 5.2847 | 6.0963 | 5.6995 | 6.5421 | 6.8536 | 5.2847 |
| | 8.476 | | 7.4108 | | 7.4968 | | 7.0082 | | | | 7.807 |
| | | 6.4197 | | | | 6.5108 | | | | | 5.8427 |
| | 7.08 | | | | | | | 6.9765 | | | |
| | 6.1862 | | | | | | | 7.4039 | | | |
| | | | | | 7.4087 | | | | | | |
| | 6.8965 | | | | | | | 6.5092 | | | |
| | 7.4227 | | | | | | | 6.9053 | | | |
| | 7.5746 | | | | | | | 8.369 | | | |
| | | | | | 7.726 | | | | | | |
| 6.8009 | 5.6995 | 3.7821 | 3.7821 | 3.7821 | 3.7821 | 3.7821 | 3.7821 | 3.7821 | 3.7821 | 3.7821 | RU26 |
| 6.9222 | | 4.967 | | 4.4366 | | | 4.967 | | 4.4366 | | RU52 |
| 5.8427 | | | 5.4754 | | | | | 5.4977 | | | RU106 |
| 6.9765 | | | | | | 5.5275 | | | | | RU242 |
| | | | | 7.4039 | | | | | | | RU484 |
| | | | | 7.4087 | | | | | | | RU996 |
| 6.5092 | | | | | | 6.4576 | | | | | RU26 + RU52 |
| 6.9053 | | | | | | 6.1879 | | | | | RU26 + RU106 |
| 8.369 | | | | | | 7.9397 | | | | | RU242 + RU484 |
| | | | | 7.726 | | | | | | | RU242 + RU242 |

The sequence has the following PAPR values on other RUs in more than 80 MHz (namely, RU combinations) in table B.

| | | | | | | | | |
|---|---|---|---|---|---|---|---|---|
| 9.0469 | 9.3005 | 9.02933 | 8.5822 | 9.0469 | 9.3005 | 9.0293 | 8.5822 | |
| 7.8078 | 8.0323 | 7.5407 | 8.1522 | 8.3465 | 8.0348 | 8.1934 | 7.8295 | 7.8078 |
| 9.211 | | 9.2872 | | 8.9967 | | | 8.7201 | |
| | | | | 9.961 | | | | |
| | | | 8.5822 | | | | | RU484 + RU996 |
| 8.0323 | 7.5407 | 8.1522 | 8.3465 | 8.0348 | 8.1934 | 7.8295 | | RU242 + RU484 + RU996 |
| | | | 8.7201 | | | | | RU3 * 996 |
| | | | 9.961 | | | | | RU4 * 996 |

6-3. There is a possible LTF4×320M sequence=[LTF4×160M $0_{23}$−LTF4×160M]. LTF4×160M is a 160 MHz 4×LTF sequence in the 802.11ax standard. For a specific sequence, refer to the 802.11ax standard.

The LTF4×320M sequence has relatively low PAPR values in various cases (including a full bandwidth of the 320 MHz, various puncturing patterns for the 320 MHz, and various multiple RU combinations for the 320 MHz) in table B of the 320 MHz. For example, a PAPR value of the sequence in a pattern for the 320 MHz is 10.2842 dB (if RU484+RU2*996 is considered) or 10.2793 dB (if RU484+RU2*996 is not considered). PAPR values in the other puncturing patterns each are less than 10.2793 dB.

Specifically, the sequence has the following PAPR values on RUs (a plurality of RU combinations or single RUs) in the 1st 80 MHz to the 4th 80 MHz.

Table for the RUs in the 1st and the 3rd 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | | 6.6954 | |
| | | | | 5.4964 | | | | | | 7.08 | | |
| | | | | | 6.1862 | | | | | | | |
| | | | | | 6.8794 | | | | | | | |
| | | | | 6.2945 | | | | | | 6.8965 | | |
| | | | | 6.2888 | | | | | | 7.4227 | | |
| | | | | 8.1123 | | | | | | 8.5181 | | |
| | | | | | 7.4446 | | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | 7.807 | |
| | | | 6.4197 | | | | 6.5108 | | | | 5.8427 | |
| | | 7.08 | | | | | | | 6.9765 | | | |
| | | 6.1862 | | | | | | | 7.4039 | | | |
| | | | | | 6.8794 | | | | | | | |

-continued

| | | | | | | | | | | | |
|---|---|---|---|---|---|---|---|---|---|---|---|
| | 6.8965 | | | | | | | 6.5092 | | | |
| | 7.4227 | | | | | | | 6.9053 | | | |
| | 8.5181 | | | | | | | 8.1683 | | | |
| | | | | | 7.4446 | | | | | | |
| 6.8009 | 5.6995 | 3.7821 | 3.7821 | 3.7821 | 3.7821 | 3.7821 | 3.7821 | 3.7821 | 3.7821 | 3.7821 | RU26 |
| 6.9222 | | | 4.967 | | 4.4366 | | | 4.967 | | 4.4366 | RU52 |
| 5.8427 | | | 5.4754 | | | | | 5.4977 | | | RU106 |
| 6.9765 | | | | | | 5.5275 | | | | | RU242 |
| | | | | | 7.4039 | | | | | | RU484 |
| | | | | | 6.8794 | | | | | | RU996 |
| 6.5092 | | | | | | 6.4576 | | | | | RU26 + RU52 |
| 6.9053 | | | | | | 6.1879 | | | | | RU26 + RU106 |
| 8.1683 | | | | | | 7.9065 | | | | | RU242 + RU484 |
| | | | | | 7.4446 | | | | | | RU242 + RU242 |

Table for the RUs in the $2^{nd}$ and the 4th 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| | 4.967 | 4.4366 | | | | 4.967 | 4.4366 | | 6.7962 | | | 7.145 |
| | | 5.3767 | | | | | 5.351 | | | | 6.6954 | |
| | | | | 5.4964 | | | | | | | 7.08 | |
| | | | | | | 6.1862 | | | | | | |
| | | | | | | 7.4087 | | | | | | |
| | | | | 6.2945 | | | | | | | 6.8965 | |
| | | | | 6.2888 | | | | | | | 7.4227 | |
| | | | | 8.7348 | | | | | | | 7.5746 | |
| | | | | | | 7.726 | | | | | | |
| | 6.977 | 6.1076 | 7.2882 | 6.3562 | 6.4568 | 6.0199 | 5.2847 | 6.0963 | 5.6995 | 6.5421 | 6.8536 | 5.2847 |
| | | | 8.476 | 7.4108 | | | 7.4968 | 7.0082 | | | | 7.807 |
| | | | 6.4197 | | | | 6.5108 | | | | | 5.8427 |
| | | 7.08 | | | | | | | 6.9765 | | | |
| | | 6.1862 | | | | | | | 7.4039 | | | |
| | | | | | | 7.4087 | | | | | | |
| | | 6.8965 | | | | | | | 6.5092 | | | |
| | | 7.4227 | | | | | | | 6.9053 | | | |
| | | 7.5746 | | | | | | | 8.369 | | | |
| | | | | | | 7.726 | | | | | | |
| | 6.8009 | 5.6995 | 3.7821 | 3.7821 | 3.7821 | 3.7821 | 3.7821 | 3.7821 | 3.7821 | 3.7821 | 3.7821 | RU26 |
| | 6.9222 | | | 4.967 | | 4.4366 | | | 4.967 | | 4.4366 | RU52 |
| | 5.8427 | | | 5.4754 | | | | | 5.4977 | | | RU106 |
| | 6.9765 | | | | | | 5.5275 | | | | | RU242 |
| | | | | | | 7.4039 | | | | | | RU484 |
| | | | | | | 7.4087 | | | | | | RU996 |
| | 6.5092 | | | | | | 6.4576 | | | | | RU26 + RU52 |
| | 6.9053 | | | | | | 6.1879 | | | | | RU26 + RU106 |
| | 8.369 | | | | | | 7.9397 | | | | | RU242 + RU484 |
| | | | | | | 7.726 | | | | | | RU242 + RU242 |

The sequence has the following PAPR values on other RUs in more than 80 MHz (namely, RU combinations) in table B.

| | | | | | | | | |
|---|---|---|---|---|---|---|---|---|
| 9.0469 | 9.3005 | 9.0293 | 8.5822 | 9.0469 | 9.3005 | 9.0293 | | 8.5822 |
| 7.8078 | 8.0323 | 7.5407 | 8.1522 | 8.3465 | 8.0348 | 8.1934 | 7.8295 | 7.8078 |
| 9.6603 | | 10.279 | | 9.6764 | | | 9.6836 | 9.5247 |
| 9.219 | | 9.4159 | | 9.219 | | | 9.4138 | |
| 8.68 | | 9.4991 | | 8.4782 | | | 8.481 | 9.8112 |
| 10.105 | | 10.284 | | 8.0493 | | | 8.812 | 8.8152 |
| 8.6518 | | 8.5538 | | 9.0885 | | | 8.9032 | 8.4782 |
| 8.2135 | | 8.7828 | | 9.4901 | | | 9.4315 | 8.5842 |
| 7.8854 | | 7.7657 | | | | | 9.7047 | |
| 10.045 | | 7.7657 | | | | | 7.8854 | |
| 7.2484 | | 9.7047 | | | | | 7.8854 | |
| 7.8854 | | 10.045 | | | | | 7.2484 | |
| | | | 8.5822 | | | | | RU484 + |

-continued

| | | | | | | | |
|---|---|---|---|---|---|---|---|
| | | | | | | | RU996 |
| 8.0323 | 7.5407 | 8.1522 | 8.3465 | 8.0348 | 8.1934 | 7.8295 | RU242 + RU484 + RU996 |
| 9.5247 | 9.7706 | | 9.7151 | | 9.8314 | | RU484 + RU3 * 996 |
| | | | 9.4138 | | | | RU3 * 996 |
| 9.8112 | | | 9.7008 | | | | RU484 + RU2 * 996 |
| 8.8152 | | | 9.3773 | | | | |
| 8.4782 | | | 8.7398 | | | | |
| 8.5842 | | | 8.7828 | | | | |
| | | | 9.7047 | | | | RU2 * 996 |
| | | | 7.8854 | | | | |
| | | | 7.8854 | | | | |
| | | | 7.2484 | | | | |
| | | | 10.1186 | | | | RU4 * 996 |

6-4. There is a possible LTF4×320M sequence=[LTF4×80 $MHz_{left}$ 0 LTF4×80 $MHz_{right}$ $0_{23}$ LTF4×80 $MHz_{left}$ 0−LTF4×80 $MHz_{right}$ $0_{23}$−LTF4×80 $MHz_{left}$ 0 LTF4×80 $MHz_{right}$ $0_{23}$ LTF4×80 $MHz_{left}$ 0 LTF4×80 $MHz_{right}$]. LTF4×80 $MHz_{left}$ is an 80 $MHz_{left}$ 4×LTF sequence in the 802.11ax standard. LTF4×80 $MHz_{right}$ is an 80 $MHz_{right}$ 4×LTF sequence in the 802.11ax standard. For specific sequences, refer to the 802.11ax standard.

The LTF4×320M sequence has relatively low PAPR values in various cases (including a full bandwidth of the 320 MHz, various puncturing patterns for the 320 MHz, and various multiple RU combinations for the 320 MHz) in table B of the 320 MHz. A PAPR value of the LTF4×320M sequence in the full bandwidth of the 320 MHz is 9.4793 dB.

Specifically, the sequence has the following PAPR values on RUs (a plurality of RU combinations or single RUs) in the $1^{st}$ 80 MHz to the 4th 80 MHz.

Table for the RUs in the $1^{st}$ and the 4th 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | | 7.145 |
| | 5.3767 | | | | | 5.351 | | | | | 6.6954 | |
| | | | | 5.4964 | | | | | | | 7.08 | |
| | | | | | | 6.1862 | | | | | | |
| | | | | | | 6.8794 | | | | | | |
| | | | | 6.2945 | | | | | | | 6.8965 | |
| | | | | 6.2888 | | | | | | | 7.4227 | |
| | | | | 8.1123 | | | | | | | 8.5181 | |
| | | | | | | 7.4446 | | | | | | |
| 6.977 | | 6.1076 | 7.2882 | 6.3562 | 6.4568 | 6.0199 | 5.2847 | 6.0963 | 5.6995 | 6.5421 | 6.8536 | 5.2847 |
| | | 8.476 | | 7.4108 | | 7.4968 | | 7.0082 | | | | 7.807 |
| | | | 6.4197 | | | | 6.5108 | | | | | 5.8427 |
| | | 7.08 | | | | | | | 6.9765 | | | |
| | | 6.1862 | | | | | | | 7.4039 | | | |
| | | | | | | 6.8794 | | | | | | |
| | | 6.8965 | | | | | | | 6.5092 | | | |
| | | 7.4227 | | | | | | | 6.9053 | | | |
| | | 8.5181 | | | | | | | 8.1683 | | | |
| | | | | | | 7.4446 | | | | | | |
| 6.8009 | | 5.6995 | 3.7821 | 3.7821 | 3.7821 | 3.7821 | 3.7821 | 3.7821 | 3.7821 | 3.7821 | 3.7821 | RU26 |
| | 6.9222 | | 4.967 | | 4.4366 | | | 4.967 | | 4.4366 | | RU52 |
| | 5.8427 | | | 5.4754 | | | | | 5.4977 | | | RU106 |
| | 6.9765 | | | | | | 5.5275 | | | | | RU242 |
| | | | | | 7.4039 | | | | | | | RU484 |
| | | | | | 6.8794 | | | | | | | RU996 |
| | 6.5092 | | | | | | 6.4576 | | | | | RU26 + RU52 |
| | 6.9053 | | | | | | 6.1879 | | | | | RU26 + RU106 |
| | 8.1683 | | | | | | 7.9065 | | | | | RU242 + RU484 |
| | | | | | 7.4446 | | | | | | | RU242 + RU242 |

Table for the RUs in the $2^{nd}$ and the $3^{rd}$ 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | 6.6954 | | |
| | | | | 5.4964 | | | | | | 7.08 | | |
| | | | | | | 6.1862 | | | | | | |
| | | | | | | 7.4087 | | | | | | |
| | | | | 6.2945 | | | | | | 6.8965 | | |
| | | | | 6.2888 | | | | | | 7.4227 | | |
| | | | | 8.7348 | | | | | | 7.5746 | | |
| | | | | | | 7.726 | | | | | | |
| 6.977 | 6.1076 | 7.2882 | 6.3562 | 6.4568 | 6.0199 | 5.2847 | 6.0963 | 5.6995 | 6.5421 | 6.8536 | 5.2847 | |
| | 8.476 | | 7.4108 | | 7.4968 | | 7.0082 | | | | 7.807 | |
| | | 6.4197 | | | | 6.5108 | | | | | 5.8427 | |
| | | 7.08 | | | | | | 6.9765 | | | | |
| | | 6.1862 | | | | | | 7.4039 | | | | |
| | | | | | | 7.4087 | | | | | | |
| | | 6.8965 | | | | | | 6.5092 | | | | |
| | | 7.4227 | | | | | | 6.9053 | | | | |
| | | 7.5746 | | | | | | 8.369 | | | | |
| | | | | | | 7.726 | | | | | | |
| 6.8009 | 5.6995 | 3.7821 | 3.7821 | 3.7821 | 3.7821 | 3.7821 | 3.7821 | 3.7821 | 3.7821 | 3.7821 | | RU26 |
| 6.9222 | | 4.967 | | 4.4366 | | | 4.967 | | 4.4366 | | | RU52 |
| 5.8427 | | | 5.4754 | | | | | 5.4977 | | | | RU106 |
| 6.9765 | | | | | | 5.5275 | | | | | | RU242 |
| | | | | | 7.4039 | | | | | | | RU484 |
| | | | | | 7.4087 | | | | | | | RU996 |
| 6.5092 | | | | | | 6.4576 | | | | | | RU26 + RU52 |
| 6.9053 | | | | | | 6.1879 | | | | | | RU26 + RU106 |
| 8.369 | | | | | | 7.9397 | | | | | | RU242 + RU484 |
| | | | | | 7.726 | | | | | | | RU242 + RU242 |

The sequence has the following PAPR values on other RUs in more than 80 MHz (namely, RU combinations) in table B.

| | | | | | | | | |
|---|---|---|---|---|---|---|---|---|
| 9.0469 | 9.3005 | 9.0293 | 8.5822 | 8.7459 | 8.8931 | 9.3132 | | 8.7075 |
| 7.8078 | 8.0323 | 7.5407 | 8.1522 | 8.3465 | 8.0348 | 8.1934 | 7.8295 | 8.2816 |
| 8.7174 | | 9.0955 | | 8.8633 | | | 9.4271 | |
| | | | | 9.4793 | | | | |
| | | | 8.7075 | | | | | RU484 + RU996 |
| 9.1633 | 8.0877 | 8.47 | 8.7004 | 7.7602 | 8.7615 | 8.5355 | | RU242 + RU484 + RU996 |
| | | | 9.4271 | | | | | RU3 * 996 |
| | | | 9.4793 | | | | | RU4 * 996 |

6-5. There is a possible LTF4×320M sequence=[LTF4×80 $MHz_{left}$ 0−LTF4×80 $MHz_{right}$ $0_{23}$−LTF4×80 $MHz_{left}$ 0−LTF4×80 $MHz_{right}$ $0_{23}$−LTF4×80 $MHz_{left}$ 0 LTF4×80 $MHz_{right}$ $0_{23}$ LTF4×80 $MHz_{left}$ 0 LTF4×80 $MHz_{right}$]. LTF4×80 $MHz_{left}$ is an 80 $MHz_{left}$ 4×LTF sequence in the 802.11ax standard. LTF4×80 $MHz_{right}$ is an 80 $MHz_{right}$ 4×LTF sequence in the 802.11ax standard. For specific sequences, refer to the 802.11ax standard.

The LTF4×320M sequence has relatively low PAPR values in various cases (including a full bandwidth of the 320 MHz, various puncturing patterns for the 320 MHz, and various multiple RU combinations for the 320 MHz) in table B of the 320 MHz. For example, a PAPR value of the sequence in a pattern for the 320 MHz is 10.1186 dB. PAPR values in the other puncturing patterns each are less than 10.1186 dB.

Specifically, the sequence has the following PAPR values on RUs (a plurality of RU combinations or single RUs) in the 1st 80 MHz to the 4th 80 MHz.

Table for the RUs in the 1st and the 3rd 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | 6.6954 | | |
| | | | | 5.4964 | | | | | | 7.08 | | |
| | | | | | | 6.1862 | | | | | | |
| | | | | | | 7.4087 | | | | | | |
| | | | | 6.2945 | | | | | | 6.8965 | | |
| | | | | 6.2888 | | | | | | 7.4227 | | |
| | | | | 8.7348 | | | | | | 7.5746 | | |
| | | | | | | 7.726 | | | | | | |
| 6.977 | 6.1076 | 7.2882 | 6.3562 | 6.4568 | 6.0199 | 5.2847 | 6.0963 | 5.6995 | 6.5421 | 6.8536 | 5.2847 | |
| | 8.476 | | 7.4108 | | 7.4968 | | 7.0082 | | | | 7.807 | |
| | | 6.4197 | | | | 6.5108 | | | | | 5.8427 | |
| | | 7.08 | | | | | | 6.9765 | | | | |
| | | 6.1862 | | | | | | 7.4039 | | | | |
| | | | | | | 7.4087 | | | | | | |
| | | 6.8965 | | | | | | 6.5092 | | | | |
| | | 7.4227 | | | | | | 6.9053 | | | | |
| | | 7.5746 | | | | | | 8.369 | | | | |
| | | | | | | 7.726 | | | | | | |
| 6.8009 | 5.6995 | 3.7821 | 3.7821 | 3.7821 | 3.7821 | 3.7821 | 3.7821 | 3.7821 | 3.7821 | 3.7821 | | RU26 |
| 6.9222 | | 4.967 | | 4.4366 | | | 4.967 | | 4.4366 | | | RU52 |
| 5.8427 | | | 5.4754 | | | | | 5.4977 | | | | RU106 |
| 6.9765 | | | | | | 5.5275 | | | | | | RU242 |
| | | | | | 7.4039 | | | | | | | RU484 |
| | | | | | 7.4087 | | | | | | | RU996 |
| 6.5092 | | | | | | 6.4576 | | | | | | RU26 + RU52 |
| 6.9053 | | | | | | 6.1879 | | | | | | RU26 + RU106 |
| 8.369 | | | | | | 7.9397 | | | | | | RU242 + RU484 |
| | | | | | 7.726 | | | | | | | RU242 + RU242 |

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | 6.6954 | | |
| | | | | 5.4964 | | | | | | 7.08 | | |
| | | | | | | 6.1862 | | | | | | |
| | | | | | | 6.8794 | | | | | | |
| | | | | 6.2945 | | | | | | 6.8965 | | |
| | | | | 6.2888 | | | | | | 7.4227 | | |
| | | | | 8.1123 | | | | | | 8.5181 | | |
| | | | | | | 7.4446 | | | | | | |
| 6.977 | 6.1076 | 7.2882 | 6.3562 | 6.4568 | 6.0199 | 5.2847 | 6.0963 | 5.6995 | 6.5421 | 6.8536 | 5.2847 | |
| | 8.476 | | 7.4108 | | 7.4968 | | 7.0082 | | | | 7.807 | |
| | | 6.4197 | | | | 6.5108 | | | | | 5.8427 | |
| | | 7.08 | | | | | | 6.9765 | | | | |
| | | 6.1862 | | | | | | 7.4039 | | | | |
| | | | | | | 6.8794 | | | | | | |
| | | 6.8965 | | | | | | 6.5092 | | | | |
| | | 7.4227 | | | | | | 6.9053 | | | | |
| | | 8.5181 | | | | | | 8.1683 | | | | |
| | | | | | | 7.4446 | | | | | | |

-continued

| | | | | | | | | | | | |
|---|---|---|---|---|---|---|---|---|---|---|---|
| 6.8009 | 5.6995 | 3.7821 | 3.7821 | 3.7821 | 3.7821 | 3.7821 | 3.7821 | 3.7821 | 3.7821 | 3.7821 | RU26 |
| 6.9222 | | 4.967 | | 4.4366 | | | 4.967 | | 4.4366 | | RU52 |
| 5.8427 | | | 5.4754 | | | | | 5.4977 | | | RU106 |
| 6.9765 | | | | | | 5.5275 | | | | | RU242 |
| | | | | | 7.4039 | | | | | | RU484 |
| | | | | | 6.8794 | | | | | | RU996 |
| 6.5092 | | | | | | 6.4576 | | | | | RU26 + RU52 |
| 6.9053 | | | | | | 6.1879 | | | | | RU26 + RU106 |
| 8.1683 | | | | | | 7.9065 | | | | | RU242 + RU484 |
| | | | | | 7.4446 | | | | | | RU242 + RU242 |

The sequence has the following PAPR values on other RUs in more than 80 MHz (namely, RU combinations) in table B.

| | | | | | | | | |
|---|---|---|---|---|---|---|---|---|
| 8.7459 | 8.8931 | 9.3132 | 8.7075 | 8.7459 | 8.8931 | 9.3132 | 8.7075 | |
| 8.2816 | 9.1633 | 8.0877 | 8.47 | 8.7004 | 7.7602 | 8.7615 | 8.5355 | 8.2816 |
| 9.9322 | | 9.812 | | 9.503 | | 9.7706 | | 9.6764 |
| 9.4138 | | 9.219 | | 9.4138 | | | 9.219 | |
| 8.607 | | 8.9748 | | 7.9331 | | 8.7828 | | 10.018 |
| 9.8472 | | 9.8724 | | 8.4782 | | 8.481 | | 8.4782 |
| 8.2135 | | 8.7828 | | 9.4901 | | 9.4315 | | 8.5842 |
| 8.6518 | | 8.5538 | | 9.0885 | | 8.9032 | | 8.4782 |
| 7.2484 | | 7.8585 | | | | 10.045 | | |
| 9.7047 | | 7.8585 | | | | 7.2484 | | |
| 7.8854 | | 10.045 | | | | 7.2484 | | |
| 7.2484 | | 9.7047 | | | | 7.8854 | | |
| | | | | 10.1186 | | | | |

| | | | | | | | |
|---|---|---|---|---|---|---|---|
| | | | 8.7075 | | | | RU484 + RU996 |
| 9.1633 | 8.0877 | 8.47 | 8.7004 | 7.7602 | 8.7615 | 8.5355 | RU242 + RU484 + RU996 |
| 9.6764 | 9.6836 | | 9.503 | | 10.022 | | RU484 + RU3 * 996 |
| | | | 9.219 | | | | RU3 * 996 |
| 10.018 | | | 10.115 | | | | RU484 + |
| 8.4782 | | | 9.1452 | | | | RU2 * 996 |
| 8.5842 | | | 8.7828 | | | | |
| 8.4782 | | | 8.7398 | | | | |
| | | | 10.045 | | | | RU2 * 996 |
| | | | 7.2484 | | | | |
| | | | 7.2484 | | | | |
| | | | 7.8854 | | | | |
| | | | 10.1186 | | | | RU4 * 996 |

6-6. There is a possible LTF4×320M sequence=[LTF4×$80M_{part1}$, LTF4×$80M_{part2}$, (−1)*LTF4×$80M_{part3}$, LTF4×$80M_{part4}$, (−1)*LTF4×$80M_{part5}$, $0_{23}$, LTF4×$80M_{part1}$, (−1)*LTF4×$80M_{part2}$, (−1)*LTF4×$80M_{part3}$, (−1)*LTF4×$80M_{part4}$, (−1)*LTF4×$80M_{part5}$, $0_{23}$, (−1)*LTF4×$80M_{part1}$, (−1)*LTF4×$80M_{part2}$, (−1)*LTF4×$80M_{part3}$, LTF4×$80M_{part4}$, (−1)*LTF4×$80M_{part5}$, $0_{23}$, (−1)*LTF4×$80M_{part1}$, LTF4×$80M_{part2}$, (−1)*LTF4×$80M_{part3}$, (−1)*LTF4×$80M_{part4}$, (−1)*LTF4×$80M_{part5}$]. LTF4×80 $MHz_{Part1}$, LTF4×80 $MHz_{part2}$, LTF4×80 $MHz_{part3}$, LTF4×80 $MHz_{part4}$, and LTF4×80 $MHz_{part5}$ are sequences obtained by dividing an 80 MHz 4×LTF sequence based on sizes of 5 parts of an 80 MHz 2×LTF sequence in the 802.11ax standard. LTF4×80 MHz is an 80 MHz 4×LTF sequence in the 802.11ax standard. For specific sequences, refer to the 802.11ax standard.

Specifically, the sequence has the following PAPR values on RUs (a plurality of RU combinations or single RUs) in the 1st 80 MHz to the 4th 80 MHz.

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | 6.6954 | | |
| | | | | 5.4964 | | | | | | 6.6944 | | |
| | | | | | | 6.2644 | | | | | | |
| | | | | | | 8.3334 | | | | | | |
| | | | | 6.2945 | | | | | | 6.8965 | | |
| | | | | 6.2888 | | | | | | 7.4722 | | |
| | | | | 8.1536 | | | | | | 7.4131 | | |

-continued

| | | | | | | | | | | | |
|---|---|---|---|---|---|---|---|---|---|---|---|
| 6.977 | 6.1076 | 7.2882 | 6.3562 | 6.5383 | 6.654 | 5.2847 | 6.0963 | 5.6995 | 6.5421 | 6.8536 | 5.2847 |
| | 8.476 | | 7.379 | | 7.3888 | | 7.0082 | | | | 7.807 |
| | | 6.4813 | | | | 7.2059 | | | | | 5.8427 |
| | | 6.6944 | | | | | | 6.7514 | | | |
| | | 6.2644 | | | | | | 7.5709 | | | |
| | | | | | | 8.3334 | | | | | |
| | | 6.8965 | | | | | | 6.5092 | | | |
| | | 7.4722 | | | | | | 7.1131 | | | |
| | | 7.4131 | | | | | | 8.3688 | | | |
| 6.8009 | 5.6995 | 3.7821 | 3.7821 | 3.7821 | 3.7821 | 3.7821 | 3.7821 | 3.7821 | 3.7821 | 3.7821 | RU26 |
| 6.9222 | | 4.967 | | 4.4366 | | | 4.967 | | 4.4366 | | RU52 |
| 5.8427 | | | 5.4754 | | | | | 5.4977 | | | RU106 |
| 6.7514 | | | | | | 5.5275 | | | | | RU242 |
| | | | | | 7.5709 | | | | | | RU484 |
| | | | | | 8.3334 | | | | | | RU996 |
| 6.5092 | | | | | | 6.4576 | | | | | RU26 + RU52 |
| 7.1131 | | | | | | 6.1879 | | | | | RU26 + RU106 |
| 8.3688 | | | | | | 7.9202 | | | | | RU242 + RU484 |

Table for the RUs in the $2^{nd}$ 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | 6.6954 | | |
| | | | | 5.4964 | | | | | | 7.08 | | |
| | | | | | | 6.5676 | | | | | | |
| | | | | | | 8.5171 | | | | | | |
| | | | | 6.2945 | | | | | | 6.8965 | | |
| | | | | 6.2888 | | | | | | 7.4227 | | |
| | | | | 8.7348 | | | | | | 8.5181 | | |
| 6.977 | 6.1076 | 7.2882 | 6.3562 | 6.4568 | 6.0199 | 5.2847 | 6.0963 | 5.6995 | 6.5421 | 6.8536 | 5.2847 | |
| | 8.476 | | 7.4108 | | 7.4968 | | 7.0082 | | | | 7.807 | |
| | | 6.4197 | | | | 6.5108 | | | | | 5.8427 | |
| | | 7.08 | | | | | | 6.9765 | | | | |
| | | 6.5676 | | | | | | 7.4039 | | | | |
| | | | | | | 8.5171 | | | | | | |
| | | 6.8965 | | | | | | 6.5092 | | | | |
| | | 7.4227 | | | | | | 6.9053 | | | | |
| | | 8.5181 | | | | | | 8.785 | | | | |
| 6.8009 | 5.6995 | 3.7821 | 3.7821 | 3.7821 | 3.7821 | 3.7821 | 3.7821 | 3.7821 | 3.7821 | 3.7821 | RU26 | |
| 6.9222 | | 4.967 | | 4.4366 | | | 4.967 | | 4.4366 | | RU52 | |
| 5.8427 | | | 5.4754 | | | | | 5.4977 | | | RU106 | |
| 6.9765 | | | | | | 5.5275 | | | | | RU242 | |
| | | | | | 7.4039 | | | | | | RU484 | |
| | | | | | 8.5171 | | | | | | RU996 | |
| 6.5092 | | | | | | 6.4576 | | | | | RU26 + RU52 | |
| 6.9053 | | | | | | 6.1879 | | | | | RU26 + RU106 | |
| 8.785 | | | | | | 8.2684 | | | | | RU242 + RU484 | |

Table for the RUs in the $3^{rd}$ 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | 6.6954 | | |
| | | | | 5.4964 | | | | | | 7.08 | | |
| | | | | | | 6.1862 | | | | | | |
| | | | | | | 8.5169 | | | | | | |
| | | | | 6.2945 | | | | | | 6.8965 | | |
| | | | | 6.2888 | | | | | | 7.4227 | | |
| | | | | 8.3704 | | | | | | 8.6496 | | |
| 6.977 | 6.1076 | 7.2882 | 6.3562 | 6.4568 | 6.654 | 5.2847 | 6.0963 | 5.6995 | 6.5421 | 6.8536 | 5.2847 | |
| | 8.476 | | 7.4108 | | 7.3888 | | 7.0082 | | | | 7.807 | |
| | | 6.4197 | | | | 7.2059 | | | | | 5.8427 | |
| | | 7.08 | | | | | | 6.7514 | | | | |
| | | 6.1862 | | | | | | 7.5709 | | | | |
| | | | | | | 8.5169 | | | | | | |
| | | 6.8965 | | | | | | 6.5092 | | | | |

-continued

| | | | | | | | | | | | | |
|---|---|---|---|---|---|---|---|---|---|---|---|---|
| | | 7.4227 | | | | | | 7.1131 | | | | |
| | | 8.6496 | | | | | | 8.1399 | | | | |
| 6.8009 | 5.6995 | 3.7821 | 3.7821 | 3.7821 | 3.7821 | 3.7821 | 3.7821 | 3.7821 | 3.7821 | 3.7821 | | RU26 |
| 6.9222 | | 4.967 | | 4.4366 | | | 4.967 | | 4.4366 | | | RU52 |
| 5.8427 | | | 5.4754 | | | | | 5.4977 | | | | RU106 |
| 6.7514 | | | | | | 5.5275 | | | | | | RU242 |
| | | | | | 7.5709 | | | | | | | RU484 |
| | | | | | 8.5169 | | | | | | | RU996 |
| 6.5092 | | | | | | 6.4576 | | | | | | RU26 + RU52 |
| 7.1131 | | | | | | 6.1879 | | | | | | RU26 + RU106 |
| 8.1399 | | | | | | 7.9065 | | | | | | RU242 + RU484 |

Table for the RUs in the 4th 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | 6.6954 | | |
| | | | | 5.4964 | | | | | | 6.6944 | | |
| | | | | | | 6.9069 | | | | | | |
| | | | | | | 8.0086 | | | | | | |
| | | | | 6.2945 | | | | | | 6.8965 | | |
| | | | | 6.2888 | | | | | | 7.4722 | | |
| | | | | 8.1123 | | | | | | 7.4883 | | |
| 6.977 | 6.1076 | 7.2882 | 6.3562 | 6.5383 | 6.0199 | 5.2847 | 6.0963 | 5.6995 | 6.5421 | 6.8536 | 5.2847 | |
| | 8.476 | | 7.379 | | 7.4968 | | 7.0082 | | | | 7.807 | |
| | | 6.4813 | | | | 6.5108 | | | | | 5.8427 | |
| | | 6.6944 | | | | | | 6.9765 | | | | |
| | | 6.9069 | | | | | | 7.4039 | | | | |
| | | | | | | 8.0086 | | | | | | |
| | | 6.8965 | | | | | | 6.5092 | | | | |
| | | 7.4722 | | | | | | 6.9053 | | | | |
| | | 7.4883 | | | | | | 8.0242 | | | | |
| 6.8009 | 5.6995 | 3.7821 | 3.7821 | 3.7821 | 3.7821 | 3.7821 | 3.7821 | 3.7821 | 3.7821 | 3.7821 | | RU26 |
| 6.9222 | | 4.967 | | 4.4366 | | | 4.967 | | 4.4366 | | | RU52 |
| 5.8427 | | | 5.4754 | | | | | 5.4977 | | | | RU106 |
| 6.9765 | | | | | | 5.5275 | | | | | | RU242 |
| | | | | | 7.4039 | | | | | | | RU484 |
| | | | | | 8.0086 | | | | | | | RU996 |
| 6.5092 | | | | | | 6.4576 | | | | | | RU26 + RU52 |
| 6.9053 | | | | | | 6.1879 | | | | | | RU26 + RU106 |
| 8.0242 | | | | | | 8.3487 | | | | | | RU242 + RU484 |

The sequence has the following PAPR values on other RUs in more than 80 MHz (namely, RU combinations) in table B.

| | | | | | | | | |
|---|---|---|---|---|---|---|---|---|
| 7.9329 | 7.6345 | 8.2269 | 7.7507 | 8.2088 | 8.4952 | 8.6549 | 8.5393 | RU484 + RU996 |
| | 7.7403 | | | | 7.7969 | | | RU2 * 996 |
| 8.6035 | 8.2819 | 8.4465 | 8.2064 | 8.6804 | 8.2562 | 8.5683 | 8.6322 | RU484 + RU3 * 996 |
| 8.3255 | 8.5372 | 8.7724 | | | 7.8741 | | | RU3 * 996 |
| | | | 7.9921 | | | | | RU4 * 996 |

6-7. There is a possible LTF4×320M sequence=[LTF4×80M$_{part1}$, LTF4×80M$_{part2}$, (−1)*LTF4×80M$_{part3}$, LTF4×80M$_{part4}$, (−1)*LTF4×80M$_{part5}$, $0_{23}$, (−1)*LTF4×80M$_{part1}$, LTF4×80M$_{part2}$, (−1)*LTF4×80M$_{part3}$, (−1)*LTF4×80M$_{part4}$, (−1)*LTF4×80M$_{part5}$, $0_{23}$, (−1)*LTF4×80M$_{part1}$, (−1)*LTF4×80M$_{part2}$, (−1)*LTF4×80M$_{part3}$, LTF4×80M$_{part4}$, (−1)*LTF4×80M$_{part5}$, $0_{23}$, (−1)*LTF4×80M$_{part1}$, LTF4×80M$_{part2}$, LTF4×80M$_{part3}$, LTF4×80M$_{part4}$, LTF4×80M$_{part5}$]. LTF4×80 MHz$_{part1}$, LTF4×80 MHz$_{part2}$, LTF4×80 MHz$_{part3}$, LTF4×80 MHz$_{part4}$, and LTF4×80 MHz$_{part5}$ are sequences obtained by dividing an 80 MHz 4×LTF sequence based on sizes of 5 parts of an 80 MHz 2×LTF sequence in the 802.11ax standard. LTF4×80 MHz is an 80 MHz 4×LTF sequence in the 802.11ax standard. For specific sequences, refer to the 802.11ax standard.

Specifically, the sequence has the following PAPR values on RUs (a plurality of RU combinations or single RUs) in the 1st 80 MHz to the 4th 80 MHz.

Table for the RUs in the 1st 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | 6.6954 | | |
| | | | | 5.4964 | | | | | | 6.6944 | | |
| | | | | | | 6.2644 | | | | | | |
| | | | | | | 8.3334 | | | | | | |
| | | | | 6.2945 | | | | | | 6.8965 | | |
| | | | | 6.2888 | | | | | | 7.4722 | | |
| | | | | 8.1536 | | | | | | 7.4131 | | |
| 6.977 | 6.1076 | 7.2882 | 6.3562 | 6.5383 | 6.654 | 5.2847 | 6.0963 | 5.6995 | 6.5421 | 6.8536 | | 5.2847 |
| | 8.476 | | 7.379 | | 7.3888 | | 7.0082 | | | | 7.807 | |
| | | 6.4813 | | | | 7.2059 | | | | | 5.8427 | |
| | | 6.6944 | | | | | | 6.7514 | | | | |
| | | 6.2644 | | | | | | 7.5709 | | | | |
| | | | | | | 8.3334 | | | | | | |
| | | 6.8965 | | | | | | 6.5092 | | | | |
| | | 7.4722 | | | | | | 7.1131 | | | | |
| | | 7.4131 | | | | | | 8.3688 | | | | |
| 6.8009 | 5.6995 | 3.7821 | 3.7821 | 3.7821 | 3.7821 | 3.7821 | 3.7821 | 3.7821 | 3.7821 | 3.7821 | | RU26 |
| 6.9222 | | 4.967 | | 4.4366 | | | 4.967 | | 4.4366 | | | RU52 |
| 5.8427 | | | 5.4754 | | | | | 5.4977 | | | | RU106 |
| 6.7514 | | | | | | 5.5275 | | | | | | RU242 |
| | | | | | 7.5709 | | | | | | | RU484 |
| | | | | | 8.3334 | | | | | | | RU996 |
| 6.5092 | | | | | | 6.4576 | | | | | | RU26 + RU52 |
| 7.1131 | | | | | | 6.1879 | | | | | | RU26 + RU106 |
| 8.3688 | | | | | | 7.9202 | | | | | | RU242 + RU484 |

Table for the RUs in the 2nd 80 MHz:

| | | | | | | | | | | | | |
|---|---|---|---|---|---|---|---|---|---|---|---|---|
| 3.7821 | 3.7821 | 3.7821 | 3.7821 | 3.7821 | 3.7821 | 3.7821 | 3.7821 | 3.7821 | 6.1076 | 5.9599 | 6.3562 | 5.2847 |
| 4.967 | | 4.4366 | | | 4.967 | | 4.4366 | | 6.7962 | | 7.145 | |
| | 5.3767 | | | | | 5.351 | | | | 6.6954 | | |
| | | | | 5.4964 | | | | | | 6.6944 | | |
| | | | | | | 6.9069 | | | | | | |
| | | | | | | 8.0086 | | | | | | |
| | | | | 6.2945 | | | | | | 6.8965 | | |
| | | | | 6.2888 | | | | | | 7.4722 | | |
| | | | | 8.1123 | | | | | | 7.4883 | | |
| 6.977 | 6.1076 | 7.2882 | 6.3562 | 6.4568 | 6.0199 | 5.2847 | 6.0963 | 5.6995 | 6.5421 | 6.8536 | | 5.2847 |
| | 8.476 | | 7.379 | | 7.4968 | | 7.0082 | | | | 7.807 | |
| | | 6.4813 | | | | 6.5108 | | | | | 5.8427 | |
| | | 6.6944 | | | | | | 6.9765 | | | | |
| | | 6.9069 | | | | | | 7.4039 | | | | |
| | | | | | | 8.0086 | | | | | | |
| | | 6.8965 | | | | | | 6.5092 | | | | |
| | | 7.4722 | | | | | | 6.9053 | | | | |
| | | 7.4883 | | | | | | 8.0242 | | | | |

-continued

| | | | | | | | | | | | | | | | | | | | | | | | |
|---|---|---|---|---|---|---|---|---|---|---|---|---|---|---|---|---|---|---|---|---|---|---|---|
| 6.8009 | | 5.6995 | | 3.7821 | | 3.7821 | | 3.7821 | | 3.7821 | | 3.7821 | | 3.7821 | | 3.7821 | | 3.7821 | | 3.7821 | | | RU26 |
| | 6.9222 | | | | 4.967 | | | | 4.4366 | | | | | | 4.967 | | | | 4.4366 | | | | RU52 |
| | 5.8427 | | | | | | 5.4754 | | | | | | | | | | 5.4977 | | | | | | RU106 |
| | 6.9765 | | | | | | | | | | | 5.5275 | | | | | | | | | | | RU242 |
| | | | | | | | | | | 7.4039 | | | | | | | | | | | | | RU484 |
| | | | | | | | | | | 8.0086 | | | | | | | | | | | | | RU996 |
| | 6.5092 | | | | | | | | | | | 6.4576 | | | | | | | | | | | RU26 + RU52 |
| | 6.9053 | | | | | | | | | | | 6.1879 | | | | | | | | | | | RU26 + RU106 |
| | 8.0242 | | | | | | | | | | | 8.3487 | | | | | | | | | | | RU242 + RU484 |

Table for the RUs in the $3^{rd}$ 80 MHz:

| | | | | | | | | | | | | | | | | | | | | | | | | |
|---|---|---|---|---|---|---|---|---|---|---|---|---|---|---|---|---|---|---|---|---|---|---|---|---|
| 3.7821 | | 3.7821 | | 3.7821 | | 3.7821 | | 3.7821 | | 3.7821 | | 3.7821 | | 3.7821 | | 3.7821 | | 6.1076 | | 5.9599 | | 6.3562 | | 5.2847 |
| | 4.967 | | | | 4.4366 | | | | | | 4.967 | | | | 4.4366 | | | | 6.7962 | | | | 7.145 | |
| | | | 5.3767 | | | | | | | | | | 5.351 | | | | | | | | 6.6954 | | | |
| | | | | | | | | 5.4964 | | | | | | | | | | | | | 7.08 | | | |
| | | | | | | | | | | | | 6.1862 | | | | | | | | | | | | |
| | | | | | | | | | | | | 8.5169 | | | | | | | | | | | | |
| | | | | | | | | 6.2945 | | | | | | | | | | | | | 6.8965 | | | |
| | | | | | | | | 6.2888 | | | | | | | | | | | | | 7.4227 | | | |
| | | | | | | | | 8.3704 | | | | | | | | | | | | | 8.6496 | | | |
| 6.977 | | 6.1076 | | 7.2882 | | 6.3562 | | 6.4568 | | 6.654 | | 5.2847 | | 6.0963 | | 5.6995 | | 6.5421 | | 6.8536 | | | 5.2847 | |
| | | | 8.476 | | | | 7.4108 | | | | 7.3888 | | | | 7.0082 | | | | | | | 7.807 | | |
| | | | | | 6.4197 | | | | | | | | 7.2059 | | | | | | | | | 5.8427 | | |
| | | | | 7.08 | | | | | | | | | | | | | 6.7514 | | | | | | | |
| | | | | 6.1862 | | | | | | | | | | | | | 7.5709 | | | | | | | |
| | | | | | | | | | | | | 8.5169 | | | | | | | | | | | | |
| | | | | 6.8965 | | | | | | | | | | | | | 6.5092 | | | | | | | |
| | | | | 7.4227 | | | | | | | | | | | | | 7.1131 | | | | | | | |
| | | | | 8.6496 | | | | | | | | | | | | | 8.1399 | | | | | | | |
| 6.8009 | | 5.6995 | | 3.7821 | | 3.7821 | | 3.7821 | | 3.7821 | | 3.7821 | | 3.7821 | | 3.7821 | | 3.7821 | | 3.7821 | | | RU26 | |
| | 6.9222 | | | | 4.967 | | | | 4.4366 | | | | | | 4.967 | | | | 4.4366 | | | | RU52 | |
| | 5.8427 | | | | | | 5.4754 | | | | | | | | | | 5.4977 | | | | | | RU106 | |
| | 6.7514 | | | | | | | | | | | 5.5275 | | | | | | | | | | | RU242 | |
| | | | | | | | | | | 7.5709 | | | | | | | | | | | | | RU484 | |
| | | | | | | | | | | 8.5169 | | | | | | | | | | | | | RU996 | |
| | 6.5092 | | | | | | | | | | | 6.4576 | | | | | | | | | | | RU26 + RU52 | |
| | 7.1131 | | | | | | | | | | | 6.1879 | | | | | | | | | | | RU26 + RU106 | |
| | 8.1399 | | | | | | | | | | | 7.9065 | | | | | | | | | | | RU242 + RU484 | |

Table for the RUs in the $4^{th}$ 80 MHz:

| | | | | | | | | | | | | | | | | | | | | | | | | |
|---|---|---|---|---|---|---|---|---|---|---|---|---|---|---|---|---|---|---|---|---|---|---|---|---|
| 3.7821 | | 3.7821 | | 3.7821 | | 3.7821 | | 3.7821 | | 3.7821 | | 3.7821 | | 3.7821 | | 3.7821 | | 6.1076 | | 5.9599 | | 6.3562 | | 5.2847 |
| | 4.967 | | | | 4.4366 | | | | | | 4.967 | | | | 4.4366 | | | | 6.7962 | | | | 7.145 | |
| | | | 5.3767 | | | | | | | | | | 5.351 | | | | | | | | 6.6954 | | | |
| | | | | | | | | 5.4964 | | | | | | | | | | | | | 7.08 | | | |
| | | | | | | | | | | | | 6.5676 | | | | | | | | | | | | |
| | | | | | | | | | | | | 8.5171 | | | | | | | | | | | | |
| | | | | | | | | 6.2945 | | | | | | | | | | | | | 6.8965 | | | |
| | | | | | | | | 6.2888 | | | | | | | | | | | | | 7.4227 | | | |
| | | | | | | | | 8.7348 | | | | | | | | | | | | | 8.5181 | | | |
| 6.977 | | 6.1076 | | 7.2882 | | 6.3562 | | 6.4568 | | 6.0199 | | 5.2847 | | 6.0963 | | 5.6995 | | 6.5421 | | 6.8536 | | | 5.2847 | |
| | | | 8.476 | | | | 7.4108 | | | | 7.4968 | | | | 7.0082 | | | | | | | 7.807 | | |
| | | | | | 6.4197 | | | | | | | | 6.5108 | | | | | | | | | 5.8427 | | |
| | | | | 7.08 | | | | | | | | | | | | | 6.9765 | | | | | | | |
| | | | | 6.5676 | | | | | | | | | | | | | 7.4039 | | | | | | | |
| | | | | | | | | | | | | 8.5171 | | | | | | | | | | | | |
| | | | | 6.8965 | | | | | | | | | | | | | 6.5092 | | | | | | | |
| | | | | 7.4227 | | | | | | | | | | | | | 6.9053 | | | | | | | |
| | | | | 8.5181 | | | | | | | | | | | | | 8.785 | | | | | | | |

-continued

| | | | | | | | | | | | |
|---|---|---|---|---|---|---|---|---|---|---|---|
| 6.8009 | 5.6995 | 3.7821 | 3.7821 | 3.7821 | 3.7821 | 3.7821 | 3.7821 | 3.7821 | 3.7821 | 3.7821 | RU26 |
| 6.9222 | | 4.967 | | 4.4366 | | | 4.967 | | 4.4366 | | RU52 |
| 5.8427 | | | 5.4754 | | | | | 5.4977 | | | RU106 |
| 6.9765 | | | | | | 5.5275 | | | | | RU242 |
| | | | | | 7.4039 | | | | | | RU484 |
| | | | | | 8.5171 | | | | | | RU996 |
| 6.5092 | | | | | | 6.4576 | | | | | RU26 + RU52 |
| 6.9053 | | | | | | 6.1879 | | | | | RU26 + RU106 |
| 8.785 | | | | | | 8.2684 | | | | | RU242 + RU484 |

The sequence has the following PAPR values on other RUs in more than 80 MHz (namely, RU combinations) in table B.

| | | | | | | | | |
|---|---|---|---|---|---|---|---|---|
| 8.9343 | 8.6465 | 8.5522 | 8.5916 | 9.1014 | 8.8633 | 8.7064 | 8.5212 | RU484 + RU3 * 996 |
| 8.1749 | 8.0833 | 7.6735 | | | 7.5209 | | | RU3 * 996 |
| 8.9955 | 9.1127 | 8.8001 | 9.0116 | 8.6311 | | 8.2547 | | RU484 + |
| 7.9955 | 8.1148 | 8.8918 | 9.1084 | 9.28 | | 9.3565 | | RU2 * 996 |
| 9.3434 | 8.9411 | 8.2429 | 8.4809 | 8.976 | | 9.3289 | | |
| 9.0578 | 8.7656 | 8.6615 | 8.6002 | 8.7009 | | 9.2907 | | |
| 8.033 | 7.8186 | | | 8.1121 | | | | RU2 * 996 |
| 7.8759 | 7.8186 | | | 8.6111 | | | | |
| 7.7247 | 8.1121 | | | 8.6111 | | | | |
| 8.033 | 7.8759 | | | 7.7247 | | | | |
| 8.2088 | 8.5858 | 8.2269 | 7.7352 | 8.5368 | 7.7126 | 8.1287 | 8.5686 | RU484 + RU996 |
| | | | 8.1534 | | | | | RU4 * 996 |

6-8. There is a possible LTF4×320M sequence=[LTF4×$80M_{part1}$, LTF4×$80M_{part2}$, (−1)*LTF4×$80M_{part3}$, LTF4×$80M_{part4}$, (−1)*LTF4×$80M_{part5}$, $0_{23}$, (−1)*LTF4×$80M_{part1}$, LTF4×$80M_{part2}$, (−1)*LTF4×$80M_{part3}$, (−1)*LTF4×$80M_{part4}$, (−1)*LTF4×$80M_{part5}$, $0_{23}$, (−1)*LTF4×$80M_{part1}$, (−1)*LTF4×$80M_{part2}$, (−1)*LTF4×$80M_{part3}$, LTF4×$80M_{part4}$, (−1)*LTF4×$80M_{part5}$, $0_{23}$, (−1)*LTF4×$80M_{part1}$, LTF4×$80M_{part2}$, LTF4×$80M_{part3}$, LTF4×$80M_{part4}$, LTF4×$80M_{part5}$]. LTF4×80 $MHz_{part1}$, LTF4×80 $MHz_{part2}$, LTF4×80 $MHz_{part3}$, LTF4×80 $MHz_{part4}$, and LTF4×80 $MHz_{part5}$ are sequences obtained by dividing an 80 MHz 4×LTF sequence based on sizes of 5 parts of an 80 MHz 2×LTF sequence in the 802.11ax standard. LTF4×80 MHz is an 80 MHz 4×LTF sequence in the 802.11ax standard. For specific sequences, refer to the 802.11ax standard.

Specifically, the sequence has the following PAPR values on RUs (a plurality of RU combinations or single RUs) in the $1^{st}$ 80 MHz to the 4th 80 MHz.

Table for the RUs in the $1^{st}$ 80 MHz:

| | | | | | | | | |
|---|---|---|---|---|---|---|---|---|
| 3.7821 | 3.7821 | 3.7821 | 3.7821 | 3.7821 | 3.7821 | 3.7821 | 3.7821 | 3.7821 |
| 4.967 | | 4.4366 | | | 4.967 | | 4.4366 | |
| | 5.3767 | | | | | 5.351 | | |
| | | | | 5.4964 | | | | |
| | | | | 6.2644 | | | | |
| | | | | 8.3334 | | | | |
| | | | | 6.2945 | | | | |
| | | | | 6.2888 | | | | |
| | | | | 8.1536 | | | | |

| | | | | | | | | |
|---|---|---|---|---|---|---|---|---|
| 6.1076 | 5.9599 | 6.3562 | 5.2847 | 6.977 | 6.1076 | 7.2882 | 6.3562 | 6.5383 |
| 6.7962 | | 7.145 | | | 8.476 | | 7.379 | |
| | 6.6954 | | | | | 6.4813 | | |
| | | | | 6.6944 | | | | |
| | | | | 6.2644 | | | | |
| | | | | 8.3334 | | | | |
| | | | | 6.8965 | | | | |
| | | | | 7.4722 | | | | |
| | | | | 7.4131 | | | | |

-continued

| | | | | | | | | | |
|---|---|---|---|---|---|---|---|---|---|
| 6.654 | 5.2847 | 6.0963 | 5.6995 | 6.5421 | 6.8536 | 5.2847 | 6.8009 | 5.6995 | |
| | 7.3888 | | 7.0082 | | | 7.807 | | 6.9222 | |
| | | 7.2059 | | | | | 5.8427 | | |
| | | | | 6.7514 | | | | | |
| | | | | 7.5709 | | | | | |
| | | | | 8.3334 | | | | | |
| | | | | 6.5092 | | | | | |
| | | | | 7.1131 | | | | | |
| | | | | 8.3688 | | | | | |
| 3.7821 | 3.7821 | 3.7821 | 3.7821 | 3.7821 | 3.7821 | 3.7821 | 3.7821 | 3.7821 | RU26 |
| | 4.967 | | 4.4366 | | | 4.967 | | 4.4366 | RU52 |
| | | 5.4754 | | | | 5.4977 | | | RU106 |
| | | | | 5.5275 | | | | | RU242 |
| | | | | 7.5709 | | | | | RU484 |
| | | | | 8.3334 | | | | | RU996 |
| | | | | 6.4576 | | | | | RU26 + RU52 |
| | | | | 6.1879 | | | | | RU26 + RU106 |
| | | | | 7.9202 | | | | | RU242 + RU484 |

Table for the RUs in the 2$^{nd}$ 80 MHz:

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | |
| | 4.967 | | 4.4366 | | | 4.967 | | 4.4366 | |
| | | 5.3767 | | | | | 5.351 | | |
| | | | | 5.4964 | | | | | |
| | | | | 6.9069 | | | | | |
| | | | | 8.0086 | | | | | |
| | | | | 6.2945 | | | | | |
| | | | | 6.2888 | | | | | |
| | | | | 8.1123 | | | | | |
| 6.1076 | 5.9599 | 6.3562 | 5.2847 | 6.977 | 6.1076 | 7.2882 | 6.3562 | 6.5383 | |
| | 6.7962 | | 7.145 | | | 8.476 | | 7.379 | |
| | | 6.6954 | | | | | 6.4813 | | |
| | | | | 6.6944 | | | | | |
| | | | | 6.9069 | | | | | |
| | | | | 8.0086 | | | | | |
| | | | | 6.8965 | | | | | |
| | | | | 7.4722 | | | | | |
| | | | | 7.4883 | | | | | |
| 6.0199 | 5.2847 | 6.0963 | 5.6995 | 6.5421 | 6.8536 | 5.2847 | 6.8009 | 5.6995 | |
| | 7.4968 | | 7.0082 | | | 7.807 | | 6.9222 | |
| | | 6.5108 | | | | | 5.8427 | | |
| | | | | 6.9765 | | | | | |
| | | | | 7.4039 | | | | | |
| | | | | 8.0086 | | | | | |
| | | | | 6.5092 | | | | | |
| | | | | 6.9053 | | | | | |
| | | | | 8.0242 | | | | | |
| 3.7821 | 3.7821 | 3.7821 | 3.7821 | 3.7821 | 3.7821 | 3.7821 | 3.7821 | 3.7821 | RU26 |
| | 4.967 | | 4.4366 | | | 4.967 | | 4.4366 | RU52 |
| | | 5.4754 | | | | 5.4977 | | | RU106 |
| | | | | 5.5275 | | | | | RU242 |
| | | | | 7.4039 | | | | | RU484 |
| | | | | 8.0086 | | | | | RU996 |
| | | | | 6.4576 | | | | | RU26 + RU52 |
| | | | | 6.1879 | | | | | RU26 + RU106 |
| | | | | 8.3487 | | | | | RU242 + RU484 |

Table for the RUs in the 3rd 80 MHz:

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | |
| | 4.967 | | 4.4366 | | | 4.967 | | 4.4366 | |
| | | 5.3767 | | | | | 5.351 | | |
| | | | | 5.4964 | | | | | |
| | | | | 6.1862 | | | | | |
| | | | | 8.5169 | | | | | |
| | | | | 6.2945 | | | | | |
| | | | | 6.2888 | | | | | |
| | | | | 8.3704 | | | | | |
| 3.1076 | 5.9599 | 6.3562 | 5.2847 | 6.977 | 6.1076 | 7.2882 | 6.3562 | 6.5383 | |
| | 6.7962 | | 7.145 | | | 8.476 | | 7.4108 | |
| | | 6.6954 | | | | | 6.4197 | | |
| | | | | 7.08 | | | | | |
| | | | | 6.1862 | | | | | |
| | | | | 8.5169 | | | | | |
| | | | | 6.8965 | | | | | |
| | | | | 7.4227 | | | | | |
| | | | | 8.6496 | | | | | |
| 6.654 | 5.2947 | 6.0963 | 5.6995 | 6.5421 | 6.8536 | 5.2847 | 6.8009 | 5.6995 | |
| | 7.3888 | | 7.0082 | | | 7.807 | | 6.9222 | |
| | | 7.2059 | | | | | 5.8427 | | |
| | | | | 6.7514 | | | | | |
| | | | | 7.5709 | | | | | |
| | | | | 8.5169 | | | | | |
| | | | | 6.5092 | | | | | |
| | | | | 7.1131 | | | | | |
| | | | | 8.1399 | | | | | |
| 3.7821 | 3.7821 | 3.7821 | 3.7821 | 3.7821 | 3.7821 | 3.7821 | 3.7821 | 3.7821 | RU26 |
| | 4.967 | | 4.4366 | | | 4.967 | | 4.4366 | RU52 |
| | | 5.4754 | | | | | 5.4977 | | RU106 |
| | | | | 5.5275 | | | | | RU242 |
| | | | | 7.5709 | | | | | RU484 |
| | | | | 8.5169 | | | | | RU996 |
| | | | | 6.4576 | | | | | RU26 + RU52 |
| | | | | 6.1879 | | | | | RU26 + RU106 |
| | | | | 7.9065 | | | | | RU242 + RU484 |

Table for the RUs in the 4th 80 MHz:

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | |
| | 4.967 | | 4.4366 | | | 4.967 | | 4.4366 | |
| | | 5.3767 | | | | | 5.351 | | |
| | | | | 5.4964 | | | | | |
| | | | | 6.5676 | | | | | |
| | | | | 8.5171 | | | | | |
| | | | | 6.2945 | | | | | |
| | | | | 6.2888 | | | | | |
| | | | | 8.7348 | | | | | |
| 6.1076 | 5.9599 | 6.3562 | 5.2847 | 6.977 | 6.1076 | 7.2882 | 6.3562 | 6.4568 | |
| | 6.7962 | | 7.145 | | | 8.476 | | 7.4108 | |
| | | 6.6954 | | | | | 6.4197 | | |
| | | | | 7.08 | | | | | |
| | | | | 6.5676 | | | | | |
| | | | | 8.5171 | | | | | |
| | | | | 6.8965 | | | | | |
| | | | | 7.4227 | | | | | |
| | | | | 8.5181 | | | | | |
| 6.0199 | 5.2847 | 6.0963 | 5.6995 | 6.5421 | 6.8536 | 5.2847 | 6.8009 | 5.6995 | |
| | 7.4968 | | 7.0082 | | | 7.807 | | 6.9222 | |
| | | 6.5108 | | | | | 5.8427 | | |
| | | | | 6.9765 | | | | | |
| | | | | 7.4039 | | | | | |
| | | | | 8.5171 | | | | | |
| | | | | 6.5092 | | | | | |
| | | | | 6.9053 | | | | | |
| | | | | 8.785 | | | | | |
| 3.7821 | 3.7821 | 3.7821 | 3.7821 | 3.7821 | 3.7821 | 3.7821 | 3.7821 | 3.7821 | RU26 |
| | 4.967 | | 4.4366 | | | 4.967 | | 4.4366 | RU52 |
| | | 5.4754 | | | | | 5.4977 | | RU106 |
| | | | | 5.5275 | | | | | RU242 |

-continued

| | |
|---|---|
| 7.4039 | RU484 |
| 8.5171 | RU996 |
| 6.4576 | RU26 + RU52 |
| 6.1879 | RU26 + RU106 |
| 8.2684 | RU242 + RU484 |

The sequence has the following PAPR values on other RUs in more than 80 MHz (namely, RU combinations) in table B.

| | | | | | | | | |
|---|---|---|---|---|---|---|---|---|
| 8.9343 | 8.6465 | 8.5522 | 8.5916 | 9.1014 | 8.8633 | 8.7064 | 8.5212 | RU484 + RU3 * 996 |
| 8.1749 | 8.0833 | 7.6735 | | | 7.5209 | | | RU3 * 996 |
| 8.9955 | 9.1127 | 8.8001 | 9.0116 | 8.6311 | 8.2547 | | | RU484 + RU2 * 996 |
| 7.9955 | 8.1148 | 8.8918 | 9.1084 | 9.28 | 9.3565 | | | |
| 9.3434 | 8.9411 | 8.2429 | 8.4809 | 8.976 | 9.3289 | | | |
| 9.0578 | 8.7656 | 8.6615 | 8.6002 | 8.7009 | 9.2907 | | | |
| | 8.6111 | | | | | 8.033 | | RU2 * 996 |
| 8.2088 | 8.5858 | 8.2269 | 7.7352 | 8.5368 | 7.7126 | 8.1287 | 8.5686 | RU484 + RU996 |
| | | | | 8.1534 | | | | RU4 * 996 |

6-9. There is a possible LTF4×320M sequence=[LTF4×80M$_{part1}$, (−1)*LTF4×80M$_{part2}$, 0, LTF4×80M$_{part3}$, LTF4×80M$_{part4}$, $0_{23}$, LTF4×80M$_{part1}$, LTF4×80M$_{part2}$, 0, (−1)*LTF4×80M$_{part3}$, LTF4×80M$_{part4}$, $0_{23}$, LTF4×80M$_{part1}$, (−1)*LTF4×80M$_{part2}$, 0, (−1)*LTF4×80M$_{part3}$, (−1)*LTF4×80M$_{part4}$, $0_{23}$, (−1)*LTF4×80M$_{part1}$, (−1)*LTF4×80M$_{part2}$, 0, (−1)*LTF4×80M$_{part3}$, LTF4×80M$_{part4}$].

LTF4×80 MHz$_{part1}$, LTF4×80 MHz$_{part2}$, LTF4×80 MHz$_{part3}$, and LTF4×80 MHz$_{part4}$ are sequences obtained by dividing an 80 MHz 4×LTF sequence in the 802.11ax standard based on the following four parts. The 80 MHz 4×HE-LTF sequence covers subcarrier index −500 to subcarrier index 500. A quantity of sequence elements is 1001. Therefore, if there are four parts, LTF4×80$_{_part1}$ is the first 250 values, that is, the 1$^{st}$ sequence element value to the 250$^{th}$ sequence value, and so on. Specifically, for example, LTF4×80$_{part1}$=LTF4×80 MHz (1:250).

LTF4×80$_{part2}$=LTF4×80 MHz (251:500);

LTF4×80$_{part3}$=LTF4×80 MHz (502:751); and

LTF4×80$_{part4}$=LTF4×80 MHz (752:1001).

Specifically, the sequence has the following PAPR values on RUs (a plurality of RU combinations or single RUs) in the 1$^{st}$ 80 MHz to the 4th 80 MHz.

Table for the RUs in the 1$^{st}$ 80 MHz:

| | | | | | | | | |
|---|---|---|---|---|---|---|---|---|
| 3.7821 | 3.7821 | 3.7821 | 3.7821 | 3.7821 | 3.7821 | 3.7821 | 3.7821 | 3.7821 |
| | 4.9670 | | 4.4366 | | | 4.9670 | | 4.4366 |
| | | 5.3767 | | | | | 5.3510 | |
| | | | | 5.4964 | | | | |
| | | | | 6.4132 | | | | |
| | | | | 8.1142 | | | | |
| | | | | 6.2945 | | | | |
| | | | | 6.2888 | | | | |
| | | | | 8.1123 | | | | |
| 6.2370 | 5.9599 | 6.3562 | 5.2847 | 6.9770 | 6.1076 | 7.2882 | 6.3562 | 6.4568 |
| | 7.7644 | | 7.1450 | | | 8.4760 | | 7.4108 |
| | | 7.5411 | | | | | 6.4197 | |
| | | | | 7.6904 | | | | |
| | | | | 6.4132 | | | | |
| | | | | 8.1142 | | | | |
| | | | | 6.8965 | | | | |
| | | | | 7.4227 | | | | |
| | | | | 8.0497 | | | | |
| 6.0199 | 5.2847 | 6.0963 | 5.6995 | 6.5421 | 6.8536 | 5.2847 | 6.8009 | 5.6995 |
| | 7.4968 | | 7.0082 | | | 7.8070 | | 6.9222 |
| | | 6.5108 | | | | | 5.8427 | |
| | | | | 6.9765 | | | | |
| | | | | 7.4039 | | | | |
| | | | | 8.1142 | | | | |
| | | | | 6.5092 | | | | |
| | | | | 6.9053 | | | | |
| | | | | 7.6733 | | | | |

-continued

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | RU26 |
| 4.9670 | | 4.4366 | | | 4.9670 | | 4.4366 | | RU52 |
| | | 5.4754 | | | | 5.4977 | | | RU106 |
| | | | | 5.5275 | | | | | RU242 |
| | | | | 7.4039 | | | | | RU484 |
| | | | | 8.1142 | | | | | RU996 |
| | | | | 6.4576 | | | | | RU26 + RU52 |
| | | | | 6.1879 | | | | | RU26 + RU106 |
| | | | | 8.0989 | | | | | RU242 + RU484 |

Table for the RUs in the 2nd 80 MHz:

| | | | | | | | | |
|---|---|---|---|---|---|---|---|---|
| 3.7821 | 3.7821 | 3.7821 | 3.7821 | 3.7821 | 3.7821 | 3.7821 | 3.7821 | 3.7821 |
| 4.9670 | | 4.4366 | | | 4.9670 | | 4.4366 | |
| | 5.3767 | | | | | 5.3510 | | |
| | | | | 5.4964 | | | | |
| | | | | 6.1862 | | | | |
| | | | | 8.4077 | | | | |
| | | | | 6.2945 | | | | |
| | | | | 6.2888 | | | | |
| | | | | 8.6352 | | | | |

| | | | | | | | | |
|---|---|---|---|---|---|---|---|---|
| 6.1076 | 5.9599 | 6.3562 | 5.2847 | 6.9770 | 6.1076 | 7.2882 | 6.3562 | 6.4568 |
| 6.7962 | | 7.1450 | | | 8.4760 | | 7.4108 | |
| | 6.6954 | | | | | 6.4197 | | |
| | | | | 7.0800 | | | | |
| | | | | 6.1862 | | | | |
| | | | | 8.4077 | | | | |
| | | | | 6.8965 | | | | |
| | | | | 7.4227 | | | | |
| | | | | 8.9651 | | | | |

| | | | | | | | | |
|---|---|---|---|---|---|---|---|---|
| 6.0199 | 5.2847 | 6.0963 | 5.6995 | 6.5421 | 6.8536 | 5.2847 | 6.8009 | 6.7748 |
| 7.4968 | | 7.0082 | | | 7.8070 | | 7.8023 | |
| | 6.5108 | | | | | 6.1323 | | |
| | | | | 7.8327 | | | | |
| | | | | 7.4646 | | | | |
| | | | | 8.4077 | | | | |
| | | | | 6.5092 | | | | |
| | | | | 6.9053 | | | | |
| | | | | 8.7310 | | | | |

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | RU26 |
| 4.9670 | | 4.4366 | | | 4.9670 | | 4.4366 | | RU52 |
| | | 5.4754 | | | | 5.4977 | | | RU106 |
| | | | | 5.5275 | | | | | RU242 |
| | | | | 7.4646 | | | | | RU484 |
| | | | | 8.4077 | | | | | RU996 |
| | | | | 6.4576 | | | | | RU26 + RU52 |
| | | | | 6.1879 | | | | | RU26 + RU106 |
| | | | | 7.9065 | | | | | RU242 + RU484 |

Table for the RUs in the 3rd 80 MHz:

| | | | | | | | | |
|---|---|---|---|---|---|---|---|---|
| 3.7821 | 3.7821 | 3.7821 | 3.7821 | 3.7821 | 3.7821 | 3.7821 | 3.7821 | 3.7821 |
| 4.9670 | | 4.4366 | | | 4.9670 | | 4.4366 | |
| | 5.3767 | | | | | 5.3510 | | |
| | | | | 5.4964 | | | | |
| | | | | 6.4132 | | | | |
| | | | | 8.4721 | | | | |
| | | | | 6.2945 | | | | |
| | | | | 6.2888 | | | | |
| | | | | 8.7348 | | | | |

| | | | | | | | | |
|---|---|---|---|---|---|---|---|---|
| 6.2370 | 5.9599 | 6.3562 | 5.2847 | 6.9770 | 6.1076 | 7.2882 | 6.3562 | 6.4568 |
| 7.7644 | | 7.1450 | | | 8.4760 | | 7.4108 | |
| | 7.5411 | | | | | 6.4197 | | |
| | | | | 7.6904 | | | | |
| | | | | 6.4132 | | | | |
| | | | | 8.4721 | | | | |

-continued

| | | | | | | | | |
|---|---|---|---|---|---|---|---|---|
| | | | | 6.8965 | | | | |
| | | | | 7.4227 | | | | |
| | | | | 8.8105 | | | | |

| | | | | | | | | |
|---|---|---|---|---|---|---|---|---|
| 6.0199 | 5.2847 | 6.0963 | 5.6995 | 6.5421 | 6.8536 | 5.2847 | 6.8009 | 5.6995 |
| 7.4968 | | 7.0082 | | | 7.8070 | | 6.9222 | |
| | 6.5108 | | | | | 5.8427 | | |
| | | | | 6.9765 | | | | |
| | | | | 7.4039 | | | | |
| | | | | 8.4721 | | | | |
| | | | | 6.5092 | | | | |
| | | | | 6.9053 | | | | |
| | | | | 8.2897 | | | | |

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | RU26 |
| 4.9670 | | 4.4366 | | | 4.9670 | | 4.4366 | | RU52 |
| | 5.4754 | | | | | 5.4977 | | | RU106 |
| | | | | 5.5275 | | | | | RU242 |
| | | | | 7.4039 | | | | | RU484 |
| | | | | 8.4721 | | | | | RU996 |
| | | | | 6.4576 | | | | | RU26 + RU52 |
| | | | | 6.1879 | | | | | RU26 + RU106 |
| | | | | 7.7220 | | | | | RU242 + RU484 |

Table for the RUs in the 4th 80 MHz:

| | | | | | | | | |
|---|---|---|---|---|---|---|---|---|
| 3.7821 | 3.7821 | 3.7821 | 3.7821 | 3.7821 | 3.7821 | 3.7821 | 3.7821 | 3.7821 |
| 4.9670 | | 4.4366 | | | 4.9670 | | 4.4366 | |
| | 5.3767 | | | | | 5.3510 | | |
| | | | | 5.4964 | | | | |
| | | | | 6.1862 | | | | |
| | | | | 7.9629 | | | | |
| | | | | 6.2945 | | | | |
| | | | | 6.2888 | | | | |
| | | | | 8.5993 | | | | |

| | | | | | | | | |
|---|---|---|---|---|---|---|---|---|
| 6.1076 | 5.9599 | 6.3562 | 5.2847 | 6.9770 | 6.1076 | 7.2882 | 6.3562 | 6.4568 |
| 6.7962 | | 7.1450 | | | 8.4760 | | 7.4108 | |
| | 6.6954 | | | | | 6.4197 | | |
| | | | | 7.0800 | | | | |
| | | | | 6.1862 | | | | |
| | | | | 7.9629 | | | | |
| | | | | 6.8965 | | | | |
| | | | | 7.4227 | | | | |
| | | | | 7.3482 | | | | |

| | | | | | | | | |
|---|---|---|---|---|---|---|---|---|
| 6.0199 | 5.2847 | 6.0963 | 5.6995 | 6.5421 | 6.8536 | 5.2847 | 6.8009 | 6.7748 |
| 7.4968 | | 7.0082 | | | 7.8070 | | 7.8023 | |
| | 6.5108 | | | | | 6.1323 | | |
| | | | | 7.8327 | | | | |
| | | | | 7.4646 | | | | |
| | | | | 7.9629 | | | | |
| | | | | 6.5092 | | | | |
| | | | | 6.9053 | | | | |
| | | | | 8.6760 | | | | |

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | RU26 |
| 4.9670 | | 4.4366 | | | 4.9670 | | 4.4366 | | RU52 |
| | 5.4754 | | | | | 5.4977 | | | RU106 |
| | | | | 5.5275 | | | | | RU242 |
| | | | | 7.4646 | | | | | RU484 |
| | | | | 7.9629 | | | | | RU996 |
| | | | | 6.4576 | | | | | RU26 + RU52 |
| | | | | 6.1879 | | | | | RU26 + RU106 |
| | | | | 7.9397 | | | | | RU242 + RU484 |

The sequence has the following PAPR values on other RUs in more than 80 MHz (namely, RU combinations) in table B.

For a specific RU combination form, a bitmap is used to indicate a puncturing pattern.

Each bit indicates whether one 20 MHz is punctured. For example, "0" indicates that the 20 MHz corresponding to the bit is punctured or the 20 MHz is not considered for combination during multiple RU combination, and "1" indicates that the 20 MHz corresponding to the bit is not punctured. Optionally, bits from left to right sequentially correspond to 20 MHz with channel frequencies from low to high.

RU484+RU3*996: [0 0 1 1 1 1 1 1 1 1 1 1 1 1 1 1], [1 1 0 0 1 1 1 1 1 1 1 1 1 1 1 1], [1 1 1 1 0 0 1 1 1 1 1 1 1 1 1 1], [1 1 1 1 1 1 0 0 1 1 1 1 1 1 1 1], [1 1 1 1 1 1 1 1 0

0 1 1 1 1 1 1], [1 1 1 1 1 1 1 1 1 1 1 0 0 1 1 1 1 1], [1 1 1 1 1 1 1 1 1 1 1 1 1 0 0 1 1], [1 1 1 1 1 1 1 1 1 1 1 1 1 1 1 0 0].

RU3*996: [1 1 1 1 0 0 0 0 1 1 1 1 1 1 1 1], [1 1 1 1 1 1 1 1 0 0 0 0 1 1 1 1], [1 1 1 1 1 1 1 1 1 1 1 1 0 0 0 0 1], [0 0 0 0 1 1 1 1 1 1 1 1 1 1 1 1].

RU2*996+RU484: [0 0 1 1 1 1 1 1 1 1 1 1 1 0 0 0 0], [1 1 0 0 1 1 1 1 1 1 1 1 1 0 0 0 0], [1 1 1 1 0 0 1 1 1 1 1 1 1 0 0 0 0 1], [1 1 1 1 1 1 0 0 1 1 1 1 1 0 0 0 0], [1 1 1 1 1 1 1 1 0 0 1 1 0 0 0 0], [1 1 1 1 1 1 1 1 1 1 0 0 0 0 0 0 1], [0 0 0 0 0 0 1 1 1 1 1 1 1 1 1 1], [0 0 0 0 1 1 0 0 1 1 1 1 1 1 1 1], [0 0 0 0 1 1 1 1 0 0 1 1 1 1 1 1 1], [0 0 0 0 1 1 1 1 1 1 1 0 0 1 1 1 1], [0 0 0 0 1 1 1 1 1 1 1 1 1 0 0 1 1], [0 0 0 0 1 1 1 1 1 1 1 1 1 1 0 0].

RU2*996: [1 1 1 1 1 1 1 1 0 0 0 0 0 0 0 0], [0 0 0 0 0 0 0 1 1 1 1 1 1 1 1], [0 0 0 0 1 1 1 1 1 1 1 1 0 0 0 0].

RU484+RU996: [0 0 1 1 1 1 1 1 1 0 0 0 0 0 0 0 0], [1 1 0 0 1 1 1 1 0 0 0 0 0 0 0 0 0], [1 1 1 1 0 0 1 1 0 0 0 0 0 0 0 0 0], [1 1 1 1 1 1 0 0 0 0 0 0 0 0 0 0 0], [0 0 0 0 0 0 0 0 0 0 0 1 1 1 1 1 1], [0 0 0 0 0 0 0 0 1 1 0 0 1 1 1 1 1], [0 0 0 0 0 0 0 0 1 1 1 1 0 0 1 1], [0 0 0 0 0 0 0 0 1 1 1 1 1 1 0 0].

RU4*996: [1 1 1 1 1 1 1 1 1 1 1 1 1 1 1 1 1].

| | | | | | | | | |
|---|---|---|---|---|---|---|---|---|
| 8.1374 | 8.6693 | 8.9227 | 8.7599 | 8.7025 | 8.8465 | 9.0881 | 8.4478 | RU484 + RU3 * 996 |
| 8.2236 | 8.4808 | 7.8376 | | | 7.9432 | | | RU3 * 996 |
| 8.6184 | 9.0861 | 8.2054 | 8.9136 | 8.8006 | | 8.8854 | | RU484 + RU2 * 996 |
| 8.5043 | 8.5783 | 8.3695 | 8.0382 | 9.0936 | | 8.4636 | | |
| 8.5185 | 7.9233 | | | 8.3183 | | | | RU2 * 996 |
| 8.7807 | 8.5619 | 8.2653 | 8.2767 | 7.9800 | 8.2300 | 8.1513 | 8.3040 | RU484 + RU996 |
| | | | 8.7931 | | | | | RU4 * 996 |

6-10. There is a possible LTF4×320M sequence=[LTF4×80M$_{part1}$, (−1)*LTF4×80M$_{part2}$, LTF4×80M$_{part3}$, LTF4×80M$_{part4}$, LTF4×80M$_{part5}$, $0_{23}$, (−1)*LTF4×80M$_{part1}$, (−1)*LTF4×80M$_{part2}$, (−1)*LTF4×80M$_{part3}$, LTF4×80M$_{part4}$, (−1)*LTF4×80M$_{part5}$, $0_{23}$, (−1)*LTF4×80M$_{part1}$, LTF4×80M$_{part2}$, LTF4×80M$_{part3}$, LTF4×80M$_{part4}$, LTF4×80M$_{part5}$, $0_{23}$, LTF4×80M$_{part1}$, LTF4×80M$_{part2}$, LTF4×80M$_{part3}$, LTF4×80M$_{part4}$, (−1)*LTF4×80M$_{part5}$].

LTF4×80 MHz$_{part1}$, LTF4×80 MHz$_{part2}$, LTF4×80 MHz$_{part3}$, LTF4×80 MHz$_{part4}$, and LTF4×80 MHz$_{part5}$ are sequences obtained by dividing an 80 MHz 4×LTF sequence based on sizes of 5 parts of an 80 MHz 2×LTF sequence in the 802.11ax standard. LTF4×80 MHz is an 80 MHz 4×LTF sequence in the 802.11ax standard. For specific sequences, refer to the 802.11ax standard.

Specifically, the sequence has the following PAPR values on RUs (a plurality of RU combinations or single RUs) in the 1st 80 MHz to the 4th 80 MHz.

Table for the RUs in the 1st 80 MHz:

| | | | | | | | | |
|---|---|---|---|---|---|---|---|---|
| 3.7821 | 3.7821 | 3.7821 | 3.7821 | 3.7821 | 3.7821 | 3.7821 | 3.7821 | 3.7821 |
| | 4.9670 | | 4.4366 | | | 4.9670 | | 4.4366 |
| | | 5.3767 | | | | | 5.3510 | |
| | | | | 5.4964 | | | | |
| | | | | 6.9069 | | | | |
| | | | | 8.0086 | | | | |
| | | | | 6.2945 | | | | |
| | | | | 6.2888 | | | | |
| | | | | 8.1123 | | | | |

| | | | | | | | | |
|---|---|---|---|---|---|---|---|---|
| 6.1076 | 5.9599 | 6.3562 | 5.2847 | 6.9770 | 6.1076 | 7.2882 | 6.3562 | 6.5383 |
| | 6.7962 | | 7.1450 | | | 8.4760 | | 7.3790 |
| | | 6.6954 | | | | | 6.4813 | |
| | | | | 6.6944 | | | | |
| | | | | 6.9069 | | | | |
| | | | | 8.0086 | | | | |
| | | | | 6.8965 | | | | |
| | | | | 7.4722 | | | | |
| | | | | 7.4883 | | | | |

| | | | | | | | | |
|---|---|---|---|---|---|---|---|---|
| 6.0199 | 5.2847 | 6.0963 | 5.6995 | 6.5421 | 6.8536 | 5.2847 | 6.8009 | 5.6995 |
| | 7.4968 | | 7.0082 | | | 7.8070 | | 6.9222 |
| | | 6.5108 | | | | | 5.8427 | |
| | | | | 6.9765 | | | | |
| | | | | 7.4039 | | | | |
| | | | | 8.0086 | | | | |
| | | | | 6.5092 | | | | |
| | | | | 6.9053 | | | | |
| | | | | 8.0242 | | | | |

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | RU26 |
| | 4.9670 | | 4.4366 | | | 4.9670 | | 4.4366 | RU52 |
| | | 5.4754 | | | | | 5.4977 | | RU106 |
| | | | | 5.5275 | | | | | RU242 |
| | | | | 7.4039 | | | | | RU484 |
| | | | | 8.0086 | | | | | RU996 |
| | | | | 6.4576 | | | | | RU26 + RU52 |
| | | | | 6.1879 | | | | | RU26 + RU106 |
| | | | | 8.3487 | | | | | RU242 + RU484 |

Table for the RUs in the 2$^{nd}$ 80 MHz:

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | |
| | 4.9670 | | 4.4366 | | | 4.9670 | | 4.4366 | |
| | | 5.3767 | | | | | 5.3510 | | |
| | | | | 5.4964 | | | | | |
| | | | | 6.1862 | | | | | |
| | | | | 8.5169 | | | | | |
| | | | | 6.2945 | | | | | |
| | | | | 6.2888 | | | | | |
| | | | | 8.3704 | | | | | |
| 6.1076 | 5.9599 | 6.3562 | 5.2847 | 6.9770 | 6.1076 | 7.2882 | 6.3562 | 6.4568 | |
| | 6.7962 | | 7.1450 | | | 8.4760 | | 7.4108 | |
| | | 6.6954 | | | | | 6.4197 | | |
| | | | | 7.0800 | | | | | |
| | | | | 6.1862 | | | | | |
| | | | | 8.5169 | | | | | |
| | | | | 6.8965 | | | | | |
| | | | | 7.4227 | | | | | |
| | | | | 8.6496 | | | | | |
| 6.6540 | 5.2847 | 6.0963 | 5.6995 | 6.5421 | 6.8536 | 5.2847 | 6.8009 | 5.6995 | |
| | 7.3888 | | 7.0082 | | | 7.8070 | | 6.9222 | |
| | | 7.2059 | | | | | 5.8427 | | |
| | | | | 6.7514 | | | | | |
| | | | | 7.5709 | | | | | |
| | | | | 8.5169 | | | | | |
| | | | | 6.5092 | | | | | |
| | | | | 7.1131 | | | | | |
| | | | | 8.1399 | | | | | |
| 3.7821 | 3.7821 | 3.7821 | 3.7821 | 3.7821 | 3.7821 | 3.7821 | 3.7821 | 3.7821 | RU26 |
| | 4.9670 | | 4.4366 | | | 4.9670 | | 4.4366 | RU52 |
| | | 5.4754 | | | | | 5.4977 | | RU106 |
| | | | | 5.5275 | | | | | RU242 |
| | | | | 7.5709 | | | | | RU484 |
| | | | | 8.5169 | | | | | RU996 |
| | | | | 6.4576 | | | | | RU26 + RU52 |
| | | | | 6.1879 | | | | | RU26 + RU106 |
| | | | | 7.9065 | | | | | RU242 + RU484 |

Table for the RUs in the 3$^{rd}$ 80 MHz:

| | | | | | | | | |
|---|---|---|---|---|---|---|---|---|
| 3.7821 | 3.7821 | 3.7821 | 3.7821 | 3.7821 | 3.7821 | 3.7821 | 3.7821 | 3.7821 |
| | 4.9670 | | 4.4366 | | | 4.9670 | | 4.4366 |
| | | 5.3767 | | | | | 5.3510 | |
| | | | | 5.4964 | | | | |
| | | | | 6.5676 | | | | |
| | | | | 8.5171 | | | | |
| | | | | 6.2945 | | | | |
| | | | | 6.2888 | | | | |
| | | | | 8.7348 | | | | |
| 6.1076 | 5.9599 | 6.3562 | 5.2847 | 6.9770 | 6.1076 | 7.2882 | 6.3562 | 6.4568 |
| | 6.7962 | | 7.1450 | | | 8.4760 | | 7.4108 |
| | | 6.6954 | | | | | 6.4197 | |
| | | | | 7.0800 | | | | |
| | | | | 6.5676 | | | | |
| | | | | 8.5171 | | | | |
| | | | | 6.8965 | | | | |
| | | | | 7.4227 | | | | |
| | | | | 8.5181 | | | | |
| 6.0199 | 5.2847 | 6.0963 | 5.6995 | 6.5421 | 6.8536 | 5.2847 | 6.8009 | 5.6995 |
| | 7.4968 | | 7.0082 | | | 7.8070 | | 6.9222 |
| | | 6.5108 | | | | | 5.8427 | |
| | | | | 6.9765 | | | | |
| | | | | 7.4039 | | | | |
| | | | | 8.5171 | | | | |
| | | | | 6.5092 | | | | |
| | | | | 6.9053 | | | | |
| | | | | 8.7850 | | | | |

-continued

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | RU26 |
| | 4.9670 | | 4.4366 | | | 4.9670 | | 4.4366 | RU52 |
| | | 5.4754 | | | | | 5.4977 | | RU106 |
| | | | | 5.5275 | | | | | RU242 |
| | | | | 7.4039 | | | | | RU484 |
| | | | | 8.5171 | | | | | RU996 |
| | | | | 6.4576 | | | | | RU26 + RU52 |
| | | | | 6.1879 | | | | | RU26 + RU106 |
| | | | | 8.2684 | | | | | RU242 + RU484 |

Table for the RUs in the $4^{th}$ 80 MHz:

| | | | | | | | | | |
|---|---|---|---|---|---|---|---|---|---|
| 3.7821 | 3.7821 | 3.7821 | 3.7821 | 3.7821 | 3.7821 | 3.7821 | 3.7821 | 3.7821 | |
| | 4.9670 | | 4.4366 | | | 4.9670 | | 4.4366 | |
| | | 5.3767 | | | | | 5.3510 | | |
| | | | | 5.4964 | | | | | |
| | | | | 6.1862 | | | | | |
| | | | | 8.0200 | | | | | |
| | | | | 6.2945 | | | | | |
| | | | | 6.2888 | | | | | |
| | | | | 8.2679 | | | | | |
| 6.1076 | 5.9599 | 6.3562 | 5.2847 | 6.9770 | 6.1076 | 7.2882 | 6.3562 | 6.4568 | |
| | 6.7962 | | 7.1450 | | | 8.4760 | | 7.4108 | |
| | | 6.6954 | | | | | 6.4197 | | |
| | | | | 7.0800 | | | | | |
| | | | | 6.1862 | | | | | |
| | | | | 8.0200 | | | | | |
| | | | | 6.8965 | | | | | |
| | | | | 7.4227 | | | | | |
| | | | | 7.2817 | | | | | |
| 6.0199 | 5.2847 | 6.0963 | 5.6995 | 6.5421 | 6.8536 | 5.2847 | 6.8009 | 5.6995 | |
| | 7.4968 | | 7.0082 | | | 7.8070 | | 6.9222 | |
| | | 6.5108 | | | | | 5.8427 | | |
| | | | | 6.9765 | | | | | |
| | | | | 6.9741 | | | | | |
| | | | | 8.0200 | | | | | |
| | | | | 6.5092 | | | | | |
| | | | | 6.9053 | | | | | |
| | | | | 8.1683 | | | | | |
| 3.7821 | 3.7821 | 3.7821 | 3.7821 | 3.7821 | 3.7821 | 3.7821 | 3.7821 | 3.7821 | RU26 |
| | 4.9670 | | 4.4366 | | | 4.9670 | | 4.4366 | RU52 |
| | | 5.4754 | | | | | 5.4977 | | RU106 |
| | | | | 5.5275 | | | | | RU242 |
| | | | | 6.9741 | | | | | RU484 |
| | | | | 8.0200 | | | | | RU996 |
| | | | | 6.4576 | | | | | RU26 + RU52 |
| | | | | 6.1879 | | | | | RU26 + RU106 |
| | | | | 7.9397 | | | | | RU242 + RU484 |

The sequence has the following PAPR values on other RUs in more than 80 MHz (namely, RU combinations) in table B.

For a specific RU combination form, a bitmap is used to indicate a puncturing pattern. Each bit indicates whether one 20 MHz is punctured. For example, "0" indicates that the 20 MHz corresponding to the bit is punctured or the 20 MHz is not considered for combination during multiple RU combination, and "1" indicates that the 20 MHz corresponding to the bit is not punctured. Optionally, bits from left to right sequentially correspond to 20 MHz with channel frequencies from low to high.

RU484+RU3*996: [0 0 1 1 1 1 1 1 1 1 1 1 1 1 1 1], [1 1 0 0 1 1 1 1 1 1 1 1 1 1 1 1], [1 1 1 1 0 0 1 1 1 1 1 1 1 1 1 1], [1 1 1 1 1 1 0 0 1 1 1 1 1 1 1 1], [1 1 1 1 1 1 1 1 0 0 1 1 1 1 1 1], [1 1 1 1 1 1 1 1 1 1 0 0 1 1 1 1], [1 1 1 1 1 1 1 1 1 1 1 1 0 0 1 1], [1 1 1 1 1 1 1 1 1 1 1 1 1 1 0 0].

RU3*996: [1 1 1 1 0 0 0 0 1 1 1 1 1 1 1 1], [1 1 1 1 1 1 1 1 0 0 0 0 1 1 1 1], [1 1 1 1 1 1 1 1 1 1 1 1 0 0 0 0 1], [0 0 0 0 1 1 1 1 1 1 1 1 1 1 1 1].

RU2*996+RU484: [0 0 1 1 1 1 1 1 1 1 1 1 0 0 0 0], [1 1 0 0 1 1 1 1 1 1 1 1 0 0 0 0], [1 1 1 1 0 0 1 1 1 1 1 1 0 0 0 0 1], [1 1 1 1 1 1 0 0 1 1 1 1 0 0 0 0], [1 1 1 1 1 1 1 1 0 0 1 1 0 0 0 0], [1 1 1 1 1 1 1 1 1 1 0 0 0 0 0 0 1], [0 0 0 0 0 0 1 1 1 1 1 1 1 1 1 1], [0 0 0 0 1 1 0 0 1 1 1 1 1 1 1 1], [0 0 0 0 1 1 1 1 0 0 1 1 1 1 1 1], [0 0 0 0 1 1 1 1 1 1 0 0 1 1 1 1], [0 0 0 0 1 1 1 1 1 1 1 1 0 0 1 1], [0 0 0 0 1 1 1 1 1 1 1 1 1 1 0 0].

RU2*996: [1 1 1 1 1 1 1 1 0 0 0 0 0 0 0 0], [0 0 0 0 0 0 0 0 1 1 1 1 1 1 1 1], [0 0 0 0 1 1 1 1 1 1 1 1 0 0 0 0].

RU484+RU996: [0 0 1 1 1 1 1 1 0 0 0 0 0 0 0 0], [1 1 0 0 1 1 1 1 0 0 0 0 0 0 0 0], [1 1 1 1 0 0 1 1 0 0 0 0 0 0 0 0 1], [1 1 1 1 1 1 0 0 0 0 0 0 0 0 0 0], [0 0 0 0 0 0 0 0 0 0 0 1 1 1 1 1 1], [0 0 0 0 0 0 0 0 1 1 0 0 1 1 1 1], [0 0 0 0 0 0 0 0 1 1 1 1 0 0 1 1], [0 0 0 0 0 0 0 0 1 1 1 1 1 1 0 0].

RU4*996: [1 1 1 1 1 1 1 1 1 1 1 1 1 1 1 1].

| | | | | | | | | |
|---|---|---|---|---|---|---|---|---|
| 8.4770 | 8.5099 | 8.9070 | 8.3513 | 8.7749 | 8.5241 | 8.1845 | 8.3446 | RU484 + RU3 * 996 |
| 8.8353 | 8.3823 | 8.0460 | | | 8.8380 | | | RU3 * 996 |
| 8.9507 | 8.8980 | 8.1672 | 8.3486 | 9.0054 | 8.8998 | | | RU484 + RU2 * 996 |
| 8.6050 | 8.6700 | 8.8844 | 8.0479 | 9.1028 | 8.9502 | | | |
| 8.3520 | 8.1134 | | | | 8.0330 | | | RU2 * 996 |
| 8.5088 | 8.4279 | 8.4613 | 8.7239 | 7.8484 | 8.3722 | 7.9702 | 7.9343 | RU484 + RU996 |
| | | | | 7.8967 | | | | RU4 * 996 |

The foregoing describes the method for transmitting/receiving a physical layer protocol data unit provided in the embodiments of this application. The following describes a product in the embodiments of this application.

An embodiment of this application provides an apparatus for transmitting a physical layer protocol data unit, including:

- a generation unit, configured to generate a physical layer protocol data unit (PPDU), where the PPDU includes a long training field (LTF), a length of a frequency-domain sequence of the LTF is greater than a first length, and the first length is a length of a frequency-domain sequence of an LTF of a PPDU transmitted over a channel whose bandwidth is 160 MHz; and
- a sending unit, configured to send the PPDU over a target channel, where a bandwidth of the target channel is greater than 160 MHz.

The apparatus for transmitting a physical layer protocol data unit provided in this embodiment of this application considers a phase rotation at a non-pilot location, a plurality of puncturing patterns for 240 MHz/320 MHz, and multiple RU combination, so that a finally provided frequency-domain sequence of an LTF has a relatively small PAPR value on a multiple RU in the plurality of puncturing patterns for 240 MHz/320 MHz.

An embodiment of this application provides an apparatus for receiving a physical layer protocol data unit, including:

- a receiving unit, configured to receive a physical layer protocol data unit PPDU over a target channel, where the PPDU includes a long training field, a length of a frequency-domain sequence of the long training field is greater than a first length, the first length is a length of a frequency-domain sequence of a long training field of a PPDU transmitted over a channel whose bandwidth is 160 MHz, and a bandwidth of the target channel is greater than 160 MHz; and
- a processing unit, configured to parse the PPDU.

According to the apparatus for receiving a physical layer protocol data unit provided in this embodiment of this application, a frequency-domain sequence of an LTF parsed by the apparatus has a relatively small PAPR value on a multiple RU in a plurality of puncturing patterns for 240 MHz/320 MHz.

It should be understood that, the apparatus for transmitting/receiving a physical layer protocol data unit provided in the embodiments of this application has all functions and all technical details of the foregoing method for transmitting/receiving a physical layer protocol data unit. For specific technical details, refer to the foregoing method. Details are not described herein again.

The foregoing describes the apparatus for transmitting/receiving a physical layer protocol data unit in the embodiments of this application. The following describes a possible product form of the apparatus for transmitting/receiving a physical layer protocol data unit. It should be understood that, any form of product having the functions of the foregoing apparatus for transmitting/receiving a physical layer protocol data unit falls within the protection scope of the embodiments of this application. It should be further understood that, the following description is merely an example, and does not limit a product form of the apparatus for transmitting/receiving a physical layer protocol data unit in the embodiments of this application.

In a possible product form, the apparatus for transmitting/receiving a physical layer protocol data unit described in the embodiments of this application may be implemented by using a general bus architecture.

The apparatus for transmitting a physical layer protocol data unit includes a processor and a transceiver. The processor is configured to generate a physical layer protocol data unit (PPDU), where the PPDU includes a long training field (LTF), a length of a frequency-domain sequence of the LTF is greater than a first length, and the first length is a length of a frequency-domain sequence of an LTF of a PPDU transmitted over a channel whose bandwidth is 160 MHz. The transceiver is configured to send the PPDU over a target channel, where a bandwidth of the target channel is greater than 160 MHz.

It should be understood that, the apparatus for transmitting a physical layer protocol data unit has all functions and all technical details of the foregoing method for transmitting a physical layer protocol data unit. For specific technical details, refer to the foregoing method. Details are not described herein again.

Optionally, the apparatus for transmitting a physical layer protocol data unit may further include a memory. The memory is configured to store instructions executable by the processor.

The apparatus for receiving a physical layer protocol data unit includes a processor and a transceiver. The transceiver is configured to receive a physical layer protocol data unit PPDU over a target channel, where the PPDU includes a long training field, a length of a frequency-domain sequence of the long training field is greater than a first length, the first length is a length of a frequency-domain sequence of a long training field of a PPDU transmitted over a channel whose bandwidth is 160 MHz, and a bandwidth of the target channel is greater than 160 MHz. The processor is configured to parse the PPDU.

It should be understood that, the apparatus for receiving a physical layer protocol data unit has all functions and all technical details of the foregoing method for receiving a physical layer protocol data unit. For specific technical details, refer to the foregoing method. Details are not described herein again.

Optionally, the apparatus for receiving a physical layer protocol data unit may further include a memory. The memory is configured to store instructions executable by the processor.

In a possible product form, the apparatus for transmitting/receiving a physical layer protocol data unit in the embodiments of this application may be implemented by a general-purpose processor.

The apparatus for transmitting a physical layer protocol data unit includes a processing circuit and a transceiver interface. The processing circuit is configured to generate a physical layer protocol data unit (PPDU), where the PPDU includes a long training field (LTF), a length of a frequency-domain sequence of the LTF is greater than a first length, and the first length is a length of a frequency-domain sequence of an LTF of a PPDU transmitted over a channel whose bandwidth is 160 MHz. The transceiver interface is configured to send the PPDU over a target channel, where a bandwidth of the target channel is greater than 160 MHz.

Optionally, the apparatus for transmitting a physical layer protocol data unit may further include a storage medium. The storage medium is configured to store instructions executable by the processing circuit.

It should be understood that, the apparatus for transmitting a physical layer protocol data unit has all functions and all technical details of the foregoing method for transmitting a physical layer protocol data unit. For specific technical details, refer to the foregoing method. Details are not described herein again.

The apparatus for receiving a physical layer protocol data unit includes a processing circuit and a transceiver interface. The transceiver interface is configured to receive a physical layer protocol data unit PPDU over a target channel, where the PPDU includes a long training field, a length of a frequency-domain sequence of the long training field is greater than a first length, the first length is a length of a frequency-domain sequence of a long training field of a PPDU transmitted over a channel whose bandwidth is 160 MHz, and a bandwidth of the target channel is greater than 160 MHz. The processing circuit is configured to parse the PPDU.

Optionally, the apparatus for receiving a physical layer protocol data unit may further include a storage medium. The storage medium is configured to store instructions executable by the processing circuit.

It should be understood that, the apparatus for receiving a physical layer protocol data unit has all functions and all technical details of the foregoing method for receiving a physical layer protocol data unit. For specific technical details, refer to the foregoing method. Details are not described herein again.

In a possible product form, the apparatus for transmitting/receiving a physical layer protocol data unit described in the embodiments of this application may be further implemented by using the following: any combination of one or more FPGAs (field programmable gate arrays), PLDs (programmable logic devices), controllers, state machines, gate logic, and discrete hardware components, any other suitable circuit, or a circuit capable of performing the various functions described throughout this application.

An embodiment of this application further provides a computer program product. The computer program product includes computer program code. When the computer program code is run on a computer, the computer is enabled to perform the method in the embodiment shown in FIG. 5.

An embodiment of this application further provides a computer-readable medium. The computer-readable medium stores program code. When the program code is run on a computer, the computer is enabled to perform the method in the embodiment shown in FIG. 5.

In the several embodiments provided in this application, it should be understood that the disclosed systems, apparatuses, and methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technologies, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a physical layer protocol data unit, the method comprising:

generating a physical layer protocol data unit (PPDU), wherein the PPDU comprises a long training field; and sending the PPDU over a target channel, wherein a bandwidth of the target channel is 320 MHz, and a frequency-domain sequence of the long training field of the PPDU is

[LTF1×80 $MHz_{left}$ 0 LTF1×80 $MHz_{right}$ $0_{23}$ LTF1×80 $MHz_{left}$ 0 LTF1×80 $MHz_{right}$ $0_{23}$−LTF1×80 $MHz_{left}$ 0−LTF1×80 $MHz_{right}$ $0_{23}$−LTF1×80 $MHz_{left}$ 0−LTF1×80 $MHz_{right}$], wherein LTF1×80 $MHz_{left}$ is an 80 $MHz_{left}$ 1×LTF sequence in 802.11ax standard, LTF1×80 $MHz_{right}$ is an 80 $MHz_{right}$ 1×LTF sequence in the 802.11ax standard.

2. The method according to claim 1, wherein the LTF1×80 $MHz_{left}$={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, 1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, 1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, 1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0};

the LTF1×80 $MHz_{right}$={0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}.

3. A method for receiving a physical layer protocol data unit, the method comprising:

receiving a physical layer protocol data unit (PPDU) over a target channel, wherein the PPDU comprises a long training field, wherein a bandwidth of the target channel is 320 MHz, and a frequency-domain sequence of the long training field of the PPDU is

[LTF1×80 $MHz_{left}$ 0 LTF1×80 $MHz_{right}$ $0_{23}$ LTF1×80 $MHz_{left}$ 0 LTF1×80 $MHz_{right}$ $0_{23}$–LTF1×80 $MHz_{left}$ 0–LTF1×80 $MHz_{right}$ $0_{23}$–LTF1×80 $MHz_{left}$ 0–LTF1×80 $MHz_{right}$], wherein LTF1×80 $MHz_{left}$ is an 80 $MHz_{left}$ 1×LTF sequence in 802.11ax standard, LTF1×80 $MHz_{right}$ is an 80 $MHz_{right}$ 1×LTF sequence in the 802.11ax standard; and parsing the PPDU.

4. The method according to claim 3, wherein the LTF1×80 $MHz_{left}$={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0};

the LTF1×80 $MHz_{right}$={0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}.

5. An apparatus for transmitting a physical layer protocol data unit, the apparatus comprising:

at least one processor; and one or more memories coupled to the at least one processor and storing program instructions for execution by the at least one processor to:

generate a physical layer protocol data unit (PPDU), wherein the PPDU comprises a long training field; and send the PPDU over a target channel, wherein a bandwidth of the target channel is 320 MHz, and a frequency-domain sequence of the long training field of the PPDU is

[LTF1×80 $MHz_{left}$ 0 LTF1×80 $MHz_{right}$ $0_{23}$ LTF1×80 $MHz_{left}$ 0 LTF1×80 $MHz_{right}$ $0_{23}$–LTF1×80 $MHz_{left}$ 0–LTF1×80 $MHz_{right}$ $0_{23}$–LTF1×80 $MHz_{left}$ 0–LTF1×80 $MHz_{right}$], wherein LTF1×80 $MHz_{left}$ is an 80 $MHz_{left}$ 1×LTF sequence in 802.11ax standard, LTF1×80 $MHz_{right}$ is an 80 $MHz_{right}$ 1×LTF sequence in the 802.11ax standard.

6. The apparatus according to claim 5, wherein the LTF1×80 $\text{MHz}_{left}$={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0};

the LTF1×80 $\text{MHz}_{right}$={0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}.

7. An apparatus for receiving a physical layer protocol data unit, the apparatus comprising:

at least one processor; and one or more memories coupled to the at least one processor and storing program instructions for execution by the at least one processor to:

receive a physical layer protocol data unit (PPDU) over a target channel, wherein the PPDU comprises a long training field, wherein a bandwidth of the target channel is 320 MHz, and a frequency-domain sequence of the long training field of the PPDU is [LTF1×80 $\text{MHz}_{left}$ 0 LTF1×80 $\text{MHz}_{right}$ $0_{23}$ LTF1×80 $\text{MHz}_{left}$ 0 LTF1×80 $\text{MHz}_{right}$ $0_{23}$−LTF1×80 $\text{MHz}_{left}$ 0−LTF1×80 $\text{MHz}_{right}$ $0_{23}$−LTF1×80 $\text{MHz}_{left}$ 0−LTF1×80 $\text{MHz}_{right}$], wherein LTF1×80 $\text{MHz}_{left}$ is an 80 $\text{MHz}_{left}$ 1×LTF sequence in 802.11ax standard, LTF1×80 $\text{MHz}_{right}$ is an 80 $\text{MHz}_{right}$ 1×LTF sequence in the 802.11ax standard; and parse the PPDU.

8. The apparatus according to claim 7, wherein the LTF1×80 $\text{MHz}_{left}$={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0};

the LTF1×80 $\text{MHz}_{right}$={0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}.

* * * * *